(12) United States Patent
Taquet et al.

(10) Patent No.: US 12,355,960 B2
(45) Date of Patent: *Jul. 8, 2025

(54) ADAPTIVE LOOP FILTER

(71) Applicant: CANON KABUSHIKI KAISHA, Tokyo (JP)

(72) Inventors: Jonathan Taquet, Talensac (FR); Christophe Gisquet, Acigne (FR); Guillaume Laroche, Saint Aubin d'Aubigné (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,694

(22) Filed: May 1, 2024

(65) Prior Publication Data
US 2024/0372998 A1 Nov. 7, 2024

Related U.S. Application Data

(63) Continuation of application No. 17/434,361, filed as application No. PCT/EP2020/055888 on Mar. 5, 2020, now Pat. No. 11,991,353.

(30) Foreign Application Priority Data

Mar. 8, 2019 (GB) .................................... 1903187
Mar. 15, 2019 (GB) .................................... 1903584
(Continued)

(51) Int. Cl.
*H04N 19/117* (2014.01)
*H04N 19/176* (2014.01)
(Continued)

(52) U.S. Cl.
CPC ......... *H04N 19/117* (2014.11); *H04N 19/176* (2014.11); *H04N 19/186* (2014.11); *H04N 19/46* (2014.11); *H04N 19/82* (2014.11)

(58) Field of Classification Search
CPC .. H04N 19/503; H04N 19/109; H04N 19/117; H04N 19/122; H04N 19/124;
(Continued)

(56) References Cited

U.S. PATENT DOCUMENTS 9,094,658 B2 * 7/2015 Fu .................... H04N 19/137
2017/0324962 A1 * 11/2017 Karczewicz ........... H04N 19/80
(Continued)

FOREIGN PATENT DOCUMENTS

CA 2644605 * 3/2007
KR 20150003219 * 4/2013
(Continued)

OTHER PUBLICATIONS

Gamei James Alexander Translation of KR 20150003219 Apr. 2013 (Year: 2013).*
(Continued)

*Primary Examiner* — Zaihan Jiang
(74) *Attorney, Agent, or Firm* — Canon U.S.A., Inc. IP Division

(57) ABSTRACT

A method of controlling an Adaptive Loop Filter comprises obtaining for a slice containing one or more coding tree blocks, data indicating a number of available alternative chroma filters, obtaining for a coding tree block in the slice, an alternative filter index identifying one of the available alternative chroma filters, and selecting the alternative chroma filter identified by the index to filter chroma image data in the coding tree block.

20 Claims, 23 Drawing Sheets

(30) Foreign Application Priority Data

Jun. 21, 2019 (GB) ...................................... 1908937
Dec. 20, 2019 (GB) ...................................... 1919037

(51) Int. Cl.
*H04N 19/186* (2014.01)
*H04N 19/46* (2014.01)
*H04N 19/82* (2014.01)

(58) Field of Classification Search
CPC .... H04N 19/13; H04N 19/132; H04N 19/136;
H04N 19/172; H04N 19/176; H04N
19/177; H04N 19/18; H04N 19/184;
H04N 19/30; H04N 19/45; H04N 19/60;
H04N 19/82
See application file for complete search history.

(56) References Cited

U.S. PATENT DOCUMENTS

2020/0374518 A1* 11/2020 Hu ........................ H04N 19/117
2021/0044834 A1* 2/2021 Li ........................ H04N 19/176
2021/0152841 A1* 5/2021 Hu ........................ H04N 19/44
2022/0132115 A1* 4/2022 Paluri ................... H04N 19/70

FOREIGN PATENT DOCUMENTS

WO 2007049150 A2 5/2007
WO WO-2020126411 * 11/2019

OTHER PUBLICATIONS

Jianle Chen et al., Algorithm description for Versatile Video Coding and Test Model 3 (VTM 3), Joint Video Experts Team (JVET) of ITU-T SG 16 WP 3 and ISO/IEC JTC 1/SC 29/WG 11, 12th meeting, JVET-L1002-v1, Macao, CN, Oct. 3-12, 2018.
Gary Sullivan et al., Meeting report of the seventh meeting of the Joint Collaborative Team on Video Coding (JCT-VC), Joint Collaborative Team on Video Coding (JCT-VC) of ITU-T SG 16 WP3 and ISO/IEC JTC1/SC 29/WG11, 7th meeting, JCTVC-G1100, Geneva, CH, Nov. 21-30, 2021.
Alistair Goudie, Restrictions to the maximum motion vector range, Joint Collaborative Team on Video Coding (JCT-VC) of ITU-T SG 16 WP 3 and ISO/IEC JTC 1/SC 29/WG 11, 10th meeting, JCTVC-J0225, Stockholm, SE, Jul. 11-20, 2012.

* cited by examiner

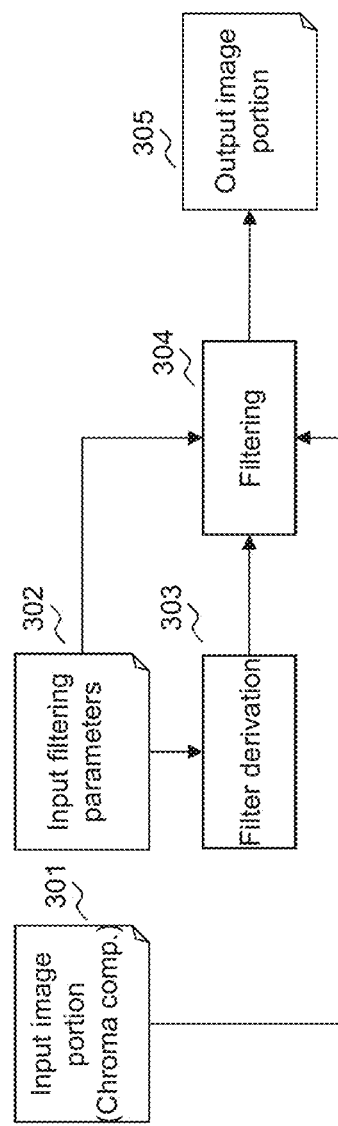
Fig. 3-b
Fig. 3-a

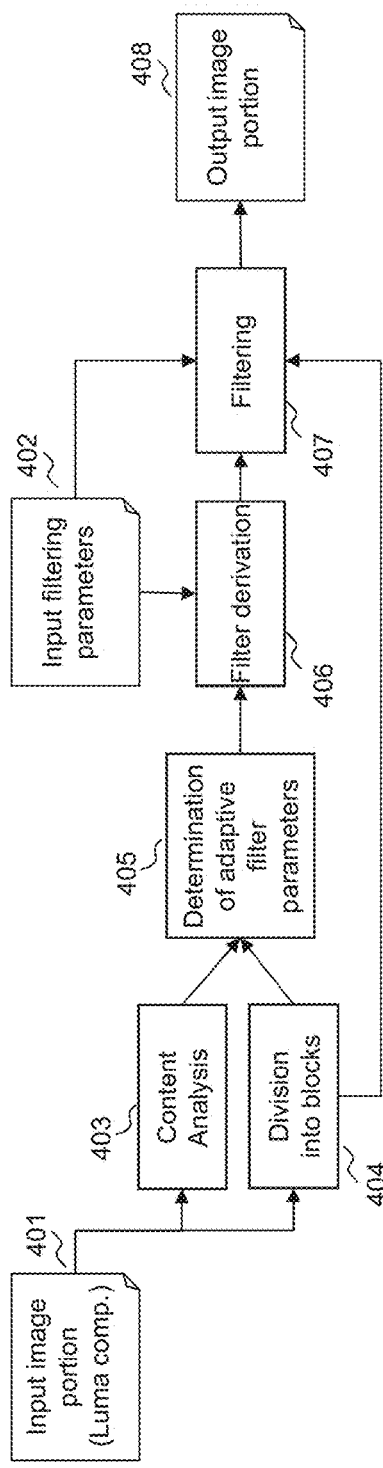
Fig. 4-a
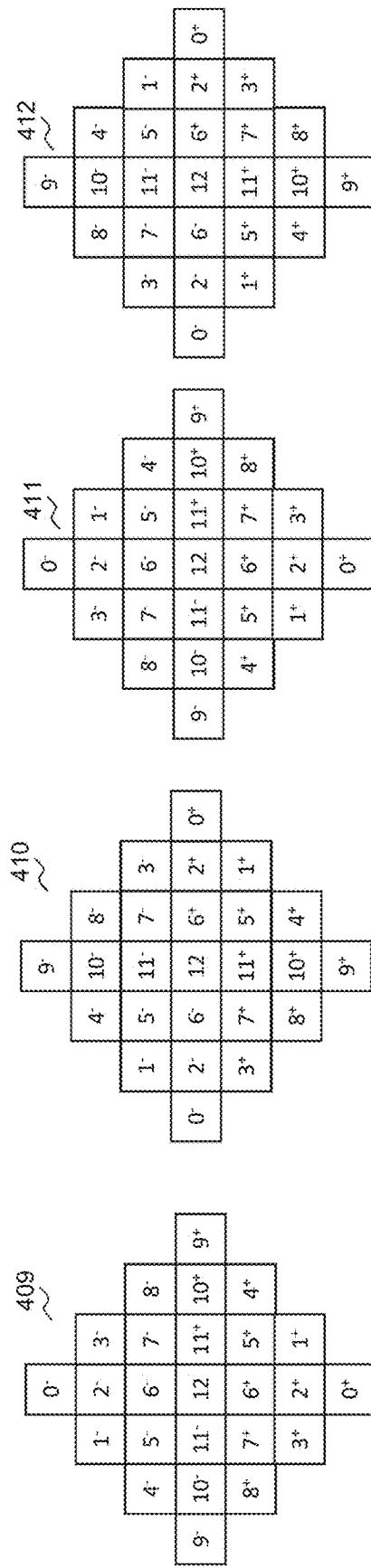
Fig. 4-b

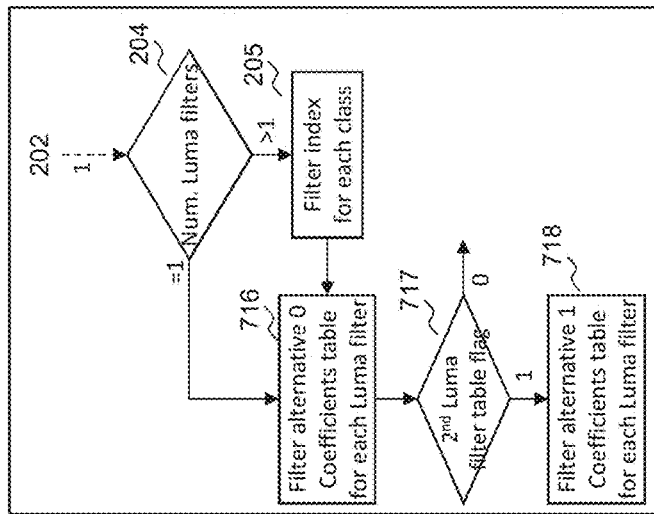
Fig. 7-c
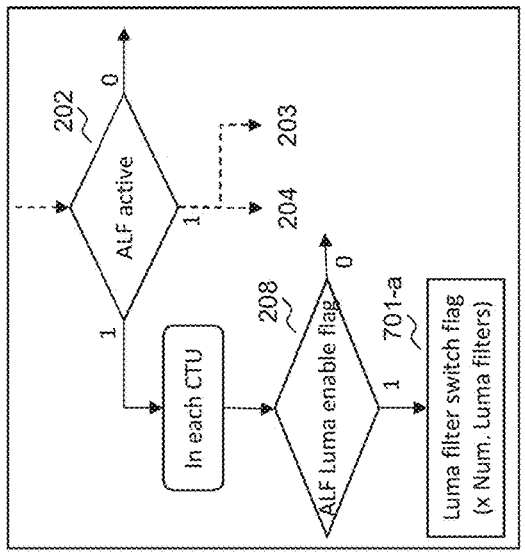
Fig. 7-a
Fig. 7-b

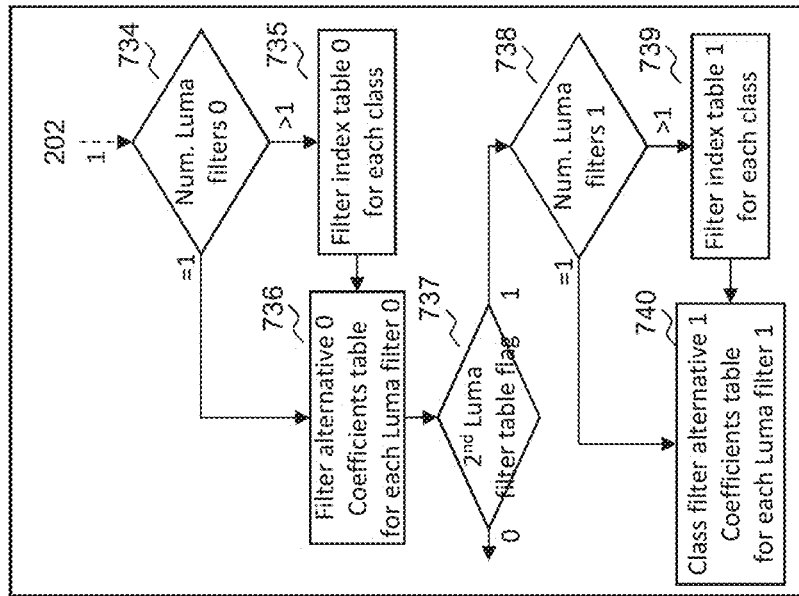
Fig. 7-e
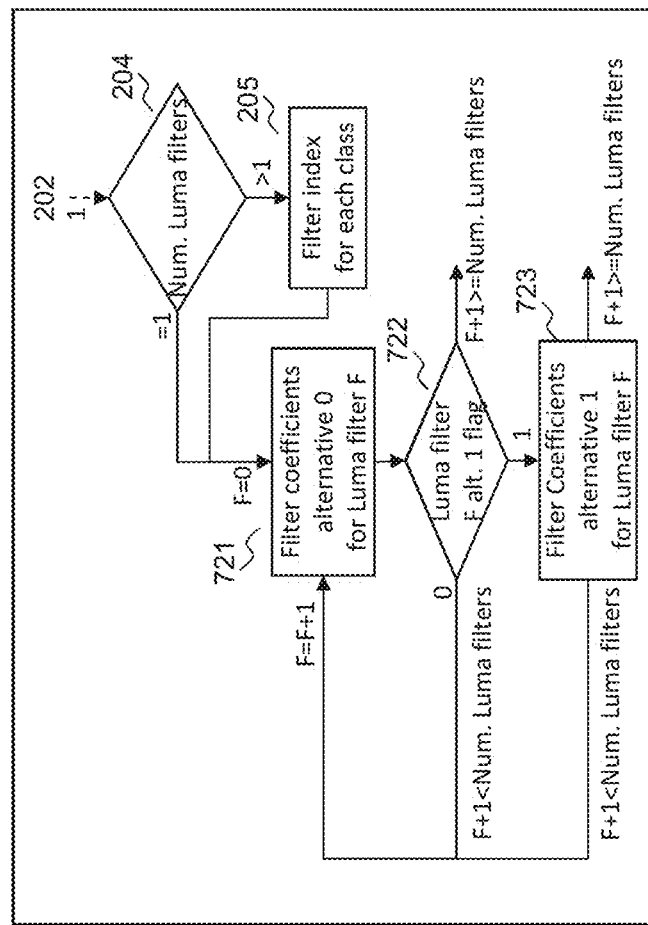
Fig. 7-d

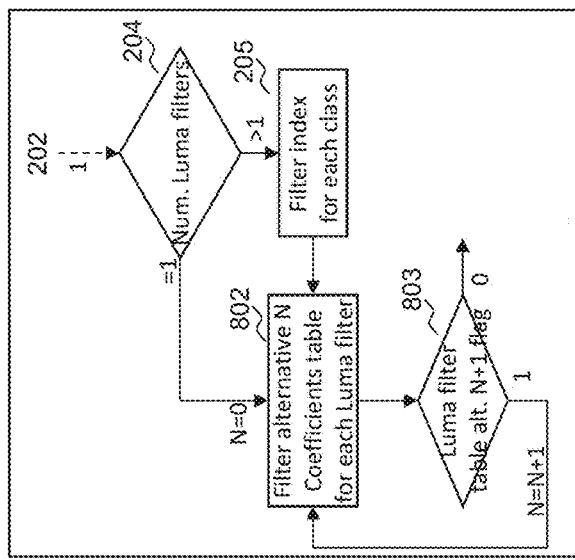
Fig. 8-b
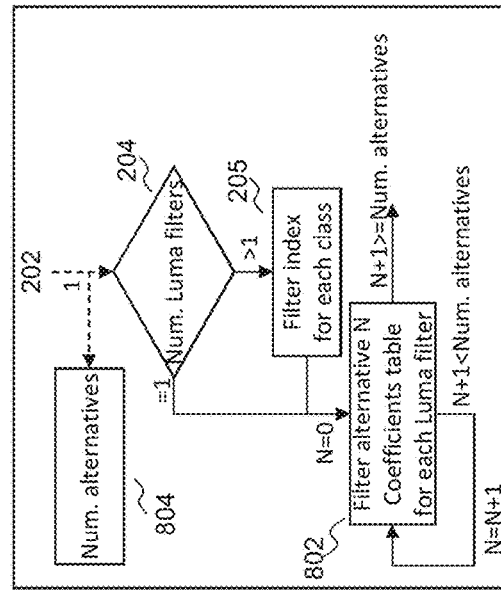
Fig. 8-c
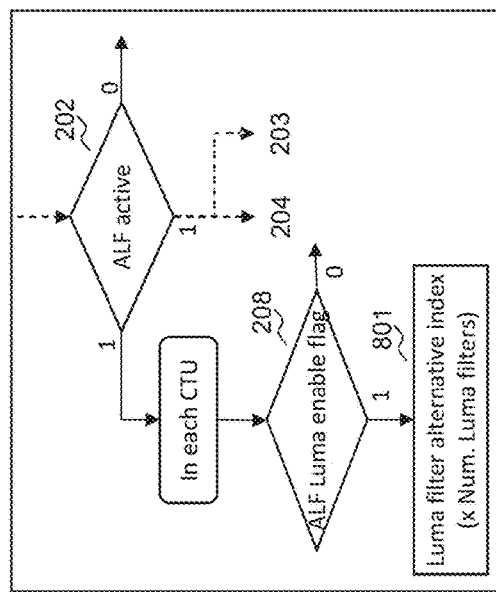
Fig. 8-a

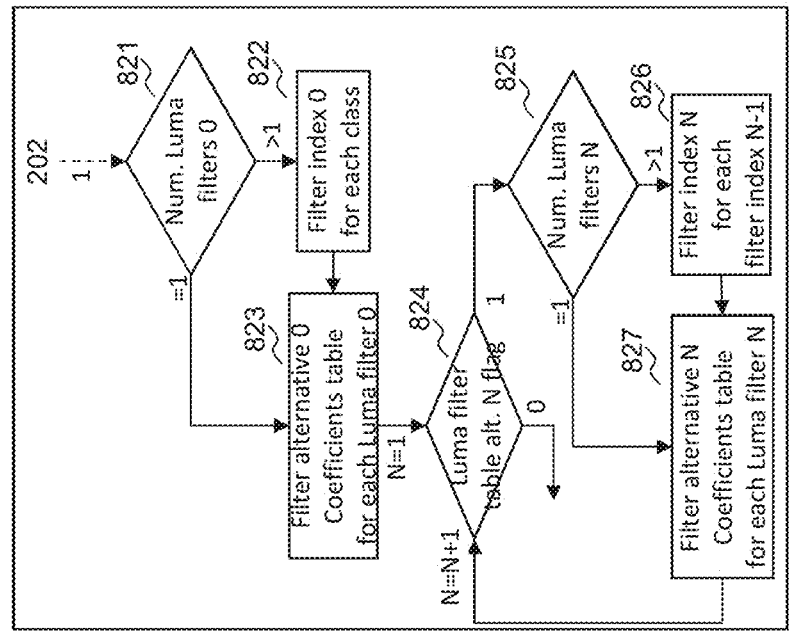
Fig. 8-e
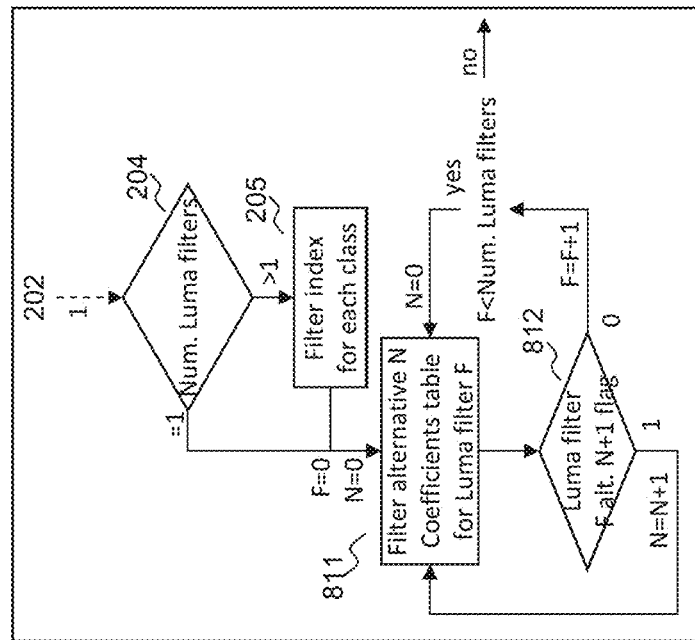
Fig. 8-d

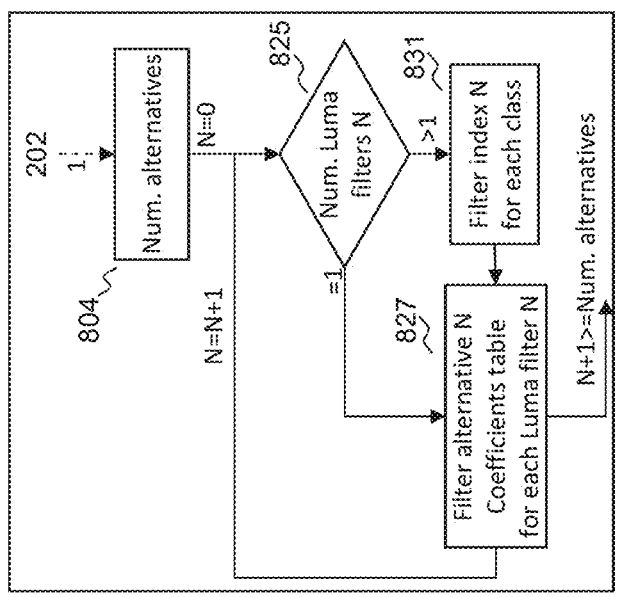

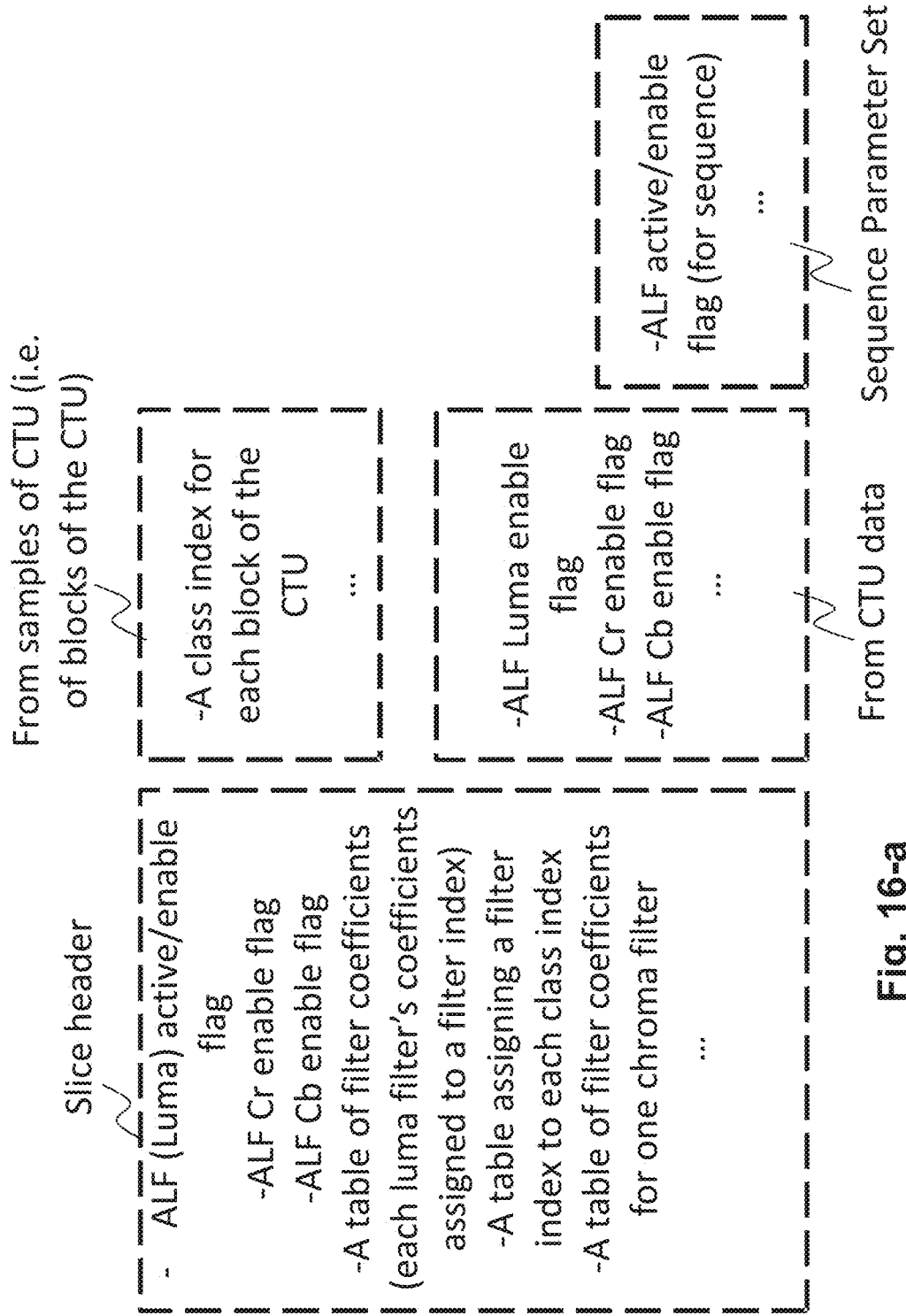
Fig. 16-a

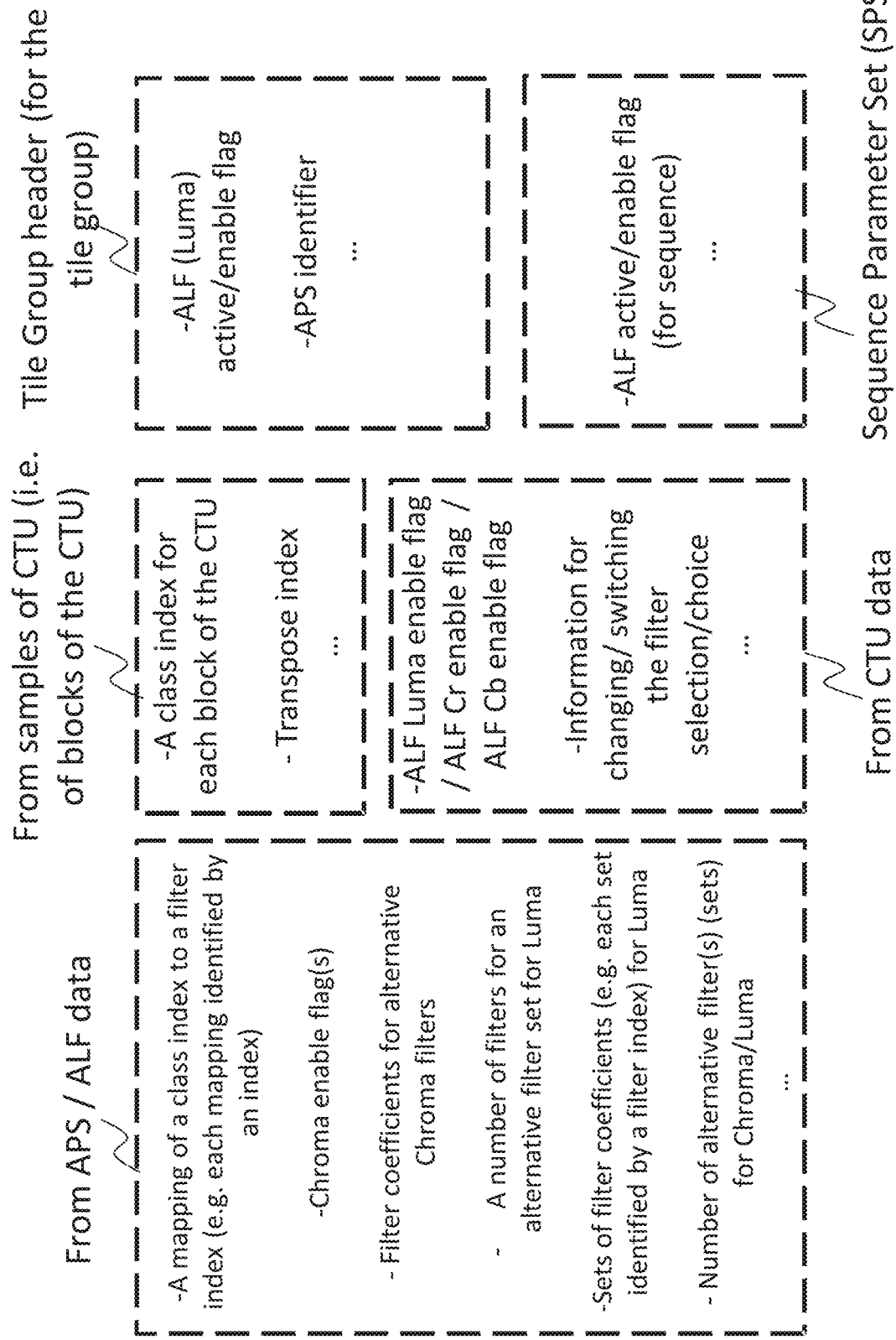
Fig. 16-b

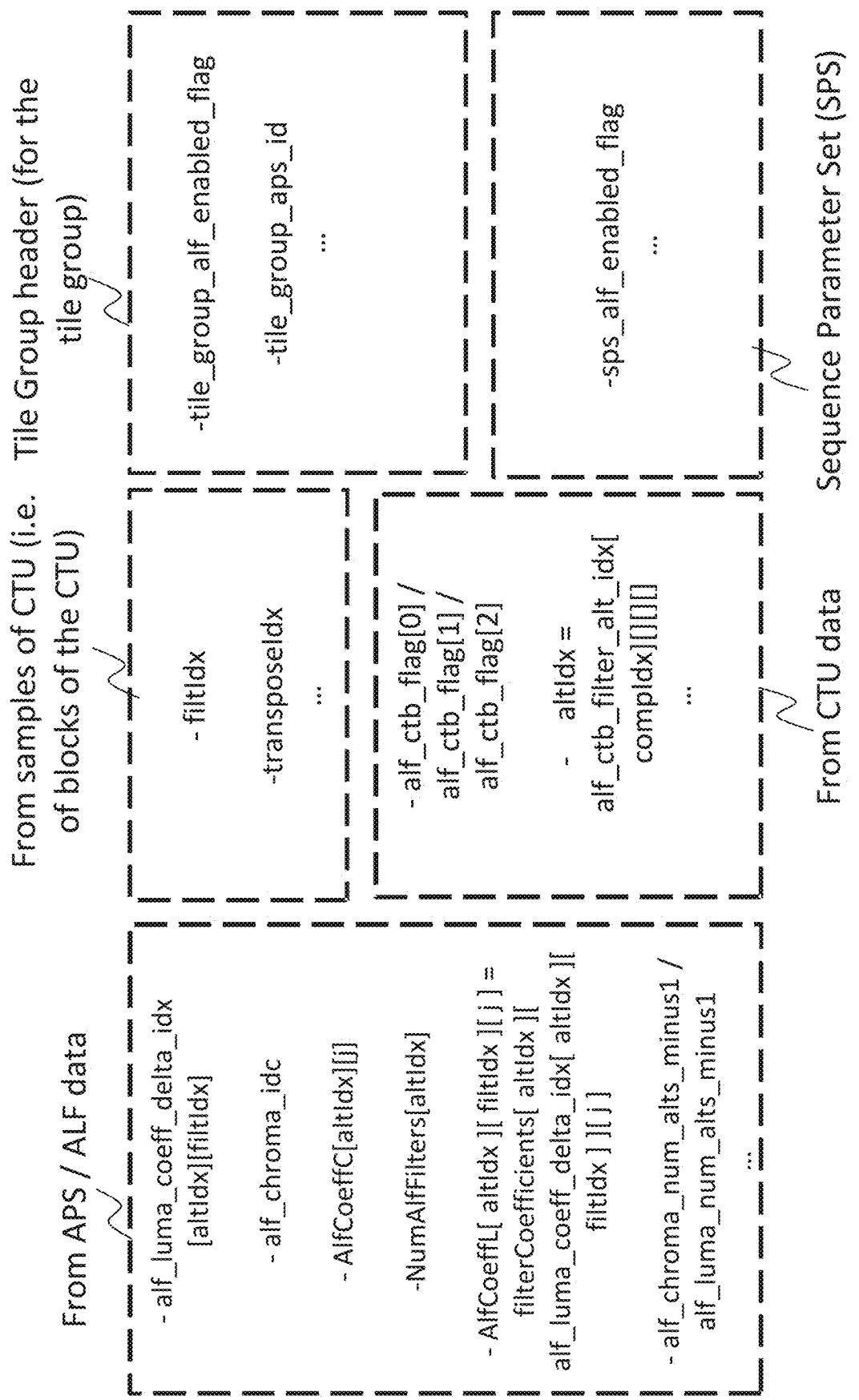
Fig. 16-c

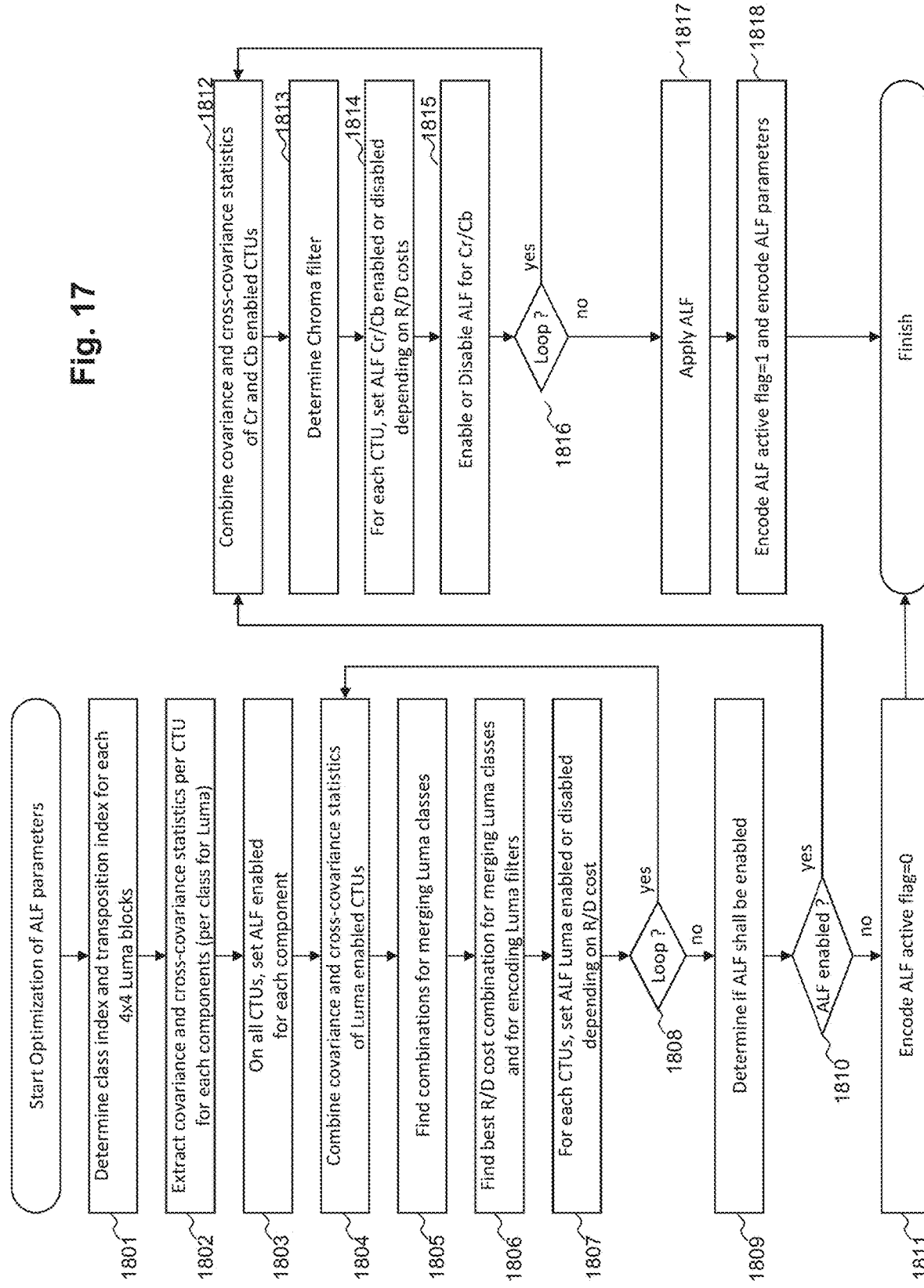

ADAPTIVE LOOP FILTER

CROSS-REFERENCE TO RELATED APPLICATIONS

This application is a continuation application of U.S. patent application Ser. No. 17/434,361, filed on Aug. 26, 2021, which is the National Phase application of PCT Application No. PCT/EP2020/055888, filed on Mar. 5, 2020 and titled "AN ADAPTIVE LOOP FILTER". This application claims the benefit under 35 U.S.C. § 119 (a)-(d) of United Kingdom Patent Application No. 1903187.1, filed on Mar. 8, 2019, United Kingdom Patent Application No. 1903584.9, filed on Mar. 15, 2019, United Kingdom Patent Application No. 1908937.4, filed on Jun. 21, 2019, and United Kingdom Patent Application No. 1919037.0, filed on Dec. 20, 2019. The above cited patent applications are incorporated herein by reference in their entirety.

FIELD OF INVENTION

The present invention relates to encoding or decoding of blocks of a video component. Embodiments of the invention find particular, but not exclusive, use when controlling a filter for filtering samples of such component. In particular, but not exclusively, controlling an adaptive loop filter.

BACKGROUND

A video coding includes image coding (an image is equivalent to a single frame of a video). In video coding, some coding tools such as a quantization of transform coefficients or motion compensation (which is often performed using interpolation filters) often introduce distortion biases/effects (distortions that seem systematic or at least that are not random in a given context). In order to compensate for those biases/artefacts and improve (or at least maintain a good level of) coding efficiency some specific coding tools, called post-filters or in-loop filters, are used. A Deblocking filter (DBF), a sample adaptive offset (SAO) filter or an adaptive loop filter (ALF) are some examples of such coding tools. In-loop filters are applied within a coding loop so that the image quality increase they provide for a current frame enables an increased coding efficiency for next frames which are coded based on the current one. For instance, quantisation of DCT coefficients is efficient for video compression but it often introduces blocking artefacts (biases) on the boundaries of compressed blocks of samples. The Deblocking filter reduces undesirable effects arising from such artefacts. Deblocking (using the DBF) a decoded frame within the coding loop (before it serves as a reference frame for the motion compensation for another frame) increases the coding efficiency of motion compensation significantly compared to deblocking the frame out of the coding loop (e.g. just before displaying it for instance).

The present invention relates particularly to the adaptive loop filter (ALF), such as the linear ALF or its non-linear extension, which is also applied as an in-loop filter to reduce undesirable compression artefacts in decoded frames/images. ALF has been studied by the Video Coding Experts Group/Moving Picture Experts Group (VCEG/MPEG) standardisation groups, and it is being considered for use in the Versatile Video Coding (VVC) standard, for example in the third version of the VVC Test Model software (VTM-3.0 or VVC Draft version 3).

SUMMARY OF THE INVENTION

It is an aim of embodiments of the present invention to address one or more problems or disadvantages of the foregoing encoding or decoding of blocks of a video component.

Although the linear ALF and its non-linear extension are efficient coding tools, their design can be improved to allow for even more coding efficiency, and/or offer more flexibility to the encoding/decoding software/devices.

According to aspects of the present invention there are provided an apparatus/device, a method, a program, a computer readable storage medium, and a signal as set forth in the appended claims. Other features of the invention will be apparent from the dependent claims, and the description.

According to a first aspect of the present invention, there is provided a method of controlling an adaptive loop filter (ALF), the method comprising obtaining for a slice containing one or more coding tree blocks, data indicating a number of available alternative chroma filters, obtaining for a coding tree block in the slice, alternative filter index identifying one of the available alternative chroma filters, and selecting the alternative chroma filter identified by the index to filter chroma image data in the coding tree block. By signalling alternative filters for chroma components better compromise between filtering quality of the ALF may be improved while still maintaining good coding efficiency. The chroma image data may be provided in image data comprising one or more images. The image data may be video data comprising a sequence of images (i.e. frames).

The method may comprise imposing a limit of 8 on the maximum allowed number of alternative chroma filters which may be indicated. This provides a surprising good improvement in quality versus coding efficiency despite the requirements for storing and signalling 8 chroma filters.

The data indicating the number of alternative chroma filters available may be provided in an adaptation parameter set. The adaptation parameter set may be identified in a slice header. Thus, the number of alternative chroma filters may be controlled at the slice level.

The method may comprise obtaining chroma filter coefficients for the one or more chroma filters indicated as being available. For example, six chroma filter coefficients may be obtained for the one or more chroma filters. The chroma filter coefficients may be provided in an adaptation parameter set (APS). Accordingly, the chroma filter coefficients may be effectively signalled/provided for a number of available chroma filters as indicated by the obtained data i.e. signalled/provided in a bitstream.

In some embodiments, a flag may be obtained for the one or more chroma filters, the flag indicating whether a respective chroma filter is a linear or non-linear filter. One or more clipping parameter value indices may be obtained for the one or more chroma filters when the obtained flag indicates that the chroma filter is non-linear. The clipping parameter value index of a non-linear chroma filter may associate a table of clipping values with the non-linear filter concerned. Thus, an efficient method is provided for each Chroma filter to indicate if the Chroma filter is linear or non-linear and where the Chroma filter is non-linear, providing/signalling clipping parameters for the Chroma filter are provided (e.g. by providing/signalling the clipping parameter values in the bitstream). Such a restriction may be imposed on clipping parameter values to reduce the encoder complexity and the encoding cost with few detrimental effects to the image quality.

The number of alternative chroma filters may be used to obtain the alternative filter index. The alternative filter index may be provided in the bitstream according to a truncated unary binarization, for example. This allows the bitstream to be effectively parsed. For example, in the case of the unary coding, a termination zero "0" is always put after the ones "1s" representing the alternative index value, unless the alternative filter index is equal to the number of alternatives minus one. In other words, the number of "1s" are read until the number of alternatives minus one "Is" are read, or a termination zero "0" is decoded. Thus, a decoder can always parse the values even when the number of allowed alternatives can vary In a second aspect of the present invention, there is provided a method of encoding image data into a bitstream, the method comprising controlling an Adaptive Loop Filter according to the method of the first aspect.

In a third aspect of the present invention, there is a provided a method of decoding image data from a bitstream the method comprising controlling an Adaptive Loop Filter according to the method of the first aspect.

In a fourth aspect of the present invention, there is provided a device for controlling an Adaptive Loop Filter configured to perform the method of the first aspect.

In a fifth aspect of the present invention, there is provided a device for encoding image data into a bitstream, the device being configured to encode image data according to the method of the second aspect.

In a sixth aspect of the present invention, there is provided a device for decoding image data from a bitstream, the device being configured to decode image data according to the method of third aspect.

In a seventh aspect of the present invention, there is provided a program which, when run on a computer or processor, causes the computer or processor to carry out the method of any one of the first, second or third aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

According to a first additional aspect of the present invention, there is provided a method of controlling an Adaptive Loop Filter for one or more image portions of an image, the method comprising: obtaining first information for identifying a first filter useable on a block of a first image portion; obtaining, for the first image portion, one or more of second information for indicating whether to change the first filter selection, or third information for identifying a second filter; and determining one or more of whether to use the first filter based on the second information, or whether to use the second filter on said block based on the third information.

Optionally, the method of controlling an Adaptive Loop Filter further comprises, for the block: selecting the first filter based on the second information; or selecting the second filter based on the second information (e.g. when only the first and second filters are available for use for the block/first image portion) or third information (e.g. when more than two filters are determinable for the block/first image portion so that there is at least another third filter that could be used on the block). Optionally, when the second information indicates to change the first filter selection, an identity filter is used instead and/or the third information is obtained. Optionally, the Adaptive Loop Filter uses a linear function (filter), i.e. its output is a linear combination of input sample values. Optionally, the Adaptive Loop Filter uses a nonlinear function (filter), i.e. its output depends on a nonlinear combination of at least some of its input sample values. Optionally, the Adaptive Loop Filter introduces nonlinearity by using a nonlinear combination of at least some input sample values as its input.

Optionally, one of the first and second filter is a linear filter and the other is a nonlinear filter. Optionally, the first information comprises one or more of a filter identifier for the first filter, or information for indicating a class or group to which the block or the first image portion belongs, each class or each group being associated with a filter identifier. Preferably, the class or the group for the block is associated with the filter identifier for the first filter. Optionally, the first information comprises one or more of a filter index and the a class index. Optionally, each class index is associated with a filter index (e.g. a filter index of the first filter). Optionally, the second information and/or the third information are provided for each filter identifier or each class or group.

Optionally, the obtaining first information comprises processing samples of the first image portion to determine a class or group for the block. Optionally, the second information comprises a filter switch flag and/or the third information comprises an alternative filter index. Optionally, the one or more image portions is a tile group. Optionally, the first image portion is a Coding Tree Unit. Optionally, a block of the first image portion is a 4 sample by 4 sample block. Optionally, the block of the first image portion is a luma sample block. Alternatively, the block of the first image portion is a chroma sample block.

Optionally, one or more of: filter coefficients for the first filter; filter coefficients for the second filter; the second information; and the third information, are provided in a bitstream. Optionally, one or more of the filter coefficients for the first filter and the filter coefficients for the second filter are included in an Adaptation Parameter Set. Optionally, one or more of the second information and the third information are included in Coding Tree Unit data Optionally, a reference to the Adaptation Parameter Set is included in a tile group header. Optionally, the first information comprises one or more of a filter index and the a class index. Optionally, each class index is associated with a filter index. Alternatively, the filter coefficients for the first filter are included in a first Adaptation Parameter Set, the filter coefficients for the second filter are included in a second Adaptation Parameter Set different from the first Adaptation Parameter Set, and the third information comprise a reference (which is included in the tile group) to one of the first Adaptation Parameter Set or to the second Adaptation Parameter Set.

Optionally, the method further comprises determining whether the Adaptive Loop Filter is enabled for the first image portion; and when the Adaptive Loop Filter is enabled for the first image portion, performing the obtaining and determining steps.

According to a second additional aspect of the present invention, there is provided a method of controlling an Adaptive Loop Filter for one or more image portions of an image, the method comprising: obtaining class information for indicating a class or group to which a block of a first image portion belongs, said class information being obtainable by processing a plurality of samples of the first image portion; obtaining filter information for identifying a set of filter coefficients; and controlling the Adaptive Loop Filter using the class information and the filter information, wherein the obtained class information is associated with the processed filter information for identifying a first set of filter coefficients, and the controlling comprises: obtaining one or more of information for associating the obtained class information with different filter information from the processed filter information, or information for indicating use or no use the first set for the obtained class information or for the obtained filter information; and controlling to not use the first set with the Adaptive Loop Filter based on the obtained said one or more information. Optionally, one or more of the filter information, the set of filter coefficients, different filter information, and the obtained one or more information are provided in a bitstream. Optionally, one or more of the filter information, the set of filter coefficients, and different filter information are included in an Adaptation Parameter set, and the obtained one or more information are included in Coding Tree Unit data.

According to a third additional aspect of the present invention, there is provided a method of processing one or more image portions of an image, an image portion having associated therewith chroma samples and luma samples, wherein the method comprises determining, based on information obtained from a bitstream or a first sample value and its one or more neighbouring sample value(s) of the image portion, at least one of: whether to use or not use an Adaptive Loop Filter controlled using the method according to the first aspect or the second aspect; enabling or disabling use of said Adaptive Loop Filter; or a filtering parameter for use with said Adaptive Loop Filter when filtering on the first sample value.

According to a fourth additional aspect of the present invention, there is provided a method of encoding one or more image(s), the method comprising, for one or more image portions of an image, controlling an Adaptive Loop Filter according to the first aspect or the second aspect, or processing according to the third aspect. Optionally, the method further comprises: receiving an image; encoding the received image and generating a bitstream; and processing the encoded image, wherein the processing comprises the controlling according to the first additional aspect or the second additional aspect, or the processing according to the third additional aspect. Optionally, the method further comprises providing, in a bitstream, one or more of: filter coefficients for the first filter; filter coefficients for the second filter; the second information; and the third information.

According to a fifth additional aspect of the present invention, there is provided a method of decoding one or more image(s), the method comprising, for one or more image portions of an image, controlling an Adaptive Loop Filter according to the first additional aspect or the second additional aspect, or processing according to the third additional aspect. Optionally, the method further comprises: receiving a bitstream; decoding information from the received bitstream to obtain an image; and processing the obtained image, wherein the processing comprises the controlling according to the first aspect or the second aspect, or the processing according to the third aspect. Optionally, the method further comprises obtaining, from a bitstream, one or more of: filter coefficients for the first filter; filter coefficients for the second filter; the second information; and the third information.

According to a sixth additional aspect of the present invention, there is provided a method of controlling an Adaptive Loop Filter for one or more image portions of an image, the method comprising: obtaining first information for identifying a first filter useable on a block of a first image portion and second information for indicating a count of filter sets, each filter set comprising one or more filter(s); obtaining, for the first image portion, third information for identifying a second filter from one of the filter sets; and controlling to use the second filter on said block based on the second information and the third information. Optionally, one or more of the filter sets are for Luma component samples. Optionally, one or more of the filter sets are for Chroma component samples. Optionally, the filter sets are for Luma component samples. Optionally, the filter sets are Luma filter set alternatives. Alternatively, the filter sets are for Chroma component samples. Optionally, the filter sets are for samples of one of two Chroma components (e.g. Cb and Cr). Optionally, the filter set are Chroma filter alternatives. Optionally, each filter set consists of one Chroma filter alternative. It is understood that when each filter set consists of one Chroma filter alternative, such a filter set may also be referred to as a Chroma filter alternative.

Optionally, the count of filter sets is determinable using the number of image portions or the number of blocks included in the image. Optionally, the number of image portions or the number of blocks is determined for a row/column of image portions/blocks (e.g. arranged in a horizontal, vertical or diagonal line). Alternatively, the number of image portions or the number of blocks is determined for a larger image portion or the whole image (e.g. arranged in a rectangular larger image portion or in a rectangular image). Optionally, the obtaining the second information comprises determining the number of image portions or the number of blocks in the image, and determining the count based the determined number.

Optionally, the second information is obtained from a bitstream. Optionally, one of the first and second filter is a linear filter and the other is a nonlinear filter.

Optionally, the first information comprises one or more of a filter identifier for the first filter, or information for indicating a class or group to which the block or the first image portion belongs, each class or each group being associated with a filter identifier. Optionally, the third information is provided for each filter identifier or each class or group.

Optionally, the obtaining first information comprises processing samples of the first image portion to determine a class or group for the block. Optionally, the third information comprises an alternative filter index. Optionally, the one or more image portions is a tile group; the first image portion is a Coding Tree Unit; and/or a block of the first image portion is a 4 sample by 4 sample block.

Optionally, one or more of: filter coefficients for the first filter; filter coefficients for the second filter; the first information; the second information; and the third information, are provided in a bitstream. Optionally, one or more of the second information, the filter coefficients for the first filter, and the filter coefficients for the second filter are included in an Adaptation Parameter Set; and/or the third information is included in Coding Tree Unit data; and/or a reference to the Adaptation Parameter Set is included in a tile group header.

Optionally, the method further comprises determining whether the Adaptive Loop Filter is enabled for the first image portion; and when the Adaptive Loop Filter is enabled for the first image portion, performing the obtaining and determining step.

According to a seventh additional aspect of the present invention, there is provided a method of controlling an Adaptive Loop Filter for one or more image portions of an image, the method comprising: obtaining class information for indicating a class or group to which a block of a first image portion belongs, said class information being obtainable by processing a plurality of samples of the first image portion; obtaining count information for indicating a number of filter sets, each filter set comprising one or more filter(s); obtaining filter information for identifying a filter, the filter having a set of filter coefficients; and controlling the Adaptive Loop Filter using the class information, the count information and the filter information, wherein the obtained class information is associated with the obtained filter information identifying a first filer, and the controlling comprises: obtaining information for associating the obtained class information with another filter information different from the obtained filter information, the other filter information identifying a second filter from one of the filter sets; and controlling to use the second filter on said block based on the count information and the other filter information.

Optionally, one or more of: the count information; the filter information; one or more set(s) of filter coefficients for the one or more filter(s); the other filter information; and the obtained information for associating the obtained class information with the other filter information, are provided in a bitstream. Optionally, one or more of: the count information; the filter information; one or more set(s) of filter coefficients for the one or more filter(s); and the other filter information, are included in an Adaptation Parameter set, and the obtained information for associating the obtained class information with the other filter information, are included in Coding Tree Unit data.

According to an eighth additional aspect of the present invention, there is provided a method of processing one or more image portions of an image, an image portion having associated therewith chroma samples and luma samples, wherein the method comprises determining, based on information obtained from a bitstream or a first sample value and its one or more neighbouring sample value(s) of the image portion, at least one of: whether to use or not use an Adaptive Loop Filter controlled using the method according to sixth aspect or the seventh aspect; enabling or disabling use of said Adaptive Loop Filter; or a filtering parameter for use with said Adaptive Loop Filter when filtering on the first sample value.

According to a ninth additional aspect of the present invention, there is provided a method of determining a count of filter sets by assessing one or more optimization parameter(s) for use on a block or an image portion of an image, the method comprising: obtaining a first number of filter sets; associating a filter from one of the filter sets to each block of an image portion; determining, based on a Rate-Distortion comparison, whether to enable or disable an ALF for each block or for each image portion, and which filter from which filter set to associate with each block; repeating the obtaining, the associating and the determining with a second number of filter sets until the second number is one, the second number being different from the first number; and selecting (or determining) as the count of filter sets, the number of filter sets satisfying an assessment criterion. Optionally, the determining the count of filter sets uses a Rate-Distortion function. Optionally, the second number is less than the first number. Optionally, the number of filter sets is incrementally decreased as the obtaining, the associating and the determining is repeated. Optionally, the assessment criterion is based on the Rate-Distortion cost. Optionally, the optimization parameter comprises one or more of: an ALF enable flag for a coding tree block (CTB); an association of a filter set with a coding tree block; and one or more filter coefficients of filter for the coding tree block. Optionally, the ALF enable flag for a CTB comprise one of more of: an ALF Luma enable flag; an ALF Cb enable flag; and an ALF Cr enable flag. Optionally, one or more of the filter sets is/are for Luma component samples. Optionally, that one or more filter set(s) is/are Luma filter set alternative(s). Alternatively, one or more of the filter set(s) is/are for Chroma component samples. Optionally, that one or more filter set(s) is/are for samples of one of two Chroma components (e.g. Cb and Cr). Optionally, that one or more filter set(s) is/are Chroma filter alternative(s).

According to a tenth additional aspect of the present invention, there is provided a method of encoding one or more image(s), the method comprising, for one or more image portions of an image, controlling an Adaptive Loop Filter according to the sixth aspect or the seventh aspect, or processing according to the eighth aspect. Optionally, the method further comprises: receiving an image; encoding the received image and generating a bitstream; and processing the encoded image, wherein the processing comprises the controlling according to the sixth additional aspect or the seventh additional aspect, or the processing according to the eighth additional aspect. Optionally, the method further comprises providing, in a bitstream, one or more of: filter coefficients for the first filter; filter coefficients for the second filter; the first information; the second information; and the third information.

Optionally, the method further comprises determining the count of filter sets by assessing one or more optimization parameter(s) obtained using two or more filter sets with different filter set numbers. Optionally, the determining the count of filter sets uses a Rate-Distortion function. Optionally, the assessing one or more optimization parameter(s) comprises: obtaining a first number of filter sets; associating a filter from one of the filter sets to each block of an image portion; determining, based on a Rate-Distortion comparison, whether to enable or disable ALF for each block or for each image portion, and which filter from which filter sets to associate with each block; repeating the obtaining, the associating and the determining with a second number of filter sets until the second number is one, the second number being different from the first number; and selecting as the count of filter sets, the number of filter sets satisfying an assessment criterion. Optionally, the second number is less than the first number. Optionally, the number of filter sets is incrementally decreased as the obtaining, the associating and the determining is repeated. Optionally, the assessment criterion is based on the Rate-Distortion cost. Optionally, the optimization parameter comprises one or more of: an ALF enable flag for a coding tree block (CTB); an association of a filter set with a coding tree block; and one or more filter coefficients of filter for the coding tree block. Optionally, the ALF enable flag for a CTB comprise one of more of: an ALF Luma enable flag; an ALF Cb enable flag; and an ALF Cr enable flag. Optionally, one or more of the filter sets is/are for Luma component samples. Optionally, that one or more filter set(s) is/are Luma filter set alternative(s). Alternatively, one or more of the filter set(s) is/are for Chroma component samples. Optionally, that one or more filter set(s) is/are for samples of one of two Chroma components (e.g. Cb and Cr). Optionally, that one or more filter set(s) is/are Chroma filter alternative(s).

According to an eleventh additional aspect of the present invention, there is provided a method of decoding one or more image(s), the method comprising, for one or more image portions of an image, controlling an Adaptive Loop Filter according to the sixth aspect or the seventh aspect, or processing according to the eighth aspect. Optionally, the method further comprises: receiving a bitstream; decoding information from the received bitstream to obtain an image; and processing the obtained image, wherein the processing comprises the controlling according to the sixth additional aspect or the seventh additional aspect, or the processing according to the eighth additional aspect. Optionally, the method further comprises obtaining, from a bitstream, one or more of: filter coefficients for the first filter; filter coefficients for the second filter; the first information; the second information; and the third information.

According to a twelfth additional aspect of the present invention, there is provided a device for controlling an Adaptive Loop Filter for one or more image portions of an image, the device comprising a controller configured to perform the method according to the first aspect, the second aspect, the third additional aspect, the sixth additional aspect, the seventh additional aspect, the eighth additional aspect, or the ninth additional aspect.

According to a thirteenth additional aspect of the present invention, there is provided a device for encoding an image, the device comprising the control device according to the twelfth additional aspect. Optionally, the device is configured to perform the method according to any of the fourth or tenth additional aspects mentioned above.

According to a fourteenth additional aspect of the present invention, there is provided a device for decoding an image, the device comprising the control device according to the twelfth additional aspect. Optionally, the device is configured to perform the method according to any of the fifth or eleventh additional aspects mentioned above.

According to a fifteenth additional aspect of the present invention, there is provided a program which, when run on a computer or processor, causes the computer or processor to carry out the method according to the any of the first additional aspect, the second additional aspect, the third additional aspect, the fourth additional aspect, the fifth additional aspect, the sixth additional aspect, the seventh additional aspect, the eighth additional aspect, the ninth additional aspect, the tenth additional aspect, or the eleventh additional aspect.

According to a sixteenth aspect of the present invention, there is provided a computer-readable storage medium storing a computer program according to the fifteenth additional aspect.

According to a seventeenth additional aspect of the present invention, there is provided a signal carrying an information dataset for an image encoded using the method according to any of the fourth additional aspect or the tenth additional aspect mentioned above and represented by a bitstream, the image comprising a set of reconstructable samples, each reconstructable sample having a sample value, wherein the information dataset comprises control data for controlling filtering on a first reconstructable sample based on sample values of neighbouring samples of the first reconstructable sample.

Improvements to the linear ALF and its non-linear extension are sought when enabling using filters from two or more filter sets (as opposed to only one filter set). Recently Adaptation Parameter Sets (APS) were reintroduced in VVC to allow sharing of ALF parameters by multiple slices and/or multiple frames. The problem introduced by APS is that many APS (say up to N equal to 32 for instance in latest draft text) can be used and so have to be stored in the memory of the decoder. Then N times the memory required for storing ALF parameters of one APS have to be dedicated for storing the ALF parameters of up to N APS. This is too much memory for an efficient design of a hardware decoder. Hence it is desirable to find ways of reducing the memory for ALF filters. It is also desirable to improve the efficiency and flexibility of ALF while keeping a smaller memory use than currently in VVC.

According to a first further aspect of the present invention there is provided a method of controlling an Adaptive Loop Filter for filtering an image portion made up of a plurality of blocks, comprising:
  obtaining ALF parameters defining filters applicable to blocks of the image portion; and
  imposing a limit on a maximum number of filters usable for filtering the blocks of the image portion.

By imposing a limit on the maximum number of filters the memory requirement for storing the ALF parameters defining the filters can be managed, even if the number of sets of ALF parameters increases, for example as a result of needing to store two or more sets of filters. This need can stem from making available two or more alternative filter sets or because ALF parameters from two or more instances of APS can be used.

One embodiment further comprises obtaining information applicable to a group of blocks within the image portion, the information indicating a filter identity, selection or change or indicating enabling or disabling of a filter.

This can enable coding gains. A group of blocks may, for example, be a Coding Tree Block (CTB) such as a luma CTB. The image portion may comprise any number of such groups (CTBs) and ALF parameters may be defined for the image portion. For example a slice, frame, two or more frames, tile group, or indeed any plurality of units (e.g. Coding Tree Units, or CTUs) may constitute an image portion. Then, ALF parameters may be provided in common for the image portion and yet at the level of a group of blocks (e.g. CTU) individual information applicable to that group may be provided. This gives a finer granularity of control of the ALF filtering.

In one embodiment, two or more alternative filters are available for at least one ALF class.

In another embodiment, two or more sets of alternative filters are available, the two or more sets providing respective alternative filters for each of a plurality of filter indexes or ALF classes.

The information obtained for the group of blocks in the two preceding embodiments may indicate which set of alternative filters to use for filtering the blocks of the group concerned.

Various ways of imposing the limit are contemplated. One embodiment involves imposing a collective limit on the maximum number of filters for all the sets. Another embodiment involves imposing an individual limit per set on the maximum number of filters in the set. And yet another embodiment involves imposing a limit on the maximum number of filters in a largest one of the sets.

In some embodiments the sets all have to have the same numbers of filters. In this case, a limit for a set applies to all sets. In other implementations the sets can have different numbers of filters. In this case, it can be effective to impose progressively lower limits on the maximum number of filters in successive ones of the sets.

The ALF parameters may be provided for a slice or for a tile group.

The ALF parameters may be provided in an Adaptation Parameter Set (APS). ALF parameters provided by two or more APSs may be stored simultaneously.

Particular limit values are also contemplated. These particular values may apply to a collective limit or to a per-set limit. They may also apply even when there are not alternative sets, i.e. to the maximum number of filters that may be signalled/available.

In one embodiment the maximum number is smaller than a number of ALF classes.

In another embodiment the maximum number is 13.

In another embodiment the maximum number is 7.

In another embodiment the maximum number is 13 or less.

In another embodiment the maximum number is 7 or less.

These values manage the numbers of filters to approximately one-half or one-third of the number of classes. The limit may be per set or a collective limit.

In another embodiment the maximum number is greater than or equal to 3. This keeps the possibility to have at least one filter for homogeneous areas, one filter for diagonal orientation areas and one filter for horizontal and vertical orientation areas.

In another embodiment the maximum number is an odd number. This enables the possibility to have one filter for homogeneous areas, and the same number of filters for diagonal orientation areas as the number of filters for horizontal and vertical orientation areas.

In another embodiment the maximum number of filters for chroma is 7. Such a limit value can preserve a good trade-off between the memory needed to store these Chroma filters in the adaptive parameter set (APS) and the coding efficiency brought by additional Chroma filters.

In another embodiment the maximum number of filters for chroma is 6. Such a limit value reduces the memory needed to store these Chroma filters in the adaptive parameter set (APS) still further, whilst still preserving the coding efficiency benefits brought by additional Chroma filters.

In an embodiment, a having first and second alternative sets may involve imposing on the first set a maximum number of filters in the set in the range from 3 to 7; and imposing on the second set a maximum number of filters in the set in the range from 1 to 7 and less than or equal to the imposed maximum number of filters for the first set.

It is not essential to limit each set. For example, when there are first and second alternative sets, it is contemplated to impose no limit on the maximum number of filters in the first set (i.e. allowing 25 or whatever is the number of ALF classes) and imposing a limit on the maximum number of filters in the second set. In this case the limit for the second set may be one of: 13, 7, 5, 3, 2 and 1.

According to a second further aspect of the present invention there is provided a method of encoding a sequence of images comprising controlling an Adaptive Loop Filter using a method according to the first further aspect of the invention.

Some embodiments further comprise sending to a decoder in a bitstream information about the imposed limit(s). Of course, if the limit(s) is/are fixed, it is not necessary to send it/them in the bitstream.

According to a third further aspect of the present invention there is provided a method of decoding a sequence of images comprising controlling an Adaptive Loop Filter using a method according to the first further aspect of the invention.

Some implementations further comprise receiving from an encoder in a bitstream information about the imposed limit(s). Of course, if the limit(s) is/are fixed, it is not necessary to receive it/them in the bitstream.

According to a fourth further aspect of the present invention there is provided a device (e.g. circuitry or an integrated circuit) for controlling an Adaptive Loop Filter for filtering an image portion made up of a plurality of blocks, comprising:

means for obtaining ALF parameters defining filters applicable to blocks of the image portion; and means for imposing a limit on a maximum number of filters usable for filtering the blocks of the image portion.

According to a fifth further aspect of the present invention there is provided an encoder for encoding a sequence of images, the encoder comprising an Adaptive Loop Filter for filtering an image portion made up of a plurality of blocks and further comprising a device according to the fourth further aspect of the invention for controlling the Adaptive Loop Filter.

According to a sixth further aspect of the present invention there is provided a decoder for decoding a sequence of images, the decoder comprising an Adaptive Loop Filter for filtering an image portion made up of a plurality of blocks and further comprising a device according to the fourth further aspect of the invention for controlling the Adaptive Loop Filter.

According to seventh further aspect of the present invention there is provided a signal (e.g. bitstream) carrying Adaptive Loop Filter (ALF) parameters defining filters applicable to blocks of an image portion and also carrying information about a limit imposed on a maximum number of filters usable for filtering the blocks of the image portion.

The signal preferably further carries information applicable to a group of blocks within the image portion, the information indicating a filter identity, selection or change or indicating enabling or disabling of a filter.

In such a case, the information obtained for the group of blocks may indicate which one of two or more (sets of) alternative filters to use for filtering the blocks of the group concerned.

Some aspects of the invention mentioned above relate to imposing at least one limit on the maximum number of filters usable for filtering the blocks of an image portion. These aspects have the effect of managing the memory requirement of ALF filters. These aspects can be useful no matter what kind of ALF filter is employed, e.g. linear, nonlinear etc.

In ALF filtering, nonlinear filters are considered to be useful. This is because introducing nonlinearity can improve filtering results by giving a better compromise between filtering quality and coding efficiency. However, these nonlinear filters require additional parameters to define the nonlinearity and may therefore involve signalling and storing more parameters than linear filters. Further aspects of the invention described next relate to measures for controlling the memory requirement when the Adaptive Loop Filter uses at least one nonlinear filter.

According to a first yet further aspect of the present invention there is provided a method of performing Adaptive Loop Filtering (ALF) on an image portion, comprising:

for at least one ALF class, using a non-linear filter; and imposing a limit on a maximum number of filters usable for performing ALF on the image portion.

In such a method, by limiting the number of filters the same effects as in the first aspect of the invention can be obtained. The benefits are enhanced because nonlinear filters have further parameters for defining the nonlinearity. Limiting the sets of filters therefore limits the sets of nonlinearity-defining parameters (e.g. clipping values) that have to be signalled and stored.

All the embodiments (including two or more alternative sets, a collective limit, limits per set, particular values for the limit(s)) described above in relation the first further aspect are applicable to the first yet further aspect.

According to a second yet further aspect of the present invention there is provided a method of performing Adaptive Loop Filtering (ALF) on an image portion, comprising:

using a first non-linear filter for one or more first ALF classes and using a second non-linear filter for one or more second ALF classes different from the first ALF classes; and sharing one or more parameters defining the non-linear filtering between the first and second non-linear filters.

This second yet further aspect limits the sets of nonlinearity-defining parameters (e.g. clipping values) that have to be signalled and stored. It does not require imposing a limit on a maximum number of filters usable for performing ALF on the image portion as in the first yet further aspect but of course the first yet further aspect and the second yet further aspect may be used in combination with one another.

In one embodiment the non-linear filters each use a clipping function and at least one clipping value used by a clipping function is shared between the first and second non-linear filters.

In another embodiment a table of clipping values is shared between the first and second non-linear filters.

Preferably each said non-linear filter has an index associating a table of clipping values with the non-linear filter concerned.

According to a third yet further aspect of the present invention there is provided a method of performing Adaptive Loop Filtering (ALF) on an image portion, comprising:

for at least one ALF class, using a non-linear filter, wherein the non-linear filter uses a clipping function; and imposing a limit on a maximum number of clipping values usable for performing ALF on the image portion.

This third yet further aspect limits the clipping values that have to be signalled and stored. It does not require imposing a limit on a maximum number of filters usable for performing ALF on the image portion as in the first further aspect. Nor does it require sharing one or more parameters defining the non-linear filtering between the first and second non-linear filters as in the second further aspect but of course the first yet further aspect and/or the second yet further aspect may be used in combination with the third yet further aspect.

According to a fourth yet further aspect of the present invention there is provided a method of performing Adaptive Loop Filtering (ALF) on an image portion, comprising:

for at least one ALF class, using a non-linear filter; wherein the non-linear filter uses a clipping function and the clipping function uses fixed clipping values.

This fourth yet further aspect limits the clipping values that have to be signalled and stored. It does not require imposing a limit on a maximum number of clipping values usable for performing ALF on the image portion as in the third further aspect. Nor does it require imposing a limit on a maximum number of filters usable for performing ALF on the image portion as in the first further aspect. Nor does it require sharing one or more parameters defining the non-linear filtering between the first and second non-linear filters as in the second further aspect but of course the first yet further aspect and/or the second yet further aspect and/or the third further aspect may be used in combination with the fourth yet further aspect.

Preferably, the non-linear filter has an index to associate a predetermined table of clipping parameters with the non-linear filter concerned.

The first to fourth yet further aspects of the present invention each concern a method of performing Adaptive Loop Filtering (ALF) on an image portion. The method may be used in a method of encoding a sequence of images or in a method of decoding a sequence of images. Also, an encoder which carries out the encoding method and a decoder which carries out the decoding method are contemplated. Similarly, programs which when executed by a processor or computer cause the processor or computer to carry out the methods are contemplated. Further, at least for the first and third yet further aspects, a signal (e.g. bitstream) carrying the applicable limit(s) is contemplated.

Yet further aspects of the present invention relate to programs which when executed by a computer or processor cause the computer or processor to carry out any of the methods of the aforementioned aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present invention relate to a camera comprising a device according to any of the aforementioned device aspects. According to yet another aspect of the present invention there is provided a mobile device comprising a device according to any of the aforementioned device aspects and/or a camera embodying the camera aspect above.

Any feature in one aspect of the invention may be applied to other aspects of the invention, in any appropriate combination. In particular, method aspects may be applied to apparatus aspects, and vice versa. Furthermore, features implemented in hardware may be implemented in software, and vice versa. Any reference to software and hardware features herein should be construed accordingly. Any apparatus feature as described herein may also be provided as a method feature, and vice versa. As used herein, means plus function features may be expressed alternatively in terms of their corresponding structure, such as a suitably programmed processor and associated memory. It should also be appreciated that particular combinations of the various features described and defined in any aspects of the invention can be implemented and/or supplied and/or used independently.

BRIEF DESCRIPTION OF THE DRAWINGS

Embodiments of the invention will now be described, by way of example only, and with reference to the following drawings in which:

FIG. 3-a is a flow chart illustrating steps for filtering a Chroma component according to an embodiment of the invention;

FIG. 3-b provides a filter shape and coefficient arrangement for a Chroma filter according to an embodiment of the invention;

FIG. 4-*a* is a flow chart illustrating steps for filtering a Luma component according to an embodiment of the invention;

FIG. 4-*b* provides a filter shape and four possible coefficient arrangements for a Luma filter according to an embodiment of the invention;

FIG. 7-*a* is a block diagram illustrating a Coding Tree Unit (CTU) syntax element change according to an embodiment of the invention, which enables switching of Luma filters for each Luma filter index;

FIG. 7-*b* is a block diagram illustrating a CTU syntax element change according to an embodiment of the invention, which enables switching of Luma filters for each ALF class;

FIG. 7-*c* is a block diagram illustrating a high-level syntax element change according to an embodiment of the invention, which enables switching of Luma filters for each Luma filter index;

FIG. 7-*d* is a block diagram illustrating a high-level syntax element change according to an embodiment of the invention, which enables switching of Luma filters for each Luma filter index;

FIG. 7-*e* is a block diagram illustrating a high-level syntax element change according to an embodiment of the invention, which enables switching of Luma filters for each Luma filter index;

FIG. 8-*a* is a block diagram illustrating a CTU syntax element change according to an embodiment of the invention, which enables a luma filter selection from more than one alternative Luma filters for each Luma filter index;

FIG. 8-*b* is a block diagram illustrating a high-level syntax element change according to an embodiment of the invention, which enables a luma filter selection from more than one alternative Luma filters for each Luma filter index;

FIG. 8-*c* is a block diagram illustrating a high-level syntax element change according to an embodiment of the invention, which enables a luma filter selection from more than one alternative Luma filters for each Luma filter index;

FIG. 8-*d* is a block diagram illustrating a high-level syntax element change according to an embodiment of the invention, which enables a luma filter selection from more than one alternative Luma filters for each Luma filter index;

FIG. 8-*e* is a block diagram illustrating a high-level syntax element change according to an embodiment of the invention, which enables a luma filter selection from more than one alternative Luma filters for each Luma filter index;

FIG. 8-*f* is a block diagram illustrating a high-level syntax element change according to an embodiment of the invention, which enables a luma filter selection from more than one Luma alternative filter sets of potentially different sizes;

FIG. 16-*a*-FIG. 16-*c* are diagrams illustrating where ALF related information might be included according to some variants of the invention;

FIG. 17 is a flow chart illustrating an ALF encoding process according to an embodiment of the invention.

DETAILED DESCRIPTION

In this specification "signalling" may refer to inserting into (providing/including/encoding in), or extracting/obtaining (decoding) from, a bitstream information about one or more parameters for controlling a filter, for example use, disuse, enabling, or disabling of a mode/scheme or other filter control related information.

In this specification, the term "slice" is used as example of an image portion (other examples of such an image portion would be a tile or a tile group, which is a group/set of tile(s), each tile comprising one or more Coding Tree Unit(s)). It is understood that embodiments of the invention may also be implemented based on an image portion (e.g. a tile or a tile group), instead of a slice, and an appropriately modified parameter/value/syntax such as a header for the image portion/tile/tile group (instead of a slice header), a type of an image portion/tile/tile group (instead of a slice type), and statistics for an image portion/tile/tile group (instead of slice statistics). It is also understood that an adaptation parameter set (APS) or a tile (group) header may also be used to signal ALF parameters (or information for using ALF filtering for that slice/tile group), instead of a slice header or a sequence parameter set (SPS). When APS is used for signalling the ALF parameters (or information for using ALF filtering), the slice header or the tile group header may be used to indicate which APS has to be used for obtaining the ALF parameters (or information for using ALF filtering), for example by indicating an adaption set identifier (aps_id). It is also understood that any of a slice, a tile group, a tile, a Coding Tree Unit (CTU)/Largest Coding Unit (LCU), a Coding Tree Block (CTB), a Coding Unit (CU), a Prediction Unit (PU), a Transform Unit (TU), or a block of pixels/samples may be referred to as an image portion.

It is also understood that: when a filter or a tool is described as "active", the filter/tool is "enabled" or "available for use" or "used"; when described as "inactive", the filter/tool is "disabled" or "unavailable for use" or "not used"; and a "class" refers to a group, grouping, category, or classification of one or more elements. Further, it is also understood that when a flag is described as "active" it means the flag indicates the relevant filter/tool/filter switch/filter change is "active" (i.e "effective").

Adaptive Loop Filter (ALF)

Figure 1:
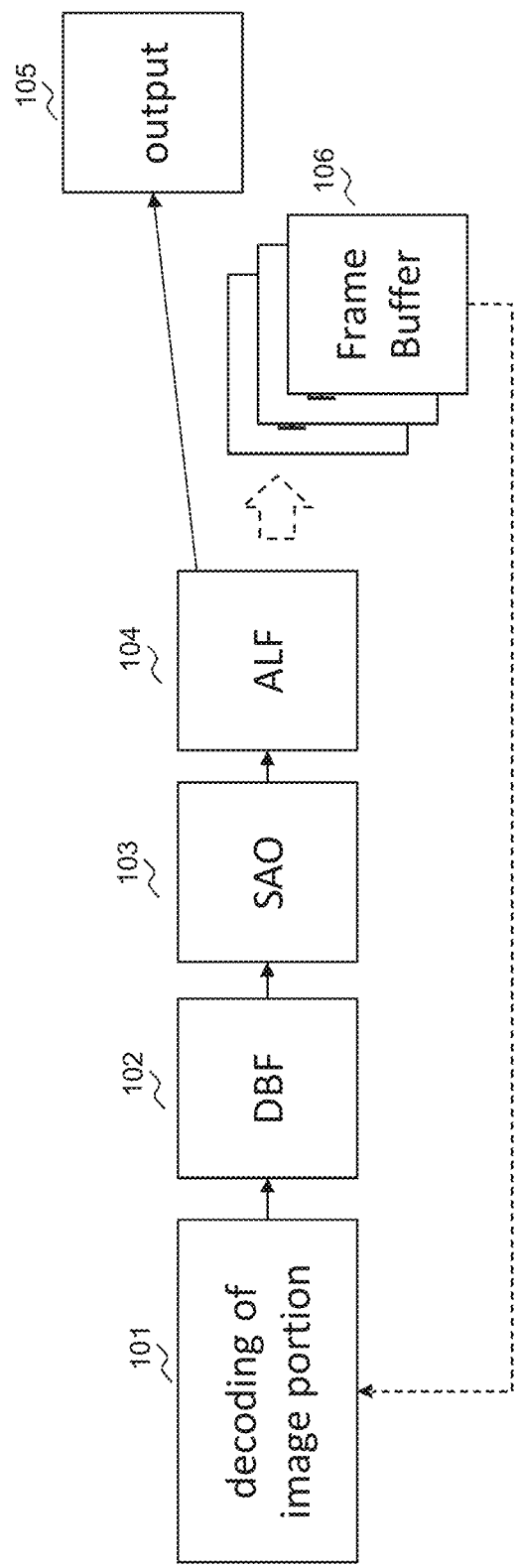
FIG. 1 shows where ALF takes place in a typical decoding loop of VTM-3.0.

FIG. 1 shows where ALF takes place in a typical decoding loop of VTM-3.0. In 101, an image portion (e.g. a slice) is decoded, in units of a coding tree unit (CTU: the largest coding unit in VVC, typically of 128×128 sample/pixel size). A CTU is split into rectangular blocks, or coding units (CU), that are encoded using a particular prediction scheme/ mode and, often, a lossy encoding of a residual block. Due to use of the block based encoding, blocking artefacts may be visible at the boundaries between encoded blocks. In 102, the decoded image portion is then processed by the DBF to reduce/remove those artefacts. Typically, to encode the residual (block) for a block prediction, the residual values are transformed using a DCT-like transform (in order to compress the residual energy in a few coefficients), and the transformed coefficients are quantized to reduce the encoding cost. This quantization often introduces some ringing artefacts in reconstructed blocks (i.e. blocks in reference frames stored in the Frame Buffer 106). In 103, the output image portion of DBF is then processed by the SAO filter, which is useful in reducing some of these artefacts at a low computational cost. In 104, the output image portion of the SAO filter is then processed by the ALF. The ALF can further reduce artefacts like "ringing" for instance. The ALF has a higher order error modelling capability but it is at a higher computational cost. The output image portion of the ALF is then sent to an output (e.g. a storage such as a frame buffer, a display or a communication interface for communicating with the display) 105. It can be put in a frame buffer 106 (as a portion of a reference frame stored therein) so that it can be used for temporal prediction (when temporal prediction tools are used). This is why DBF, SAO filter and ALF are called "in-loop" filters. An encoder may disable some of the in-loop filters so that at the decoding they may be bypassed (i.e. no filtering using the disabled tool/filter(s) is performed and the output of a step corresponding to the disabled tool is the same as its input). Also, in some cases the image portion processed is not limited to a slice but may be a full frame containing one or multiple slices, with the possibility of applying the filters across the slice boundaries (if more than one present), to reduce the artefact on those boundaries. For multi-components images (e.g. an image in YCrCb format) the DBF, SAO filter or ALF processing are applied to each component individually, and possibly differently (e.g. using a different filtering parameter to the other component).

Figure 2:
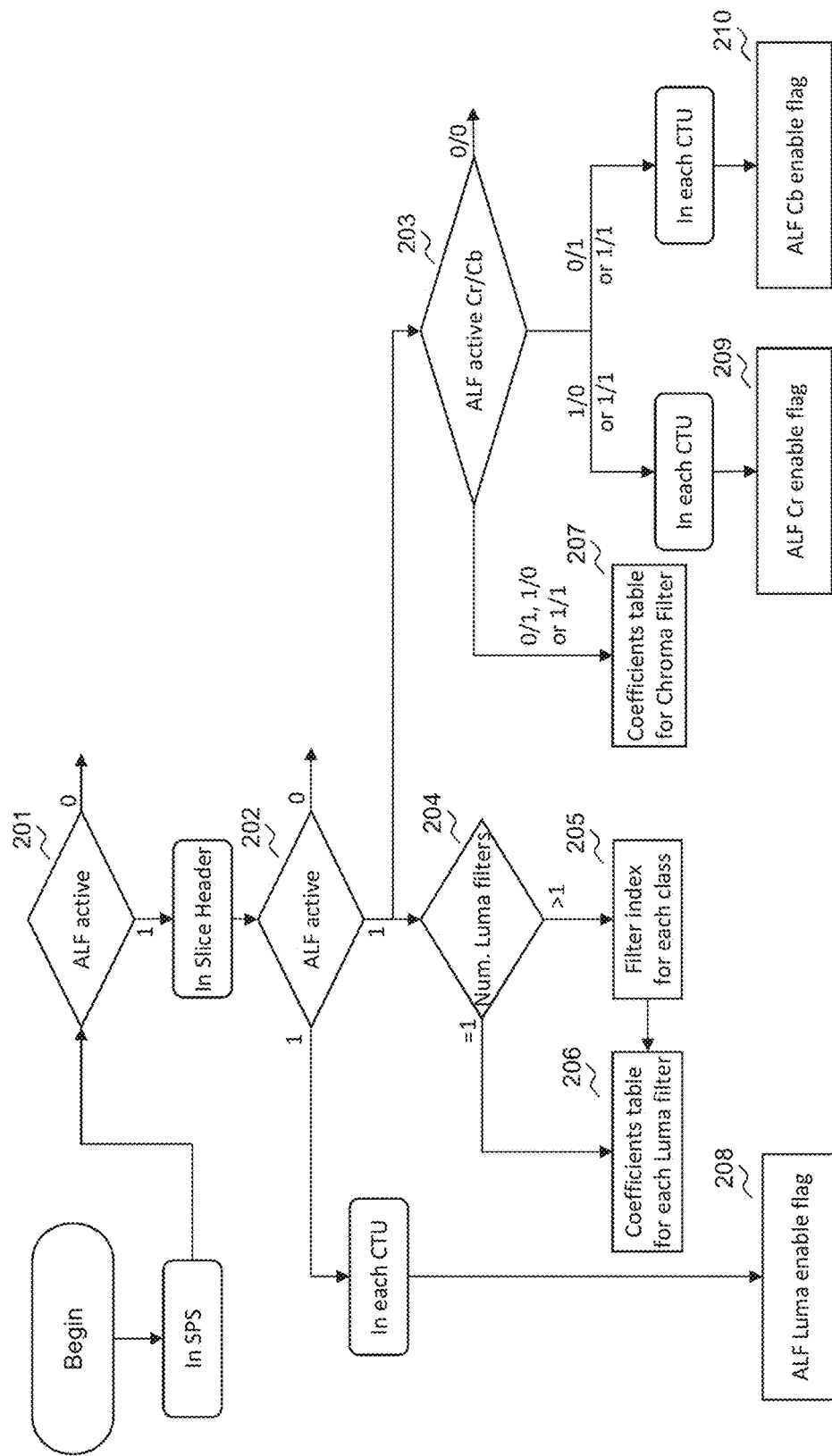
FIG. 2 is a flow chart with an overview of syntax elements that are present in VTM-3.0 for ALF.

FIG. 2 provides an overview of the syntax elements that are present in VTM-3.0 for ALF. The sequence parameter set (SPS) indicates, using a flag, if ALF tool is active (i.e. enabled) for the video sequence (201), and if so, the slice header indicates if ALF is active for the slice (202) (see FIG. 16-a, where ALF (Luma) active/enable flag corresponds to 'tile_group_alf_enabled_flag', and ALF Cb enable flag and ALF Cr enable flag are signalled inside 'alf_chroma_idc' using syntax elements in VTM-3.0) and provides filter parameters (203 to 207) for controlling the ALF. When the ALF is active in 202, it is active at least for Luma component, and Slice Header furthermore indicates if the ALF is active for each of the Chroma components (203).

The ALF may use more than one filters on a Luma component. That is more than one tables of filter coefficients may be used (and provided in slice/tile group header or in APS). In the syntax element scheme of VTM-3.0 software, one table of coefficients may be shared by more than one class and for each one of them the table of coefficients is also shared by up to four different filter configurations corresponding to four possible transpositions (e.g. orientations) of the filter (classes and transpositions are described in more details later). In the source code, the different filter configurations for a same class (i.e. the four transpositions) may not be individually distinguished (except at the time of the filtering, where filter coefficients are properly reorganized accordingly to the filter configuration/transposition index). Thus, at the syntax element level the filters for the four different configurations are considered as the same filter (because they share the same coefficients). In the following description, the same reference to a single filter is used except when explicit references to different tables of coefficients or to different filters (or filter configurations) are made. This sharing of one table of coefficients by four filters (of different configurations/orientations) in the syntax element scheme is an effective way of reducing the number of bits allocated to the filters by considering that statistics on the filtered image are the same for rotated orthogonal and/or mirror (filter/samples) configurations: i.e. one reference filter, designed for a reference sample configuration, is specified as being rotated and/or mirrored to filter orthogonal and/or mirror sample configurations. The slice header contains the number of encoded Luma filters (204) (which is one or more).

When filtering Luma samples, the ALF locally classify (categorize) samples (according to neighbouring samples' configuration) into one of twenty-five possible classes (categories/classifications/groups) to choose a filter (which is associated with/assigned to that particular class/category/classification/group) to locally apply to those samples. Here the terms "locally" classifying and "locally" applying are used to because the samples are processed in units of blocks (typically a block of 4×4 samples, e.g. in VTM-3.0) or in CUs (see FIG. 16-a). The chosen/selected Luma filter is then signalled in the a bitstream, e.g. using an index/information for identifying the chosen Luma filter and a class index determined by processing samples of a block/CTU. When the number of Luma filters used during the encoding process is greater than one, the slice header also contains one or more index(es) for identifying/selecting those Luma filters (e.g. (filter) indexes for up to twenty-five filters used for the twenty-five classes, each index corresponding to a Luma filter used for one of those classes) (205). In the case where the number of Luma filters used in the encoding process is one, this single Luma filter is applied to/used for all the classes.

Then, the slice header contains all the filter coefficients (or filter parameters) for each one of the Luma filters (206) (i.e. a coefficient table for each of the Luma filters used during the encoding process) followed by the filter coefficients for a Chroma filter (207). Note that in VTM-3.0 the two Chroma components share the same Chroma filter when ALF is active (i.e. enabled) for both Chroma components.

When ALF is active, for each one of the components on which ALF is active, the filtering can be enabled a CTU-by-CTU basis using CTU syntax (see FIG. 16-a, where ALF Luma enable flag, ALF Cb enable flag and ALF Cr enable flag corresponds to 'alf_ctb_flag[0][x][y]', 'alf_ctb_flag[1][x][y]' and 'alf_ctb_flag[2][x][y]' for a CTU at a position x and y (in horizontal and vertical CTU index position coordinates)). Inside of the encoded bitstream, for each CTU, encoded slice data includes one entropy-coded flag, per each component for which ALF is active, to indicate whether ALF is enabled on the component of that CTU (208, 209 and 210), and so whether the samples of that component of that CTU have to be filtered using the ALF or not. This flag is encoded using a context-adaptive binary arithmetic coding (CABAC). When this flag is not present (because ALF is inactive for all components or because ALF is inactive on Cr and/or on Cb), it is inferred to be zero.

In VTM-3.0, the signalling of the coefficients for the Luma filters 206 is performed as follow (e.g. using ALF related information as shown in FIG. 16-a):

[1] An 'alf coefficients delta flag' is first signalled, the flag indicating whether some filters can be disabled, and if 'alf coefficients delta flag' is zero and if the number of Luma filters is greater than 1, a 'coeff delta pred mode flag' is signalled, indicating that the filter coefficient encoding will use prediction (described in more detail later).

[2] In VTM-3.0, to encode the Luma coefficients using (exp-)Golomb codes, 3 (2 for Chroma) (exp-)Golomb configurations are used. The only parameter of (exp-)Golomb encoding is the (exp-)Golomb order (often noted 'k'). Each configuration has an (exp-)Golomb index. The parameters for an (exp-)Golomb encoding of the filter coefficient are signalled using a variable length code (VLC) for the 'minimum order' of the (exp-)Golomb codes, and then for each (exp-)Golomb index a flag to signal if the (exp-)Golomb order must be increased for that index and for the next ones (starting with 'minimum order' for the first index).

[3] Then, if 'alf coefficients delta flag' indicates some filters are enabled, a flag is signalled for each filter, indicating whether that filter is disabled (and so, not coded), or not.

[4] Then, filter coefficients are signalled for each (not disabled) filter using (exp-)Golomb codes (for signed integer) with (exp-)Golomb order taken with the (exp-)Golomb index associated to the filter coefficient index (in a fixed table) from the table storing (exp-)Golomb parameters.

In the case where a 'coeff delta pred mode flag' is signalled, it indicates that the filter coefficient encoding uses prediction. This means filter coefficients of a 'current' filter with a filter index (i.e. an index identifying each filter) greater than or equal to one are encoded as differences between the filter coefficients of the "current" filter and the filter coefficients of a previously processed filter (e.g. encoded as a filter coefficient residual value using the filter coefficients of the previously processed filter as filter coefficient predictors—i.e. using prediction). The first filter (with a filter index zero) is encoded without prediction.

The signalling of the coefficient of the Chroma filter 207 is performed similarly for the Luma filters, except that there is no 'alf coefficients delta flag', no 'coeff delta pred mode flag', and that there are two (exp-)Golomb indexes instead of 3.

In order to reduce the maximum memory that a decoder has to allocate for filter coefficients (worst case), according to embodiments of the invention, a limit is imposed on the number of signalled Luma filters (i.e. the number of coefficients table for each Luma filter 206). The limit, which may be referred to as a on "maximum number of signalled Luma filters" is lower than the number of classes. Thus Num. Luma filter 204 is less than or equal to this "maximum number of signalled Luma filters" which is less than the number of classes (i.e. less than 25 in VTM-3.0). In some variants the "maximum number of signalled Luma filters" is an odd number (to enable the possibility to have one filter for homogeneous areas, and the same number of filters for diagonal orientation areas as the number of filters for horizontal and vertical orientation areas). In one particular variant the "maximum number of signalled Luma filters" is less or equal to 13 to reduce by a factor 2 (with rounding error) the maximum number of Luma filters that the decoder has to store in memory. In another variant the "maximum number of signalled Luma filters" is less or equal to 7 to reduce by a factor greater than 3 the maximum number of Luma filters that the decoder has to store in memory. Even if less is possible it is preferable that the "maximum number of signalled Luma filters" is greater or equal to 3 in order to keep the possibility to have at least one filter for homogeneous areas, one filter for diagonal orientation areas and one filter for horizontal and vertical orientation areas.

In some variants Num. Luma filters 204 is encoded in the APS (or in the slice or tile group header) NAL unit as an encoding of the Num. Luma filters minus one (i.e a number between 0 and "maximum number of signalled Luma filters" minus one). This value may be encoded using a variable length code. Alternatively, this value may be encoded using a fixed length code. The maximum code length is determined based on the "maximum number of signalled Luma filters".

In some variants, the "maximum number of signalled Luma filters" is fixed by the codec. It does not need to be transmitted from the encoder to the decoder in this case. In some variants, it is a normative parameter, that is not explicitly transmitted from the encoder to the decoder, but that is deduced from a profile or tier level for instance, which is/are transmitted from the encoder to the decoder. Here, a tier may correspond to a throughput requirement, for example. In some variants the "maximum number of signalled Luma filters" is signalled in the bitstream (in the VPS or PPS for instance).

FIG. 3-$a$ is a flow chart illustrating steps for filtering a Chroma component according to some embodiments of the invention, and FIG. 3-$b$ provides a filter shape and coefficient arrangement for a Chroma filter according to some embodiments of the invention.

In FIG. 3-$a$, the ALF filtering is applied differently between Luma and Chroma components. Starting with a simple case, FIG. 3-$a$ provides the main steps for filtering a Chroma component. The input image portion 301 (e.g. tile or tile group) contains Chroma samples to be filtered. The Input filtering parameters 302 include ALF parameters (e.g. 'alf coefficients delta flag', 'coeff delta pred mode flag', filter coefficients, or any other flags or filter parameters for the ALF) described with reference to the ALF syntax elements in FIG. 2. Using the encoded filter coefficients for the Chroma filter, the Chroma filter is derived/obtained in 303.

In a variant, the Chroma filter has a parallelogram (e.g. a diamond) shape/pattern of size 5×5, i.e. 5 samples high and 5 samples wide (see 306 in FIG. 3-$b$). The filter coefficients of the Chroma filter are organized so that the Chroma filter has a symmetry about the centre. There are 6 encoded filter coefficients for this Chroma filter, with an index numbered from 0 to 5, which are positioned at corresponding coefficient positions shown in the figure. The superscript sign ("+" or "−") for the index number is provided so that a distinction can be made between different coefficient positions sharing the same filter coefficient, i.e. when referring to two symmetric (in the sense that they share the same filter coefficient) neighbours: $i^+$ corresponds to a neighbour sample with an index i that is encoded/decoded/processed/stored/accessed after the sample to be filtered (i.e. at the centre in the filter shape/pattern/mask/support) in a (raster) scan order; and $i^-$ corresponds to a neighbour sample with the index i that is encoded/decoded/processed/stored/accessed before the sample to be filtered in the (raster) scan order. The $7^{th}$ coefficient for the centre of the Chroma filter shape (the coefficient position with an index number 6) is deduced/derived from the other filter coefficients. The value of this 7th coefficient at coefficient position 6 is equal to $1-2 \cdot \Sigma_{i<6} w_i$, evaluated with a fixed point computation ($w_i$=filter coefficient for the index i, or position). That is, one minus two times (because of the symmetry) the sum of all the filter coefficients for coefficient positions 0-5. Thus, the sum of all the coefficients of the diamond shape, including the 7$^{th}$ coefficient, is one on which a left 7 bit shift is applied (1<<7), wherein 7 is the bit precision of the encoded filter coefficients minus one for fixed point computations. This is why only half of "the total number of filter coefficients minus one" is the number of filter coefficients which are encoded in the bitstream.

For each Chroma component sample on which ALF is active (i.e. applied), the filtering in step 304 is performed as follows to obtain an output image portion 305: for each current sample of the input image portion, if the current sample belongs to a CTU where ALF is enabled and if the neighbouring samples of current sample required for obtaining filter coefficients for the coefficient positions in the diamond shape of the Chroma filter (with the current sample being positioned at the centre of the diamond shape) are available (for instance using a border extension on the boundaries of a picture, or using neighbour slice samples if they are available on the border of the slice/tile/tile group); then, the output filtered sample, at same position as current sample I(x, y) at position (x,y), is equal to:

$$O(x, y) = \left( (1 \ll (N-1)) + \sum_{(i,j)} w(i, j) \cdot I(x+i, y+j) \right) \gg N, \quad (1)$$

where i & j are two integer offsets (horizontal and vertical) relative to the centre of the filter shape (i.e. the current sample's position at (x,y)), w(i,j) is a filter coefficient at offset (i,j), N=7 is the number of bits for an integer approximation of the decimal part of real numbers (fixed point representation) used in the representation of the filter coefficients w(i, j) at offset (i, j), I(x+i, y+j) is an input sample value at offset (i, j) relative to current sample position (x, y), O(x, y) is the output filtered sample value for position (x, y). a<<N means that a bit-shift to the left of N bits is applied to the integer value of a. It is equivalent to performing an integer multiplication by two to the power of N. a>>N means that a bit-shift to the right of N bits is applied to the integer value of a. Here, since the result of the sum inside the parentheses of the equation (1) is positive in most of the cases, so this is equivalent to performing an integer division by two to the power of N. For negative numbers, the sign is propagated when right shifting so a negative number will stay negative (at least −1). There is no non-integer part because output of the ALF are generally clipped between zero and two to the power of the bit depth, minus one. N=7 provides the decimal precision fixed in VVC for ALF computation but other values could be used in other embodiments. The effect of adding (1<<(N−1)) before performing the right shift>>N is a rounding of the fixed point result of the scalar product.

Else, output the current sample value at the same position as it is (i.e. as if without applying this ALF).

According to a variant, to reduce the number of multiplication operations performed while implementing the filter, and to simplify the notation, for an ALF filter with a filter shape which is symmetric about the centre, equation (1) can be reformulated as follow:

$$O_n = \left( (1 \ll (N-1)) + w_c \cdot I_n^c + \sum_{i=0}^{i<c} w_i \cdot \left( I_n^{i-} + I_n^{i+} \right) \right) \gg N, \quad (2)$$

where $O_n$ is the output sample at a raster scan order index/position n. By raster scan order index n, we mean an index n which is a sample index that increases from left to right in a row of samples, and then increases with each row of samples from top to bottom. $I_n^c$ is the input sample at the same position n as the output sample (and corresponds to the position of the input sample at the centre of the filter), $I_n^{i-}$ is the i-th (in the raster scan order) neighbouring input sample of $I_n^c$ in the filter shape/pattern/mask/support of the filter, with a raster scan order lower than n, and $I_n^{i+}$ is the neighbouring input sample at a mirrored spatial position of $I_n^{i-}$ about the centre position of $I_n^c$. So, the shape being symmetric about the centre means that when $I_n^{i-}$ is in the shape/pattern/mask/support of the filter, $I_n^{i+}$ is also in the same filter shape/pattern/mask/support of the filter. $w_i$ is the filter coefficient associated with the neighbouring input samples $I_n^{i-}$ and $I_n^{i+}$, $w_c$ is the filter coefficient for the centre input sample $I_n^c$, and c is the number of encoded filter coefficients (this is the same as an index value for the central filter coefficient, which is not encoded because it can be evaluated from its neighbouring filter coefficients). The values of i and the associated positions of $I_n^{i-}$ and $I_n^{i+}$ correspond to the index values and to the index values with their superscript sign ("+" or "−") in the filter shape 306 of FIG. 3-b, for instance for c which is the index of the filter coefficient at the centre of the filter shape, is i=c="6".

FIG. 4-a is a flow chart illustrating steps for filtering a Luma component according to some embodiments of the invention, and FIG. 4-b provides a filter shape and four possible coefficient arrangements for the Luma filter according to an embodiment of the invention.

FIG. 4-a illustrates the main steps of the filtering process for Luma component. The input image portion 401 contains the Luma samples to be filtered. The Input filtering parameters 402 include ALF parameters (e.g. 'alf coefficients delta flag', 'coeff delta pred mode flag', filter coefficients, or any other flags or filter parameters for the ALF) described with reference to the ALF syntax elements in FIG. 2 (also see FIG. 16-a). Before filtering, the content of the image portion is analysed in 403. The main goal of this analysis is to allow/enable determining of local content orientation and level of activity (see step 405). This allows/enables local estimation/assessment of whether the content is homogeneous or has any sharp variations (roughly the strength or contrast of the content), and of whether the content has a predominant orientation (e.g. based on edges or oriented textures), and which orientation that predominant orientation is. For example, when the same analysis as with the luma component filtering in VTM-3.0 is used, the analysis comprises a local gradient analysis using Laplacian values computed for 4 orientations (horizontal, vertical, and the two diagonals) for every two samples horizontally and vertically (i.e. on one fourth of the samples). By dividing the samples of the input image portion into blocks 404 (e.g. 4×4 samples in VTM-3.0), and using the results of the analysis, in step 405 each block is classified into one of 25 possible classes, each class being identifiable using an index (i.e. the block is categorized into one of 25 categories/classifications/groups, each of which is identifiable using a class index such as those shown in FIG. 16-b and FIG. 16-c) according to the Laplacian values computed for the samples in the block. For example, in VTM-3.0 it corresponds to using 16 Laplacian values (4 orientations on 4 samples). The classification achieves a partitioning of the activity, of the strength of the directivity and dissociates horizontal and vertical orientations from diagonal orientations. Also, in step 405, each block is associated with a transposition index. This transposition/transpose index (e.g. 'transposeIdx') seen as a complementary/additional information to the classification to fully represent/indicate the content's orientation. There are four possible transposition indexes. When the class of the block indicates that the block is either horizontal or vertical, the transposition index further indicates whether the orientation is north to south, east to west, west to east, or south to north. When the class of the block indicates that the block is diagonal, the transposition index further indicates whether the orientation is northwest to southeast, northeast to southwest, southwest to northeast, or southeast to northwest.

The class index and the transposition index may be seen as adaptive loop filter parameters for a given block of samples. Step 406 takes these parameters to derive the Luma filter that will be used for filtering each one of the samples of the block. As previously described with reference to FIG. 2 (also see FIG. 16-a), in 402 each class is associated with an index of a coefficient table for Luma filters (e.g. a filter index). To derive the Luma filter for the 4×4 block, the transposition index allows/enables to select one of the four shapes/patterns 409, 410, 411, or 412 shown in FIG. 4-b. The pattern indicates how to organize the encoded filter coefficients (e.g. based on a scan(ning) order), which are associated with the class of the block as explained in the description for 204 to 206, to build the Luma filter. The Luma Filter has a parallelogram (e.g. a diamond) shape of size 7×7. There are 12 encoded filter coefficients for each Luma filter (index numbers 0 to 11). The 13$^{th}$ coefficient for the centre of the filter shape (index number 12) is deduced/derived from the other filter coefficients in the same way as for the centre coefficient of the Chroma filter described above.

The filtering in step 407 to obtain an output image portion 408 is performed in the same way as how filtering was performed by the Chroma Filter, namely for each current block of samples, the Luma filter derived/obtained in 406 for the current block is applied on each current sample of the current block.

In both FIG. 3-b and FIG. 4-b filter shapes are symmetric about the centre pixel. This symmetry has been chosen in the design of ALF in VTM software, but in a variant of the embodiments, a non-symmetric shape could be used as well. Then, instead of sharing 7 coefficients for 13 input samples, up to 13 coefficients could be used/signalled for the same filter support/mask as in FIG. 3-b. And instead of sharing 13 coefficient for 25 input samples, up to 25 coefficient could be used for the same filter support/mask as in FIG. 4-b. In other variants, even the filter support/mask is non-symmetric. In variants the shape/pattern/support/mask of the filter are transmitted with the ALF parameters.

In other variants the filter shape/pattern/support/mask is different from a diamond shape. For instance in a variant it is a square, in another variant it is a rectangle, in yet another variant it is an hexagon, and in another variant it is an octagon.

In some variants the filter shape/pattern/support/mask are not the same for all the class orientations. In one variant the shape is a horizontal rectangle (e.g. "–") for horizontal class/transposeIdx orientation configurations, a vertical rectangle (e.g. "|") for vertical class/transposeIdx orientation configurations, a North-West South-East (NW-SE, e.g. "\") rectangle for NW-SE and SE-NW class/transposeIdx orientation configurations, a North-East South-West (NE-SW, e.g. "/") rectangle for NE-SW and SW-NE class/transposeIdx orientation configurations. In other variants, the filter shape/pattern/support/mask is a horizontal-vertical cross ("+"), a diagonal cross ("X"), a vertical segment ("|"), a horizontal segment ("–"), a diagonal segment from top-left to bottom right ("\"), a diagonal segment from top-right to bottom left ("/"), or any combination of aforementioned filter shapes/patterns/supports/masks.

From an encoder's point of view, the ALF is inspired by Wiener Filters. A Wiener Filter is a linear filter (often applied as a linear convolution filter in signal/image processing), which minimizes the mean square error between: 1) an estimated random process/variable (its output), which is a linear combination of a finite number of observed processes/variables (its inputs), and 2) a desired process/variable (its target, i.e. the original image before the artefacts have occurred). In signal/image processing, a finite impulse response (FIR) Wiener filter has applications in source separation or in denoising, for instance. In the case of image coding, the target/aim is the original image (before being altered by compression/quantization) while the inputs are samples from the compressed image we want to improve on by applying the filter.

The least squares solution for X (which is an input matrix of realisations of the observed random processes, each column containing one realization for each one of the random processes), and y (which is an output row vector which contains the realization of the desired process for the observed random process at the same column index), is $$\hat{w} = (XX^T)^{-1} Xy^T. \qquad (3)$$

The Wiener filter coefficients correspond to $\hat{w}$.

It is understood that a 'realization' is an observation or an observed value of a random variable, i.e. the value that is actually observed in practice.

In a VTM-3.0 ALF encoder, the FIR Wiener filters (or functionally equivalent Least squares solutions) are used to optimize Rate/Distortion (R/D) compromise between the coding cost of the ALF parameters (which is mainly dominated by the cost for encoding FIR filter coefficients) and the distortion gains obtained by filtering a picture using the encoded ALF parameters (i.e. using the FIR filters). If the rate for encoding ALF parameters (i.e. the coding cost) was not a concern, and if maximizing the Peak Signal to Noise Ratio (PSNR) of a given frame was the only goal (without considering temporal impacts), Wiener filters would enable achieving an optimal solution for the ALF filtering design in VTM-3.0. It is understood that an ALF encoder according to some embodiments of the invention can use the same or similar filter as a linear ALF filter of VTM-3.0 described herein with appropriate modification(s) to one or more of: its (nonlinear) filter capability; or its signalling of ALF parameters and/or control parameters/information.

FIG. 17 shows a flow chart illustrating an ALF encoding process according to an embodiment of the invention, the embodiment being implemented by modifying the ALF of VTM-3.0 described with reference to FIG. 3-a, FIG. 4-a and FIG. 6. It is understood that according to other embodiments of the invention, another ALF may be modified in the same way to implement said other embodiments.

An ALF encoding process starts by determining a class index and a transposition index for each 4×4 block of luma samples 1801.

Then statistics that will be used for deriving Wiener filters are extracted/obtained at 1802. These statistics are (auto-) covariance statistics which corresponds to $XX^T$ in equation (3), and cross-covariance statistics which corresponds to $Xy^T$ in equation (3). They are used to build/obtain/estimate (auto-) covariance matrices and cross-covariance matrices, by dividing respectively $XX^T$ and $Xy^T$ by N (the number of columns in X, i.e. the number of samples to filter). These (auto-) covariance matrices and cross-covariance matrices are built/obtained/estimated for each class and for each CTU of Luma component samples, and for each CTU of each Chroma component samples 1802. In the following description, the terms '(cross-)covariance matrix statistics' and '(cross-) covariance matrix' are interchangeably used to refer to the same thing. It is understood that the difference between these two is that the '(cross-)covariance matrix statistics' is obtained by accumulating (or summing) values while the '(cross-)covariance matrix' is also obtained by accumulating (or summing) values but then it is normalized by the number of accumulations (to estimate an Expected value).

For a given CTU/class/component, X is obtained as follow. As the shape of the filters are considered to be symmetric, the number of rows in X corresponds to the number of filter coefficients of the filter. One row (the last one) of X contains the realizations of the centre sample in the filter shape (where the centre of the filter shape belongs to the given CTU/class/component), while each other row, with index i, contains the sum of the two symmetric samples with index i in the filter shape (where the symmetric samples are neighbours of the centre of the filter shape that belongs to the given CTU/class/component). In the case of the Luma component samples, the transposition index is also used to transpose the sample positions of the filter shape according to the different shapes of FIG. 4-*b* so that each row i of X contains the sample statistics for the samples belonging to the shape of the filter with index i. For instance, for shapes of the FIG. 4-*b*, $X_{i,j}$ contains: for i<12 the sum of the two symmetric neighbours (of the jth filtered sample) with index i in the shape, and for i=12, the jth filtered sample; where $X_{i,j}$ is the value in matrix X at row i and column j.

The vector y contains all the target sample values (i.e. $y_j$ is the value of the jth sample in the source/original image before its compression).

The X matrix is not actually built/computed. Instead $XX^T$ is computed by iteratively summing the result of $X_i X_i^T$ where $X_i$ is the i-th column of X obtained for a given sample position.

The y vector is also not actually built/computed. Instead $Xy^T$ is computed by iteratively summing the result of $X_i y_i$ where $y_i$ is the i-th element of y and corresponds to the target sample value when filtering the i-th input sample using the input $X_i$.

In VTM-3.0, an ALF encoder tries to reduce the R/D cost, which is equal to D+λR for Lagrangian optimization of the rate-distortion compromise. Here, D is the distortion (quadratic error), R is the rate, and λ is determined by the encoder principally based on VTM-3.0 encoder quantization parameter (QP), on the slice type (intra or inter), and on a type of the compressed component (Luma or Chroma). The ALF encoder first tries to optimize ALF parameters by minimizing this Lagrangian R/D cost.

If the ALF reduces the cost for the Luma component, i.e. the distortion of the output slice when ALF is not active is larger than the distortion when ALF is active plus λ times the rate needed to signal the ALF parameters, then the encoder determines the ALF as active for the Luma component. Then if active for the Luma component, it tries to optimize the ALF parameters for Chroma components, to see if it can improve the R/D cost of signalling those Chroma components. Based on this, the encoder can determine whether it is better to activate/enable the ALF for each of those components or not.

According to an embodiment of the invention, the ALF encoder performs the same or functionally equivalent optimization process for its ALF parameters. According to a variant of such an embodiment, at the beginning of the ALF parameters optimization process, the ALF is set as active for all CTUs 1803. The statistics at slice level for building the covariance matrices and the cross-covariance matrices are obtained by aggregating the statistics for each CTU where ALF is active/enabled. One Matrix is computed for each class for the Luma component 1804, using the statistics obtained for all the samples of the 4×4 sample blocks classified as belonging to that class; and One Matrix is computed by aggregating (summing) the statistics of the two Chroma components for Chroma 1812.

The filter optimization process for Luma starts by looking for 25 groups of filters for combining/merging classes together, namely a first group of 25 filters, a second group of 24 filters, and so on down to a last group of 1 filter (one group for each possible number of filters) 1805. The encoder starts with one filter for each class (so 25 filters in total), which is the Wiener filter computed from the covariance and cross-covariance of samples of blocks in that class. This is the first group of 25 filters. It tries to iteratively reduce the number of the filters (one by one, and until only one is remaining, to obtain all the wanted groups) by merging the filters together, i.e. merging the filters' associated classes together to be more precise. The encoder makes the classes initially associated with two different filters to share a common filter (i.e. the encoder merges the two classes to share one associated filter). To determine which filters to merge (i.e. which classes to merge), covariance and cross-covariance statistics are determined for each filter. The encoder estimates/evaluates, for each filter associated with one or more class(es) (index(es)), the total residual error obtained after using the filter to perform filtering on all blocks of samples associated with that class(es). Then for each pair of filters (and their associated classes), the encoder computes merged covariance and cross-covariance statistics to determine the Wiener filter for the merged classes and the total residual error obtained after filtering all the blocks of samples associated with the classes index with the determined Wiener filter. Then the encoder determines two filters for which the difference between the total residual error of the merged filter (derived from statistics associated with the class(es), which are associated with the two filters) and the sum of the total residual error of those two filters (by adding one filter's total residual error with another's) is the smallest, and merges those two filters (so that this merged filter is ready for the next filter merging iterations). In short, the encoder merges (a, b), a couple of different filter statistics that minimizes:

$$\arg\min_{(a,b)}(Err(a+b) - Err(a) - Err(b)),$$

where Err(x) returns the error for the filter statistics x, and a+b is the merged statistics of the two filter statistics a and b.

Up to here, statistics, filters and errors are estimated using double precision floating point values. Now encoder tries to find the best R/D cost compromise for encoding Luma filters 1806 which, according to embodiments of the invention, shall be less than or equal to the "maximum number of signalled Luma filters". Once the 25 groups of filters/classes are determined (starting from the "maximum number of signalled Luma filters" filters to 1 filter), for each group the ALF encoder derives integer filter coefficients (for an integer value encoding and fixed point precision computations) for each filter. According to embodiments of the invention, groups of 25 filters down to but not including the "maximum number of signalled Luma filters", are not tested because there are too many filters to be signalled. But it was still needed to iteratively construct the groups/combinations of Luma classes in 1805, in order to merge efficiently filter indexes down to at most the "maximum number of signalled Luma filters". Then it searches for the best filter in terms of R/D cost compromise when different alternative coding schemes are used. A first alternative is to encode all coefficients for all filters using a (exp-)Golomb encoding. A second alternative it to use delta encoding of the filters, wherein the filter coefficients of each filter are encoded as difference with the filter coefficients of the previous filter (using (exp-)Golomb encoding). A third alternative (R/D optimized) allows to disable some filters with one flag and encodes all the filter coefficients (using (exp-)Golomb encoding) of the filters that are not disabled. The two first alternatives can lead to reduction in bitrate while the third could lead to more distortions for less bitrate.

The encoder takes/selects/chooses the filter group and encoding compromise that minimize the R/D cost.

Once the Luma filters for use are determined/selected by the encoder, for each CTU, the encoder uses CTU statistics to see if the R/D cost of filtering the Luma samples of the CTU is better than the R/D cost of not filtering the Luma samples of the same CTU. If it is not better, the ALF is disabled for the Luma samples of that CTU 1807. The encoder can then loop back at 1808 to the Luma filter optimization step for Luma while updating the slice statistics on the covariance and cross-covariance statistics of the CTU (for which the ALF is enabled) 1804. For example, in VTM-3.0, the encoder loops back 4 more times.

Depending on the R/D cost difference between applying the ALF on the Luma component sample or not, the encoder determines whether the ALF should be active/enabled for the Luma component or not at 1809.

If the ALF is to be active/enabled for the Luma component, the encoder proceeds to processing Chroma component(s) at 1810. If the ALF is to be inactive/disabled for the Luma component, the ALF is signalled as being not active/disabled at 1811 and the ALF encoding process finishes.

The ALF encoding process for the Chroma component starts with a combined statistics of the two Chroma components 1812, provided that the ALF is active/enabled for all CTUs of the slice.

The encoder then determines the Chroma filter 1813. The encoder first determines a (floating point) Wiener filter using the CTU statistics of both Chroma components. It derives integer filter coefficients. Then for each Chroma component, the encoder uses the CTU statistics to see if the R/D cost of filtering the Chroma component of the CTU is better than the R/D cost of not filtering the Chroma component of the CTU. If it is not better, the ALF is disabled for the Chroma component samples of that CTU 1814. If the encoder determines that the ALF should not be active (i.e. should be disabled) for all of the CTUs of a given Chroma component, it disables ALF on that Chroma components, and so does not need to code for each CTU the 'enable flag' which is 0, 1815.

The encoder can then loop back at 1816 to the Chroma filter optimization step while updating the slice statistics on the covariance and cross-covariance statistics of the Chroma components for the CTU (for which the ALF is enabled). For example, in VTM-3.0, the encoder loops back 2 more times.

The encoder then applies the ALF according to an embodiment of the invention at 1817 with the determined ALF parameters (i.e. using the determined Chroma filter from step 1813). Depending on the encoder configuration, resulting image may be output and/or put in the reference frame buffer. The encoder finally encodes the best R/D cost parameters, namely ALF enable flag and, if the ALF enable flag indicates active/enabled, the determined ALF parameters 1818.

It is understood that according to variants, an optimization process for other ALF parameters may be performed to optimize those parameters of the ALF.

ALF with a Nonlinear Filtering Capability

The linear ALF filtering used in steps 304 and 407 can be modified according to some embodiments of the invention, which introduce non-linearity and improve filtering results (obtains a better compromise between filtering quality and coding efficiency). The goal of ALF filtering is to remove some "noise" introduced by the coding tools (e.g. quantization noise/error). To remove such noise, low-pass linear filters are often used to smooth the signal and reduce small local variations. Such kinds of filters can introduce blurring in the filtered output, especially in areas where contrast is strong, near edges for instance. Nonlinear filters, like a bilateral filter for instance, have been developed to allow more efficient denoising, whilst introducing less blurring or ringing effects, even around edges. To do so, these nonlinear filters often rely on filtering a sample based on its local neighbourhood (i.e. neighbouring samples), like linear filters, but pays more attention (or weight) to samples that have similar values to the sample to be filtered than to samples that have very different values. The weighting of the neighbour values is often performed using nonlinear functions (i.e. nonlinear mappings). These kind of nonlinear filters are often more complex than linear filters, and it may be difficult to optimize their parameters, and/or they may have less flexibility than linear filters if one wants to use such kinds of filters in a new ALF design.

According to some embodiments of the invention, an ALF of VTM-3.0 (or of any of the aforementioned embodiments or variants thereof) is modified by introducing nonlinearity with relatively low complexity involving operations that retains the parallelizable design of the ALF.

Looking at the linear ALF in VTM-3.0, and its output filtered sample is equal to equation (1) and by reformulating equation (1) using real numbers to simplify the equation, we have (removing operations related to a fixed-point representation and an integer rounding):

$$O(x, y) = \sum_{(i, j)} w(i, j) \cdot I(x+i, y+j). \qquad (4)$$

For this ALF, the condition $$\sum_{(i, j)} w(i, j) = 1 \qquad (5)$$

is satisfied. This means the sum of all the filter coefficients of the ALF is one. Then it can be seen that equation (4) can be reformulated as:

$$O(x, y) = I(x, y) + \sum_{(i,j) \neq (0,0)} w(i, j) \cdot (I(x+i, y+j) - I(x, y)), \quad (6)$$

The output sample O(x,y) is then the result of adding the input sample I(x,y) (at the same location) to a scalar product between a filter coefficient vector and a local gradient vector (a vector of local gradients computed as differences between neighbouring samples of the input sample and the input sample itself). In other words, the output sample (i.e. the filtered sample value) is the result of adding the input sample to a linear combination of the filter coefficients and local gradients.

Instead of using only this usual linear formulation for the filter, according to some embodiments of the invention, the ALF filtering process is modified to introduce a non-linearity in the ALF filters. This non-linearity is achieved using a multivariate function K(d, b) that takes a local gradient d at offset (i, j) as a first parameter and varies in its value depending on a second parameter b=k(i, j). Instead of using the local gradients for offsets (i, j) in the scalar product in equation (6), K(d, b) is used in the scalar product, resulting in an output sample O(x,y) that varies in a nonlinear manner with the local gradient:

$$O(x, y) = I(x, y) + \sum_{(i,j) \neq (0,0)} w(i, j) \cdot K(I(x+i, y+j) - I(x, y), k(i, j)), \quad (7)$$

where K(d, b) is a function which takes as its first parameter/variable d=I(x+i, y+j)−I(x, y) (the local gradient at offset (i, j) computed as the difference between the neighbouring sample value at position (x+i, y+j) and the current sample value at position (x, y)), and as its second parameter/variable b=k(i, j) (an additional filtering parameter). The additional filtering parameters k(i, j) are determined at the same time as w(i, j). In an implementation, the values of k(i, j) and w(i, j) are determined to optimize the filtering and signalling process (to minimize the distortions for instance). This optimization process is performed by an encoder which is using the ALF.

When using such a nonlinear ALF, an input sample value is filtered by using a linear combination of the input sample itself and of an adaptive nonlinear transform of input samples that are neighbours of the input sample. The adaptive nonlinear transform depends on the relative positions of the neighbouring input samples in relation to the position of the input sample that is being filtered.

With such modified ALF, it is still possible to achieve a linear filtering, for a particular K when K satisfies the condition that there exists b, and there exists a not equal to zero, such that K(d, b) is equal to a multiplied by d for all d, i.e:

$$\exists b, \exists \alpha \neq 0 \text{ such that } K(d, b) = \alpha d, \forall d \quad (8)$$

So, choosing a function K(d, b), which behaves like a linear function (i.e. a linear mapping) for some values of b (i.e. the function K(d, b) satisfies condition (8)), ensures that the modified ALF filtering process of the embodiments can still be at least as efficient as using the standard linear ALF (i.e. in the worst case, the modified ALF can achieve the same level of efficiency as the linear ALF in VTM-3.0). For example, when a clipping function is used, the parameter b could be set to the maximum possible integer value (ideally it should be set to infinity but we can achieve the same effect using the maximum possible integer value in the limited integer precision scheme) to make it behave as a linear function.

Note that in some embodiments of the invention the nonlinear ALF filtering uses an alternative formulation/filtering formula. The multivariate function K(d, b), that takes a local gradient and an additional parameter/variable, is replaced by another multivariate function that takes three parameters/variables: a neighbouring sample value, the sample value to be filtered, and an additional parameter/variable. It is reformulated using equation (7) while using a similar notation as the equation (4) and satisfying the condition (5):

$$O(x, y) = \quad (9)$$
$$w(0, 0) \cdot I(x, y) + \sum_{(i,j) \neq (0,0)} w(i, j) \cdot K'(I(x+i, y+j), I(x, y), k(i, j)),$$

where K'(n, c, b) is a function that takes as its parameters/variables, a neighbouring sample value (n), the current sample value to be filtered (c), and an additional filtering parameter/variable (b).

According to some variants, K is simply a clipping function (which is a nonlinear function with a relatively low complexity involved in applying the function):

$$K(d, b) = \max(-b, \min(b, d)). \quad (10)$$

or equivalently:

$$K(d, b) = \min(b, \max(-b, d)). \quad (11)$$

An equivalent function K' of this clipping function K using the filtering formulation of equation (9) is $$K'(n, c, b) = \max(c - b, \min(c + b, n)). \quad (12)$$

or equivalently:

$$K'(n, c, b) = \min(c + b, \max(c - b, n)). \quad (13)$$

The clipping function satisfies equation (8), as soon as b is greater than or equal to the maximum possible sample value (two to the power of the image bitdepth, for instance).

In the following description, a 'clipping value', or a 'clipping parameter' is used to refer to the b parameter/variable of K or K'. It is understood that such terms can be considered as being a generic term for referring to nonlinear function parameters. Similarly 'clipping' or 'clipping function' may be used to refer to K or K' described above or a functionally equivalent function thereof.

According to an embodiment, a nonlinear ALF is used instead of a linear ALF to reduce the number of sample line buffers (i.e. to reduce the number of samples of the input image component that are needed to be processed/accessed/kept in memory when performing the filtering, e.g. at a decoder), which are needed to perform ALF filtering.

According to a variant of such an embodiment, as a trade-off/compromise, the size of the filter shape/pattern for Luma filters is reduced from 7×7 diamond shape to a smaller filter shape/pattern. For instance, a 5×5 diamond shape is used (e.g. the same shape as for Chroma filter in FIG. 3-*b*, but still using transpose index variants) for Luma filter(s). This can still achieve a similar coding gain as a linear-only ALF with 7×7 diamond shape Luma filter(s) (e.g. those shown in FIG. 4-*b*), but with a reduced number of samples to process/access/store (e.g. reduced number of sample line buffers), and also a reduced computation complexity: i.e. the number of multiplications needed to process the ALF filter is reduced by 6 per each filtered input sample whilst achieving a good coding gain.

According to a variant, when performing ALF filtering on a sample, the nonlinear ALF is used based on all neighbouring samples which would have been used for the linear ALF. According to another variant, when performing ALF filtering on a sample, only some of the neighbouring samples, which would have been used with the linear ALF, are used with the nonlinear ALF, and the rest of the neighbouring samples are used with the linear ALF (i.e. only values obtained using a subset of neighbouring samples are clipped using the clipping function). According to yet another variant, when performing ALF filtering on a sample, only some of the neighbouring samples, which would have been used with the linear ALF, are used with the nonlinear ALF, and the rest of the neighbouring samples are not used with the linear ALF either.

According to variants, by exploiting the symmetry in these filter shapes/patterns, using the same notation as the equation (2) to simplify a linear and/or nonlinear ALF filter implementation, the linear function in equation (4) can be reformulated as:

$$O_n = w_c \cdot I_n^c + \sum_{i=0}^{i<c} w_i \cdot (I_n^{i^-} + I_n^{i^+}), \quad (14)$$

which, for the ALF, satisfies the condition:

$$w_c + 2 \cdot \sum_{i=0}^{i<c} w_i = 1. \quad (15)$$

The linear function in equation (6) can also be reformulated as:

$$O_n = I_n^c + \sum_{i=0}^{i<c} w_i \cdot (I_n^{i^-} + I_n^{i^+} - 2 \cdot I_n^c), \quad (16)$$

and the nonlinear function in equation (7) becomes:

$$O_n = I_n^c + \sum_{i=0}^{i<c} w_i \cdot (K(I_n^{i^-} - I_n^c, k_i) + K(I_n^{i^+} - I_n^c, k_i)), \quad (17)$$

where $k_i$ is the filter clipping parameter associated with the filter coefficient $w_i$.

Finally, the nonlinear function in equation (9) can be reformulated as:

$$O_n = w_c \cdot I_n^c + \sum_{i=0}^{i<c} w_i \cdot (K'(I_n^{i^-}, I_n^c, k_i) + K'(I_n^{i^+}, I_n^c, k_i)). \quad (18)$$

According to a variant of this embodiment, K' function or K function is a clipping function.

According to an embodiment, in order to reduce the number of computations involved in processing a nonlinear function compared to the number of computations for processing the function K in equation (17), a non-linearity is introduced on the sum of at least two neighbour differences instead (i.e. a nonlinear function with the sum of two or more local gradients as its variables may be used):

$$O_n = I_n^c + \sum_{i=0}^{i<c} w_i \cdot (K(I_n^{i^-} + I_n^{i^+} - 2 \cdot I_n^c, k_i)). \quad (19)$$

Equation (19) is not always equivalent to equation (17), and a filter using equation (19) can be less efficient but it reduces the computation complexity. According to a variant, the number of signalled/encoded clipping parameters/values is unchanged from those of equation (17), for example when K is a clipping function.

It is understood that a similarly derived equation based on equation (18) with reduced complexity can be used according to another variant, with K' function having the sum of the two or more neighbour difference values (local gradients) as its variables:

$$O_n = w_c \cdot I_n^c + \sum_{i=0}^{i<c} w_i \cdot (K'(I_n^{i^-} + I_n^{i^+}, 2 \cdot I_n^c, k_i)). \quad (20)$$

Figure 5:
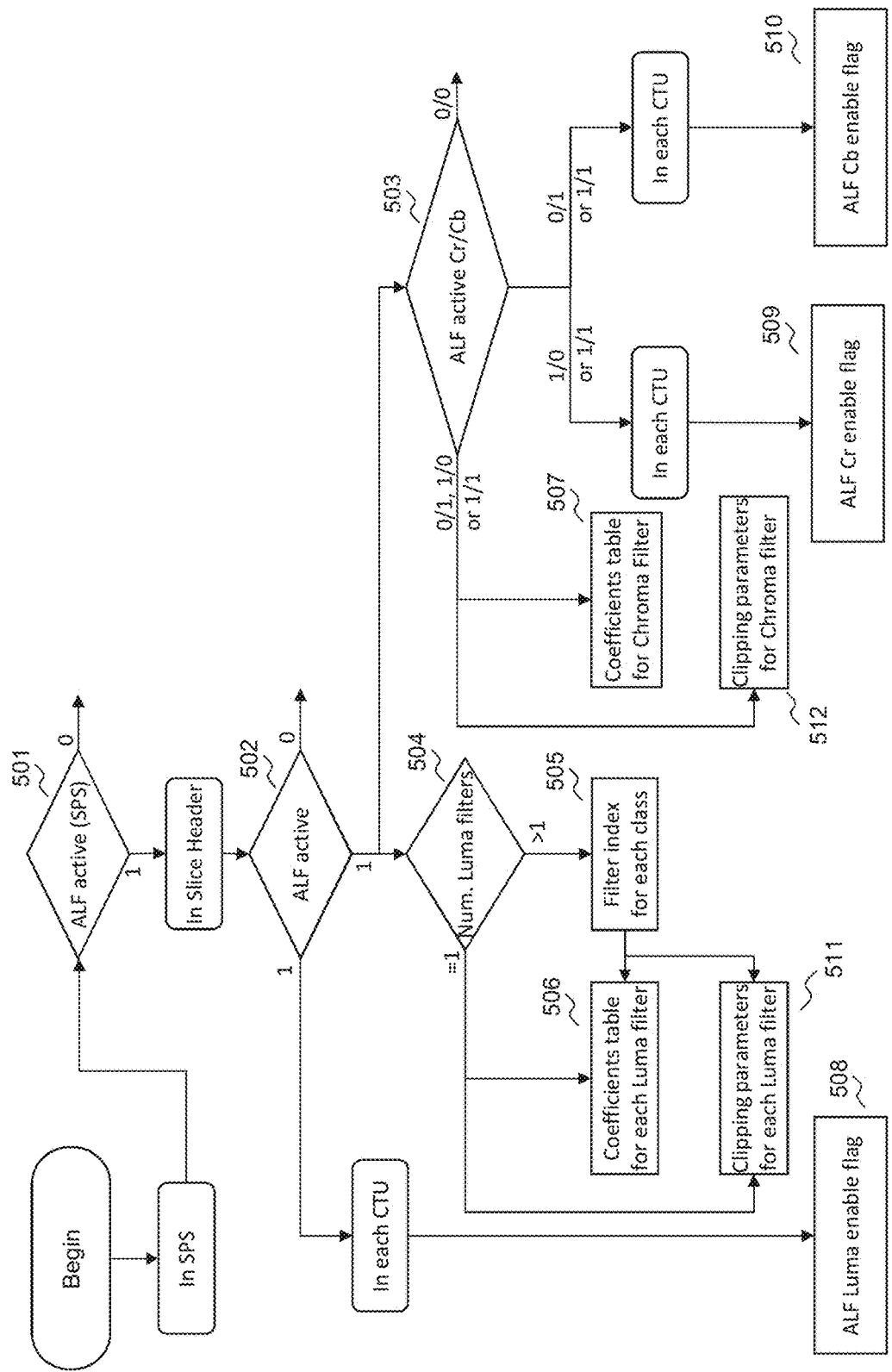
FIG. 5 is a flow chart with an overview of modified syntax elements according to an embodiment of the invention.

FIG. 5 is a flow chart with an overview of syntax elements according to an embodiment of the invention, which provides examples of syntax elements that could be used to implement the signalling of the aforementioned nonlinear function parameters. In this embodiment, equation (7) (or (9))'s encoded filter coefficient for each filter is associated with its own clipping value, and thus k(i, j) can have different values varying with offset (i, j). Most of the syntax elements are the same as the one already used in VTM-3.0 and explained with reference to FIG. 2: 501, 502, 503, 504, 505, 506, 507, 508, 509, 510 in FIG. 5 have the same signalling and semantics as 201, 202, 203, 204, 205, 206, 207, 208, 209, 210 in FIG. 2. Additional syntax elements are the clipping parameters for each luma filter 511, all the filter coefficients for the Luma filters (506), and all the clipping parameters for each of the Luma filters (511), which may be signalled, for instance, in the slice header (or APS or tile group header). This signalling is followed by the signalling of all the filter coefficients for the Chroma filter (507) and all the clipping parameters for the Chroma filters (512).

The reduction of the maximum memory (worst case) that a decoder has to allocate for filter coefficients and clipping parameters is performed is a similar way as described with FIG. 2: according to embodiments of the invention using non-linear filters, the number of signalled Luma filters is less or equal to a "maximum number of signalled Luma filters" that is lower than the number of classes. Thus Num. Luma filter 504 is less than or equal to this "maximum number of signalled Luma filters" which is less than the number of classes. The variants described with FIG. 2 for the "maximum number of signalled Luma filters" also apply to embodiments using non-linear filters. These non-linear embodiments may have a single filter per ALF class/filter index or may have two or more alternative filters per ALF class/filter index as in the examples of FIG. 7-c to 7-f and 8-a to 8-f.

Then in variants where each Luma filter has its own clipping values, the number of coefficient tables for each Luma filter 506 is the same as the number of tables of clipping values for each Luma filter 511, and so limiting the memory allocated for Luma filter coefficients by limiting the maximum number of filters, also limits the memory allocated for clipping values.

In one variant the number of coefficient tables for each Luma filter 506 is different from the number of tables of clipping values for each Luma filter. One table of clipping values can be shared by multiple Luma filters. In that variant, the "number of signalled table of clipping values" (=NClip) is provided in the APS, and 511 is replaced by NClip x"tables of clipping values". Then, the "index of a table of clipping values" is provided for each table of filter coefficients given in 506. In that variant the memory for clipping parameters is limited by using a "maximum number of signalled Luma clipping tables" and allows limiting memory in a similar way as for filter coefficients.

In another variant, predetermined tables of clipping parameters are fixed at both encoder and decoder, and instead of 511, the index of a predetermined table of clipping parameters is provided for each Luma filter. This allows reducing the memory for storing clipping parameters, as well as the signalling in the bitstream.

According to a variant of this embodiment, for any filter, the number of signalled clipping parameters is the same as the number of the signalled filter coefficients. The clipping parameters for the offset (i, j) are obtained/signalled in the same way as for the filter coefficients at the same position (x+i, y+j). For Chroma, they are processed in the same way as what was described for the filter coefficient derivation process in step 303 of FIG. 3-a (but with Chroma clipping parameters); and for Luma they are processed in the same way as what was described for the filter coefficient derivation process in step 406 of FIG. 4-a (but with Luma filter clipping parameters).

In an alternative variant, there is only one clipping parameter per filter, and this clipping parameter is used for all the filter (i,j)≠(0,0) positions.

In an alternative variant, the number of clipping parameters is lower than the number of filter coefficients. These clipping parameters are used for a predefined subset of filter positions with offset (i,j). For the other filter positions, the usual linear filtering is performed (or when implemented in another way, at those other filter positions, K is taken as being the identity function) or alternatively predefined clipping parameter values are used. In some variants, to not break Single instruction, multiple data (SIMD) parallelized implementation, the clipping is applied to all filter positions, but the clipping parameter for positions where no clipping parameter is provided is taken to have a linear output (e.g. in a variant implemented as an identity function's output).

In an alternative variant, the number of clipping parameters is lower than the number of filter coefficients. For instance, in the filter shapes of FIG. 3-a and FIG. 3-b, some coefficient indexes can share the same clipping parameters. According to a variant, an index of the clipping parameter is indicated in a table containing a number of elements, the number being equal to half of the shape size (because of the symmetry) minus one (because there is no clipping parameter for the centre coefficient position). This table allows associating a clipping parameter index to each filter coefficient. According to a variant, this table is fixed/preset by the codec. According to a variant, multiple fixed/preset tables are defined, and an index for identifying a clipping parameter from the table is signalled, for instance in the slice header. In an alternative variant, the content of such a table is signalled, in the slice header for instance, and is shared by all the Luma filters.

In a variant, the number of values the clipping parameters can take is restricted to be small (to reduce the encoder complexity and the encoding cost versus the small quality benefits). The values authorized for the clipping parameter are indexed with an integer value index, preferably in an increasing or a decreasing order. Then, these indexes can map to each element of a table of clipping parameters. Then, instead of signalling the clipping parameter values, indexes (p) of the relevant clipping parameter value in the table are signalled. In a variant where p is a filter index in a table, there is no need to use an intermediate table to reduced the number of possible values for p. It is possible to directly reduce the number of functions available in the table of functions, and hence reduce its size.

In one variant, the clipping parameter values are restricted to be powers of two: $2^p$. What is encoded is then p. The maximum value of p is the bit depth $B_d$ of the input image (higher values are not necessary as they would provide the same results). In an alternative variant instead of p, what is encoded is $B_d$-p. In another variant the range of p is restricted to be between $p_{min}$ and $p_{max}$. For instance, $p_{min}$=3 and $p_{max}$=$B_d$-1. Then p-$p_{min}$ Or $p_{max}$-p can be signalled.

In some variants, the authorized/allowable/available clipping parameter values for the Chroma filter are not the same as those for the Luma filters.

According to a variant, the minimum index in the table $p_{min}$ and the maximum index in the table $p_{max}$ which are used for the clipping parameters in the slice are provided in the slice header so that the number of possible clipping parameter values can be restricted/limited when signalling them. According to a variant, $p_{min}$ and $p_{max}$ are shared by the Luma and Chroma filters. In an alternative variant, $p_{min}$ and $p_{max}$ are only provided for Luma, Chroma indexes being not restricted. In another alternative variant, $p_{min}$ and $p_{max}$ are provided in Slice Header for Luma and for Chroma.

According to an alternative variant, one table of authorized clipping parameter values is signalled in the slice header (alternatively APS or tile group header) for both Luma and Chroma components, or alternatively two tables are signalled: one for Luma and one for Chroma.

In a variant, the allowed clipping values depend on the slice type (which can be INTRA, B or P, for example).

In some variants of an embodiment, the allowed clipping values are: {6, 32, 181, 1024} for Luma in a B or P slice; {4, 25, 161, 1024} for Chroma in a B or P_slice; {10, 102, 1024} for Luma in an INTRA slice; or/and {4, 24, 1024} for Chroma in an INTRA slice. Thus any clipping parameter can take a value belonging to one of those sets (accordingly to the slice type and to the filtered component). And, the index of that value in the set is encoded in the slice header for each filter, for each clipping parameter.

In a variant, a set (e.g. stored/processed as a table) of allowed clipping values is defined as follows:

$$\left\{ \text{round}\left(\left((M)^{\frac{1}{N}}\right)^n\right) \text{ for } n \in 1 \ldots N \right\}, \tag{21}$$

where N is the number of clipping values in the set/table (i.e. the size of the table), M is the maximum clipping value (which may be the last entry in the table, for instance $M=2^D$ or $M=2^D-1$ where D is the sample bit depth of the component for which the table is defined), and where 'round' is a rounding operator (which rounds a value to the nearest integer, for instance).

In another variant, a set/table of allowed clipping values is defined as follows:

$$\left\{ \text{round}\left( A \cdot \left(\left(\frac{M}{A}\right)\right)^{n-1} \right) \text{ for } n \in 1 \ldots N \right\}, \quad (22)$$

where N is the number of clipping values in the set/table (i.e the size of the table), M is the maximum clipping value (e.g. which may be the last entry in the table, for instance $M=2^D$ or $M=2^D-1$ where D is the sample bit depth), A is the smallest clipping value (e.g. which may be the first entry in the table), and where 'round' is the rounding operator.

It is understood that the order the clipping values are arranged in the set/table mentioned above (which can affect the value of an identifier/index for each clipping values) can vary depending on the implementation. They could be arranged in a reverse order from the order mentioned above for instance.

Figure 6:
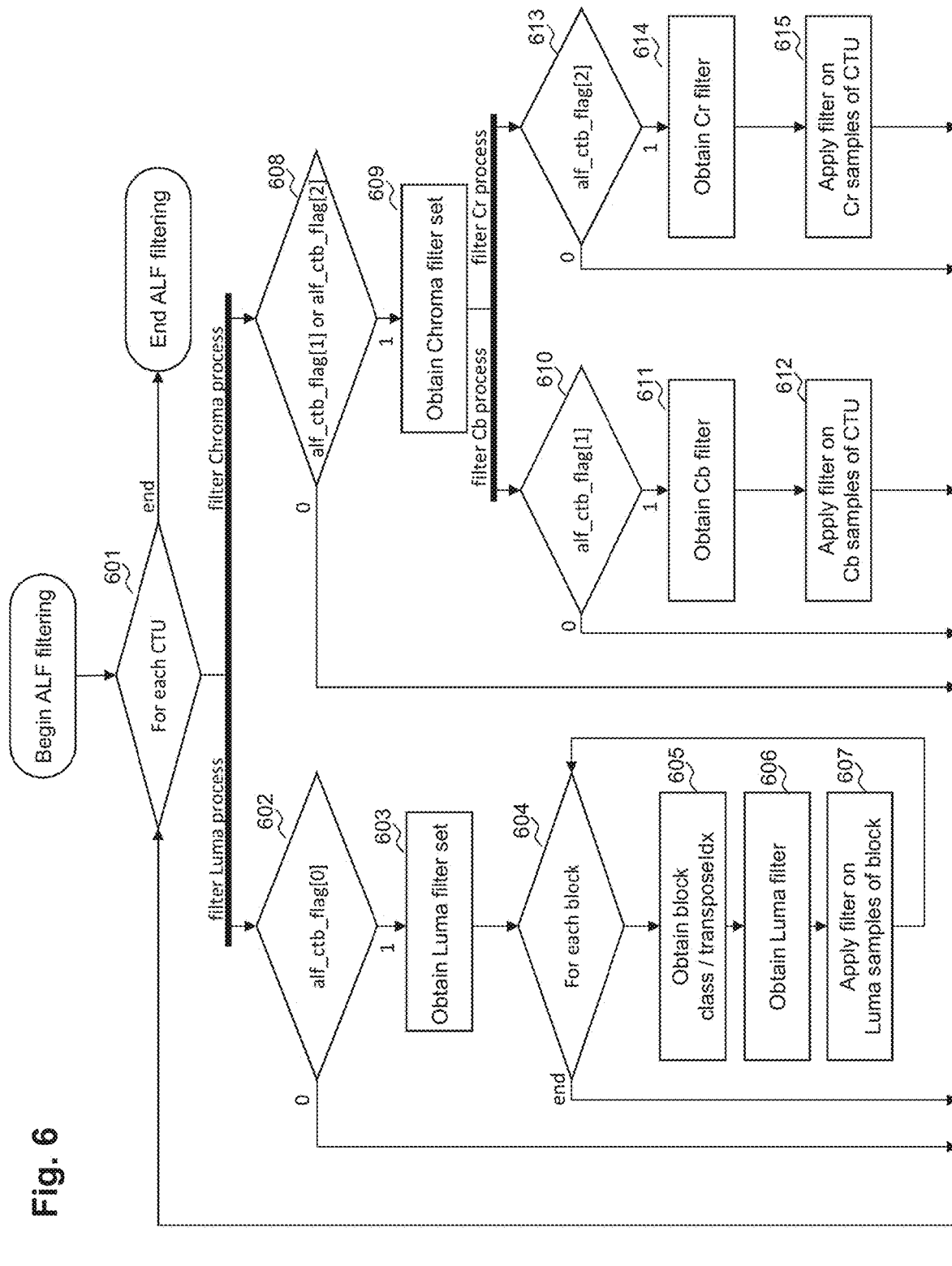
FIG. 6 is a block diagram illustrating steps of an ALF filtering process according to an embodiment of the invention.

FIG. 6 is a block diagram illustrating an embodiment of the invention which provides an example of an ALF filtering implementation. In this embodiment, the ALF filtering is independently applied to each CTU 601 of an input decoded image portion (a tile group for instance). The ALF filtering on Luma is also applied independent of the ALF filtering on Chroma, and this is illustrated by the block diagram showing two separate processes for each component (which may run in parallel or in series).

According to a variant, one CTU corresponds to 1 luma CTB & 2 Chroma CTB (Cr and Cb), and each CTB is divided into CUs using quadtree or ternary tree structure. For each CTU, if alf_ctb_flag[0] 602 (i.e. an ALF Luma enable flag 208 in FIG. 2 or 508 in FIG. 5) is equal to 1 (or any value indicating the ALF is enabled for Luma), the Luma samples of the CTB (i.e. samples of the Luma CTB) are processed. A first step of the Luma CTB processing is to obtain a Luma filter set 603. In VTM-3.0's ALF, for instance, this step corresponds to obtaining encoded/decoded filter coefficient table for each luma filter 206 in FIG. 2 and a table associating a filter index to each class that a 4×4 block of the CTU can take, which can be determined from syntax element 205 (e.g. filter index for each class) in FIG. 2. For each 4×4 block 604, the class (index) and transposeIdx are obtained 605. Using the class index, filter coefficients for the selected ALF filter are obtained from the Luma filter set. Then these filter coefficients are organized/arranged according to transposeIdx (to form the filter shape illustrated in FIG. 4-b for instance), to obtain the selected Luma filter 606 that is to be applied to the Luma samples of the 4×4 block 607.

For each CTU, a Chroma CTB processing is performed if at least one of alf_ctb_flag[1] (i.e. an ALF Ch enable flag 210) or alf_ctb_flag[2] (i.e. an ALF Cr enable flag 209) is equal to 1 608 (or any value indicating the ALF is enabled for Cb or Cr CTB), so if so, a Chroma filter set is obtained 609. In VTM-3.0, the Chroma filter set contains only one filter which is the Chroma filter obtained by decoding a filter coefficient table for the Chroma filter 207 and arranging the filter coefficients (the arranging forming the filter shape in FIG. 3-b for instance). The ALF filtering of Cb and Cr Chroma component samples can be performed independently, illustrated by the block diagram showing two separate processes for each Chroma component (which may run in parallel or in series). The Cb component samples of a CTB are processed if alf_ctb_flag[1] is equal to 1 (or any value indicating the ALF is enabled for Cb) 610. The Cb (ALF) filter is obtained in step 611. In VTM-3.0, this step corresponds to taking/obtaining the only available one Chroma filter. Then in step 612, the Cb (ALF) filter is applied to each Cb component samples of the CTB. The Cr component samples of the CTB are processed if alf_ctb_flag[2] is equal to 1 (or any value indicating the ALF is enabled for Cr) 613. The Cr (ALF) filter is obtained in step 614. In VTM-3.0, this step corresponds to taking/obtaining the only available one Chroma filter. Then in step 615, the Cr (ALF) filter is applied to each Cr component sample of the CTB.

As described in JVET-N0415 "CE5: Coding tree block based adaptive loop filter (CE5-4), ALF may also use fixed/static/predefined Luma filters. Fixed Luma filters are predefined in a table (set) of filters, the "fixed filter set coefficient table", containing the coefficients of a fixed number of filters. A "fixed filter sets' class to filter mapping table" is also used to define a fixed number of fixed filters sets, each filter set being defined by a table (of size 25) mapping a class index (0 to 24 for the 25 ALF classes) to a filter index in the "fixed filter set coefficient table".

Some additional syntax elements may be used in Luma CTB data, when alf_ctb_flag[0] 602 equals 1, to indicate that instead of using Luma filters that have been transmitted in the bitstream (in an APS for instance), fixed filters have to be used. When fixed filters have to be used, the index of a fixed filter set is provided in the Luma CTB data to indicate which fixed filter set in the "fixed filter sets' class to filter mapping table" have to be used; and so which fixed Luma filter set have to be retrieved in step 603 to perform the filtering in steps 604, 605, 606 and 607.

The coefficients of the filters in the fixed filter sets can also be used to perform a kind of prediction of the filter coefficients in the coefficient table for each Luma filter (206 or 506 for instance). In that variant, an additional flag is added in the slice header (or APS for instance) to indicate if the prediction by fixed filters is enabled. If the prediction by fixed filters is enabled, the index of a fixed filter set in the "fixed filter sets' class to filter mapping table" is provided to determine the fixed filter set that has to be used for the prediction. Also, a table of flags (of size 25) containing one flag for each class index is provided. It indicates for each class index if the filter for same class index in the determined fixed filter set has to be used for predicting the coefficient of the Luma filter for that class index. The filter of a given class index for which the prediction has to be used is derived by adding one by one "each of the coefficients of the predefined filter for that class index" to "each of the coefficients of the encoded filters with a filter index associated to the class index (in 205 or 505 for instance)". In fact, it is not really a prediction in the sense of predictive coding, since the prediction is not performed on the encoded values directly. It more a filter derivation process. This mechanism is intended to improve the rate/distortion of the filter coefficients by trying to lower the rate for signalling the filter coefficients and improving filter efficiency for a given rate.

But this mechanism also has some constraints on the decoding process. In embodiments using a "maximum number of signalled Luma filters" for instance, without this prediction mechanism, since less filters than the number of classes (25) are signalled in the slice header (or APS for instance), less memory than the memory for 25 filters can be used to store the decoded filter coefficients (i.e. the real filter values that will be used in the filtering process) of a filter set. Using the class index to filter index mapping (e.g. the filter index for each class table 205 or 505), the decoder can easily select the correct filter to use for a given class index. With the prediction mechanism, the memory for storing decoded filter coefficient cannot be reduced anymore because each of the 25 decoded filters is potentially using a different filter predictor, which is independent of class index to filter index mapping (e.g. the filter index for each class table 205 or 505). An alternative, to allow continuing to reduce memory with the prediction mechanism is to not store the "final" decoded filter coefficients, but to store the decoded filter coefficients before the prediction mechanism is applied (i.e. storing filters coefficient as if there is no prediction mechanism), but then derive the "final" decoded filter coefficients during the filtering process (for instance at CTB level in step 603), or alternatively when the filter has to be used (for instance at block level in step 606). In some variants instead of using the class index to filter index mapping (e.g. the filter index for each class table 205 or 505) to retrieve the correct filters while reducing memory usage, a table mapping each class index to one memory pointer to one filter can be used. That table then contains 25 pointers each pointer pointing to the beginning (for instance) of the memory location containing the coefficients of one filter. Some of the 25 pointers point to same memory location, for the class indexes sharing the same filter coefficients.

In another variant, the "fixed filter set coefficient table" contains the coefficients for 64 filters, and the "fixed filter sets' class to filter mapping table" defines 16 filter sets of 25 filters.

According to an embodiment using nonlinear ALF, from an encoder point of view, the main logical steps of the ALF encoding process of VTM-3.0 described with reference to FIG. 17 are kept. The main changes are the nature of the statistics that are extracted in order to build filters, and the way the filter is determined. Instead of a simple Wiener Filter computation (for parameters of a linear ALF), clipping parameters are iteratively optimized to find the best clipping parameters and associated nonlinear Wiener Filter coefficients.

According to an embodiment, we define $N_K$, a limit on the number of values one clipping parameter can take. $N_K$ can be small, for instance $N_K=12$ or even less. Then instead of computing covariance and cross covariance matrices statistics, in step 1802 the encoder builds a two-entry table E of $N_K \times N_K$ clipping-covariance matrices statistics and a one-entry table y of $N_K$ clipping-cross-covariance matrices statistics (instead of one covariance matrix statistics and one cross-covariance matrix statistics).

The clipping-covariance matrix $E_c[a][b]$ is a covariance matrix estimated from $1/NX^a X^{b^T}$ where $X^m$ contains the N realizations (observed values) of the inputs when using the $C_m$-th clipping value. For instance using the shapes of the FIG. 4-b, $X_i^m$ is the i-th column of $X^m$ obtained for a given sample position, and $X_{i,j}^m$ contains: for $i<N_c$ ($N_c=12$ for a Luma filter of FIG. 4-b is the number of filter coefficients minus one), the sum of the results of the clipping of the difference between the neighbour sample (of the j-th filtered sample) and the j-th filtered sample using the m-th clipping value, for the two symmetric neighbours with index i in the shape; and for i=12, the j-th filtered sample; where $X_{i,j}^m$ is the value in matrix $X^m$ at row i and column j.

The clipping-cross-covariance matrix $y_c[c]$ is a cross-covariance matrix between the realisations of the desired filter output (i.e. original samples) and the realisations of $X^c$.

Thus when we need to build/test a filter using clipping parameters equal to $c_0, \ldots, c_{N_c-1}$ we define $C=[c_0, \ldots, c_{N_c-1}, 0]$ ($N_c=12$ for a Luma filter for instance, is the number of filter coefficients minus one, last value equal to zero is convenient, another value could be used and would have same results since the centre coefficient 12 is not clipped). We compute the covariance matrix E and the cross-covariance matrix y these clipping parameters such that $E[i,j]=E_c[c[i]][c[j]][i,j]$ for each $i<N_c$, $j<N_c$ and $y[k]=y_c[c[k]][k]$ for each $k<N_c$. Then we build a Wiener filter using these two matrices, as previously explained for the linear ALF with reference to FIG. 17.

In step 1804, instead of combining the statistics of covariance and cross-covariance matrices, the encoder combines the statistics of each clipping-covariance and clipping-cross-covariance matrices (here also, the combination is done by summing the statistics).

In step 1805, the way used to find the optimized sets/groups of filters (i.e. the optimized merged filter) is similar as before. The main difference is that for each tested/compared filter, instead of computing only one Wiener filter, the clipping parameters are iteratively optimized, each step computing a Wiener filter for specific clipping parameters, to minimize the output error of the filter (computed on statistics matrices). A simple optimization algorithm is to start with all clipping parameter values ($c_i$) set to zero (or alternatively to the median clipping value or any default value), then follow the following steps in loops while it improves the filter (i.e. it reduces the output error): for each clipping parameter value take the next clipping parameter value, if available/allowed (i.e. index<maximum index value), if the Wiener filter computed with this clipping parameter value is better, or take the previous clipping parameter value, if available/allowed (i.e. index>0), if the Wiener filter computed with this clipping parameter value is better. When grouping two filters, one strategy might be to start optimization with each clipping parameter value set to the average of each clipping parameter value of the two filters.

There is no real change to step 1806, 1807, 1808, 1809, 1810 and 1811.

In step 1812, a combined statistics change is the same as descried for step 1804. The determination on the Chroma filter in step 1813 corresponds to the filter optimization described for step 1805. The other steps are not changed except step 1818 where the ALF parameters include the clipping parameters determined for each filter.

Note that in VTM-3.0 with the "normal" ALF, when the encoder derives integer filter coefficients from floating point values, if first performs a quantization of the floating point value to fixed point ones: for each filter coefficient it rounds the filter coefficient multiplication by the fixed point precision to the nearest integer value. Then it tries to improve the filter efficiency by iteratively adjusting the filter coefficients (to compensate for the rounding error). The encoder must also ensure that the sum of all the filter coefficients is equal to one (multiplied by the fixed point precision), and that the filter coefficient for the centre sample does not exceed a maximum value (to ensure that its use in the multiplication does not end up using too many bits).

With embodiments of the invention where the difference with neighbouring samples is used as an input for the filter, since the centre coefficient is always one, there is no need to ensure that it does not exceed the maximum value. Also, there is no need to often track the value of the sum of all the filter coefficients.

The advantage of these embodiments is a coding efficiency improvement.

The descriptions of these embodiments mention the luma and the chroma components but they can easily be adapted to other components such as a single luma component or RGB components.

In some foregoing embodiments or variants, the invention results in modifying the filtering in 304 and 407 in FIG. 3-*a* and FIG. 4-*a* to use non-linear functions on filter inputs to obtain a non-linear filtering effect. FIG. 2 is also modified to add new syntax elements for signalling additional parameters for the non-linear functions (an example of embodiment was described with reference to FIG. 5). Implicitly, the input filtering parameters in 302 and 402 are modified to further include the additional parameters for the non-linear functions. Finally, the filter derivation in 303 and 406 is modified to derive the non-linear functions for the filters (i.e. to derive the "nonlinear filters"). Therefore, in most situations, when those embodiments/variants with nonlinear ALF are used, the output image portion 305 and 408 are not the same as those produced in VTM-3.0 and have a higher quality for equivalent/comparable input samples and/or achieves better compromise between output image quality and coding efficiency. It is understood that in another embodiment/variant, the ALF itself is modified so that it operates to filter using any of the aforementioned non-linear functions.

Embodiments for Signalling Filter Related Information

Embodiments of the invention enable a (ALF) filter selection/change (or switching on or off) at a finer granularity (i.e. at a lower level) than at Tile Group or Slice level: at a CTU level (or at a block of a CTU level) for instance. Some of these embodiments described below are described in relation to how (ALF) filters are used on Luma samples because more than one Luma filters are available for use (and hence the Luma case is a more complex case), however it is understood that the same or similar modifications can be made to how a Chroma (ALF) filter is used on Chroma samples, for example as described below with reference to FIG. 9.

Some signalling embodiments enable an independent selection/change/switch of a (ALF) filter for a given ALF class, said (ALF) filter being selected from a set/group of two or more alternative filters. This filter selection/change/switch is independent of another filter selection for at least one other ALF class, the selection/change/switch being made at a finer granularity than at tile-group level (at CTU granularity/level or below, for instance).

These variants with two or more alternative filters for a given ALF class require more ALF parameters to be signalled and stored. This is especially the case if alternative filters are available for multiple ALF classes, leading to two or more sets of alternative filters, each with plural filters. Accordingly, embodiments of the invention to be described later take one or more of the following measures to control the memory requirements for ALF parameters:

imposing a limit on the maximum number of filters in a set if the sets have to comprise the same number of filters this limit then applies to all sets, even though it is set for one set;

if the sets may comprise different numbers of filters individual per-set limits may be imposed, or if it is known that one set will systemically be the largest set (e.g. the first alternative set) then the limit may be imposed on the largest set, knowing that other sets will then be smaller than the largest set (some embodiments described below make successive alternative sets progressively smaller); and imposing a collective limit on the maximum number of filters for all the sets;

imposing no limit on one set but imposing a limit on another set for example, no limit for the first set but a limit for the second set or limiting the second and each subsequent set.

It should be noted that in some of these variants, ALF parameters (such as the filter coefficient table per filter index and, for example, clipping values in the case of a filter controlled using a nonlinear function) defining the available filters are still signalled in common for two or more units (e.g. CTUs) belonging to a larger image portion to be filtered. For example, an image portion may be a slice, tile group, whole frame or multiple frames. The image portion may therefore comprise multiple units (CTUs).

Two or more sets of alternative filter sets (each with plural filters) may then be defined by ALF parameters provided in common for the image portion (e.g. in the slice or tile group header, or in an APS applicable to the image portion) and hence shared by units (e.g. CTUs) making up the image portion. What the signalling per unit (CTU etc.) does is to enable different units to make different selections among the alternative filter sets. If information for selecting one of the alternative filter sets were to be provided only for the image portion (slice etc.) as a whole, all units (CTUs) of the image portion would have to select the same one of the alternative sets. Thus, finer granularity is possible whilst still benefitting from the efficiency of sharing sets of alternative filters over plural units.

A unit, in turn, may be divided into constituent blocks. For example, a CTU may have a luma CTB and two chroma CTBs. ALF may be carried out for each block of size 4×4 samples within a luma CTB. Each block has to be classified into one of the 25 ALF classes. Different blocks within the same luma CTB may have different ALF classes and the filters for the blocks are determined by the combination of the common ALF parameters for the image portion and the per-unit (e.g. per-CTU) signalling information. More detailed examples are described below.

In other variants the ALF parameters are signalled in an APS. Such an APS may also be referenced by an image portion (having multiple units, e.g. CTUs) but, in some variants, even an individual CTU may reference an APS. When the APS defines two or more alternative filter sets for the referencing image portion or the referencing unit, there is still the problem that the memory required for signalled filters is increased.

When using Luma (ALF) filters, as described above, for each CTU, alf_ctb_flag[0] 602 (i.e. the ALF Luma enable flag 208 in FIG. 2 or 508 in FIG. 5) is used to indicate whether use of a Luma (ALF) filter is enabled for that CTU. If use of the Luma (ALF) filter is enabled, then for each block of the CTU (e.g. for each 4×4 block included in the CTU in VTM-3.0), the Luma filter for use on that block is obtained by identifying the class of that block (e.g. using a class index) and then deriving the filter for use with that class (e.g. by obtaining a set of filter coefficients from a filter coefficient table, the set being identified by a filter index which is associated with/selected for that class (index) of the block).

According to a first signalling embodiment, information for identifying/switching/changing a filter (e.g. an (filter) identifier or a group/set index) or for switching a filter on/off (e.g. a filter switch (on/off) flag) is signalled at CTU level, and that information is signalled for each filter (index—see FIG. 16-*b* & FIG. 16-*c*). That is, for each ALF filter identified by a particular filter index, the information for identifying an alternative filter (e.g. an identifier or a group/set index) or for switching a filter on/off (e.g. a filter switch (on/off) flag) is signalled. This means the ALF Luma filter (when identified by that particular filter index, e.g. at step 505 of FIG. 5 or step 205 of FIG. 2 or also see FIG. 16-*b* & FIG. 16-*c*) can be either switched/changed into another/alternative ALF filter (identified using the identifier or the group/set index), or switched on/off (based on the filter switch flag), using the signalled information. And this switching/changing can happen for one or more ALF filter(s) among a plurality of ALF filters available for the CTU, meaning a first block of the CTU may have an ALF filter (selected from the available ALF filters, which also is identified or determined to be switched on by the signalled information) applied to it while a second block in the same CTU may not have an ALF filter applied to it because either an identity filter is identified as the ALF filter for use on the second block, or the ALF filter is determined to be switched off based on the signalled information (e.g. as the CTU data).

In a variant ("variant 1") of the first signalling embodiment, information is provided at CTU level (also see FIG. 16-*b* & FIG. 16-*c*), wherein the information indicates whether each Luma filter (having a filter index) is switched on/off (i.e. available or not) for that CTU (e.g. a filter switch (on/off) flag such as Luma filter switch flag 701-*a* shown in FIG. 7-*a*, which is provided for each filter index). If a particular Luma filter (selected using/identified by a particular filter index associated with the class index for a particular block) is switched off according to the information, then no change is made to the input sample by the ALF filtering process even when ALF CTU luma enable flag (from the signalled CTU data—see FIG. 16-*b* & FIG. 16-*c*) indicates that use of a Luma filter is enabled for that CTU (note that there are more than one Luma filters available for use on the CTU, each available Luma filter being identifiable with a filter index, and the ALF luma enable flag in the CTU data either enables or disables all the available Luma filters for that CTU so this first variant provides a finer control than when only using the ALF luma enable flag by providing this further information for one or more filer(s) (filter index(es))).

According to a further variant of the variant 1, at CTU level (i.e. in each CTU), each encoded Luma filter can be independently switched to an Identity filter (i.e. a filter which outputs the same input sample value as if no filter was applied/used on a block) when the information indicates that a Luma filter corresponding to the selected filter index for the block is switched off for the CTU.

Depending on the implementation, the Identify filter may have a predetermined alternative filter index (for identifying the Identify filter), and using this predetermined alternative filter index, the ALF filter can be switched to the (Identity) filter. The identity filter has one centre filter coefficient equal to one (and left shifted by the bit depth precision is case of fixed point computation), and the other filter coefficients equal to zero. This is equivalent to switching off the filtering for the corresponding predetermined filter index, since that filter has no effect, so this enables independently switching off/disabling each individual Luma filter for the associated blocks of the CTU using the predetermined alternative filter index.

To do this, if the ALF Luma enable flag, in CTU data, is equal to one, one Luma filter switch flag per each Luma filter index (the number of Luma filter indexes to be encoded being preferably less or equal to the number of ALF classes) is encoded (using CABAC for instance) for each CTU (e.g. as CTU data). If the Luma filter switch flag is equal to zero for a given filter index, the filter associated with that filter index is not switched/changed. If the Luma filter switch flag is equal to one for a given filter index, the filter associated with that filter index is switched/changed so that in step 603 the obtained Luma filter set contains filter coefficients for an identify filter. Thus, switching/changing the filter for the given filter index enables switching of the filter for all the classes that are associated with (use) that given filter index. In an alternative further variant of the variant 1, the Luma filter switch flags are replaced by Luma filter disable flags or by Luma filter enable flag provided for each filter index. Luma filter disable flag has the same effect as Luma filter switch flag, while Luma filter enable flag has the opposite effect to Luma filter switch flag: i.e. Luma filter enable flag equals to zero means the filter is switched/changed, equals to one means the filter is not switched/changed. In some variants, since identity filter has no effect, step 607 can just be skipped when the identity filter is obtained.

FIG. 7-*a* is a flow chart illustrating an example of the signalling syntax elements that can be used for implementing the variant 1, which signals for each CTU (as CTU data in the bitstream) which one(s) of the available Luma filters is/are enabled/adapted for use/available for use (i.e. not switched to the identity filter). FIG. 7-*a* modifies a part of FIG. 2 with an additional syntax element which is the Luma filter switch flags 701-*a* (one provided for each (available) Luma filter). According to a further variant of the variant 1, the Luma filter switch flags are only provided if the ALF Luma enable flag is equal to 1. In an alternative further variant, the ALF Luma enable flag is not coded and is always inferred to be equal to the ALF active flag 202. Other further variants may use alternative syntax elements to signal which filters are enabled or not for each CTU.

According to a second signalling embodiment, information for identifying/switching/changing a filter (e.g. an (filter) identifier or a group/set index) or for switching a filter on/off (e.g. a class filter switch (on/off) flag) is signalled at CTU level (e.g. as CTU data), and that information is signalled for each class (index)—see FIG. 16-*b* & FIG. 16-*c*. That is, for each class identified by a particular class index, the information for identifying/switching/changing a filter for that class (e.g. an identifier or a group/set index) or for switching a filter on/off for the class (e.g. a class filter switch (on/off) flag) is signalled. This means the ALF Luma filter (when identified by that particular class index and its associated filter index, e.g. at step 505 of FIG. 5 or step 205 of FIG. 2—also see FIG. 16-*a* FIG. 16-*b* & FIG. 16-*c*) can be either switched/changed into another/alternative ALF filter (identified using the identifier or the group/set index), or switched on/off (based on the class filter switch flag), using the signalled information. And this switching/changing can happen for one or more class(es), meaning this switch/change may happen for a first block (which is included in the CTU) belonging to one of these class(es), while a second block (which is also included in the same CTU and belong to a different class from the first block) may not experience any switch/change (e.g. even when both classes of the first and second blocks are associated with one ALF luma filter (in slice/tile group header or in APS), the same ALF luma filter identified by the same associated filter index is used for that second block, while another ALF luma filter may be used for the first block).

In a variant ("variant 2") of the second signalling embodiment, information is provided at CTU level, for example as shown in FIG. 16-*b*'s "information for changing/switching the filter selection/choice" & FIG. 16-*c*'s altIdx, wherein the information indicates whether a Luma filter is switched on/off (i.e. available or not) for each class (index) (e.g. a class filter switch (on/off) flag such as class filter switch flag 701-*b* shown in FIG. 7-*b*, which is provided for each class (index). If a Luma filter is switched off for a particular class index according to the information, then the ALF filtering process makes no change to the input sample of a block (e.g. a 4×4 block of the CTU) belonging to that particular class, even when the ALF luma enable flag indicates that use of the Luma filter is enabled for that CTU to which 4×4 block belongs.

According to a further variant of the variant 2, a switching to the identity filter is made at a class level. To do this, if the ALF Luma enable flag is equal to one, one class filter switch flag is encoded for each class (index) (using CABAC for instance) for each CTU (e.g. signalled as CTU data). If the class filter switch flag is equal to zero for a given class index, a filter associated with that class is not switched/changed and so remains to be a particular Luma filter encoded for that class. If the class filter switch flag is equal to one, the filter associated with that class is switched/changed. So in FIG. 6, the step 603 is unchanged compared to aforementioned description for the step 603 (e.g. same as in VTM-3.0, for instance) while the step 606 is modified so that, if the class filter switch flag for the given class index is equal to one, the obtained filter is switched/changed to be the identity filter. It is understood that a filter associated with a class (a filter of a class or a class filter) is the filter that is used on a sample block when said sample block is classified in that particular class. For instance, with syntax elements of FIG. 2, a class filter for a given class index is the Luma filter with the Luma filter index indicated in the Luma filter index table 205 for that given class index (i.e. the class index entry in that table), for example as shown in FIG. 16-*b*'s "a mapping of a class index to a filter index", alf_luma_coeff_delta_idx[filtIdx] in VTM-3.0, & FIG. 16-*c*'s alf_luma_coeff_delta_idx[altIdx] [filtIdx]. In an alternative further variant of the variant 2, the class filter switch flags are replaced by class filter disable flags (which have the same effect), or by class filter enable flags (which have the opposite effect from the class filter switch flags: i.e. class filter enable flag equals to zero means the filter is switched/changed, equals to one means the filter is not switched/changed.

FIG. 7-*b* is a flow chart illustrating an example of the signalling syntax elements that can be used for implementing variant 2, which signals for each CTU (e.g. as CTU data in the bitstream) which one(s) of the classes can use Luma filters, i.e. have the Luma filter enabled/adapted for use/ available for use (i.e. not switched/changed to the identity filter). FIG. 7-*b* modifies a part of FIG. 2 with an additional syntax element which is the class filter switch flag 701-*b* (one provided for each ALF Luma class). According to a further variant of the variant 2, the class filter switch flags are only provided if the ALF Luma enable flag is equal to 1. In an alternative further variant, the ALF Luma enable flag is not coded and is always inferred to be equal to the ALF active flag 202. Other further variants may use alternative syntax elements to signal which class filters are enabled or not (i.e. which class(es) have a Luma filter enabled/adapted for use/available for use).

In a variant ("variant 3") of the first signalling embodiment, variant 1 is extended so that using the same syntax structure for the CTU, Luma filter switch flag enables switching/selecting between two encoded filters (i.e. two alternative filters or "filter alternatives"). So variant 1 is a specific case of the variant 3, wherein one of these two filters (e.g. an "alternative filter") is always the identity filter. For variant 3, additional signalling may be required to signal/ provide filter coefficients for the alternative filter (i.e. the alternative filter coefficients) to the decoder because unlike the identity filter, the alternative filter's filter coefficients are not predefined. In a first further variant of variant 3, in FIG. 6, the step 603 is modified so that the obtained Luma filter set contains the filter coefficients for each filter index for the CTU. Thus, step 603 selects for each filter index the filter coefficients of the Luma filter or the filter coefficients of the alternative Luma filter, depending on the CTU data signalling of the information for identifying/switching/changing a filter. In that first variant step 606 is unchanged. In a second further variant of variant 3, in FIG. 6, the step 603 is modified so that the obtained Luma filter set is the same for any CTU, and contains the filter coefficients for each alternative for each filter index (i.e. the Luma filter and the alternative Luma filter), as signalled in APS/slice header/tile group header as shown in FIG. 16-*b* & FIG. 16-*c*. The step 606 is modified to obtain the Luma filter constructed by using the filter coefficients of the alternative indicated by the CTU data signalling of the information for identifying/ switching/changing a filter (i.e. using the coefficients of the Luma filter or the coefficients of alternative Luma filter) for the filter index corresponding to the class of the 4×4 block, and by organizing/arranging that filter coefficients according to transposeIdx.

FIG. 7-*c* provides an example of signalling syntax elements that can be used for implementing variant 3. In the slice header for instance (alternatively in APS or in tile group header), the filter coefficient table for each Luma filter 206 is identified as "filter alternative 0 coefficient table" (i.e. a filter coefficient table for the alternative filter 0) for each Luma filter 716 (i.e. for each filter index). It corresponds to a first filter set alternative (or "a first alternative filter set" or "a first alternative filter group"), i.e. a set or group of filters that are available for use when Luma filter switch flag is equal to 0. An additional flag (e.g. a second Luma filter table flag 717) is provided, the second Luma filter table flag 717 indicating if a second set/group of filters (e.g. a "second filter set alternative" or a "second alternative filter set" or a "second alternative filter group") is provided/available for use or not. If the second Luma filter table flag 717 is equal to one, the second filter set alternative is provided in the slice/tile group header/APS. The second filter set alternative is the filter coefficient table for each Luma filter 718 (also identified as "filter alternative 1 coefficient table"), which has the same size as the filter alternative 0 coefficient table for each Luma filter 716, and contains the filter coefficients for the filters that are used when a Luma filter switch flag 701-*a* (in FIG. 7-*a*) is equal to 1 for a given filter index. When the second Luma filter table flag 717 is equal to 0, the filter alternative 1 coefficient table for each Luma filter 718 is inferred as containing filter coefficients of the identity filter. In an alternative further variant, when the second Luma filter table flag 717 is equal to 0, the Luma filter switch flags 701-*a* are not signalled/coded and are inferred as being equal to 0 (or equivalently the Luma filter enable flags 208 are not signalled/coded and are inferred as being equal to 1).

In a particular embodiment of the present invention, applicable to variant 3, the "maximum number of signalled Luma filters" applies to the number of luma filters 204. In that variant the maximum memory needed for storing Luma filters is then the double the maximum memory needed for storing Luma filters without offering the possibility to signal alternative filters.

FIG. 7-*d* provides an alternative to the signalling of FIG. 7-*c* according to another further variant. It offers the possibility of having one filter or two filter alternatives per each filter index. The filter alternative 0 coefficient table for each Luma filter 716 is still encoded, and corresponds to the encoding of the filter coefficients alternative 0 for Luma filter 721 for F equal to each filter index (i.e. F varying from 0 to Num. Luma filters 204 minus one). For each Luma filter index, a Luma filter F alternative 1 flag 722 is provided. If the Luma filter F alternative 1 flag 722 is equal to 1 for a given filter index F, the filter coefficients alternative 1 for Luma filter F 723 is encoded and provides filter coefficients which are used when the Luma filter switch flag 701-*a* for that given filter index F (or in given other variants, when the class filter switch flag 701-*b* for a class using that given filter index F) is equal to 1. If the Luma filter F alternative 1 flag 722 is equal to 0 for a given filter index F, the filter coefficients alternative 1 for Luma filter index F 721 are inferred as being the identity filter coefficients. In alternative further variant, when Luma filter F alternative 1 flag is equal to zero for a given filter index F, the Luma filter switch flag 701-*a* for that filter index F (or in some other variants, the class filter switch flag 701-*b* for a class using that given filter index F) is not signalled/coded and is inferred as being equal to 0 (or equivalently the Luma filter enable flag (or in some other variants the class filter enable flag) is not signalled/coded and is inferred as being equal to 1).

For limiting the memory for storing luma filters a limit on the "maximum number of signalled Luma filters" is applicable to the number of luma filters 204. Alternatively, a limit on the "global maximum number of signalled Luma filters" is applicable to the sum of the number of filters signalled using the filter coefficients alternative 0 for Luma filter 721 and the number of filters signalled using the filter coefficients alternative 1 723. In still a further alternative a first limit on the "maximum number of signalled Luma filters 0" is applicable to the number of filters signalled using the filter coefficients alternative 0 for Luma filter 721, and a second limit, different from the first limit, on the "maximum number of signalled Luma filters 1" is applicable to the number of filters signalled using the filter coefficients alternative 1 for Luma filter 723.

In a variant ("variant 4") of the second signalling embodiment, variant 2 is extended so that that using the same syntax structure for the CTU, class filter switch flag enables switching/selecting between two encoded filters (i.e. two alternative filters or "filter alternatives"). So variant 2 is a specific case of variant 4, wherein one of these two filters (e.g. an "alternative filter") is always the identity filter (which also means the predefined filter coefficients for the identify filter may not need to be signalled in variant 2). For variant 4, additional signalling may be required to signal/provide filter coefficients for the alternative filter (i.e. the alternative filters coefficients) to the decoder because unlike the identity filter, the alternative filter's filter coefficients are not predefined. This is different from variant 3 because using one flag per class in CTU data offers more flexibility for the design and signalling of the filters than using one flag per filter index as in variant 3. With one flag per class, the filter merging in one filter set/group can be independent of the filter merging in the second filter set/group (i.e. each filter set/group can have its own table of 'filter index for each class' 205). In FIG. 6, the step 603 is modified to obtain two Luma filter set alternatives and the step 606 is modified so that, if the class filter switch flag for the class index is equal to zero, the filter is obtained from the first alternative filter set. And, if the class filter switch flag is equal to one, the filter is obtained from the second alternative filter set. Alternatively, the class level alternative filter selection can be made at step 603, and then instead of a filter set containing a filter for each filter index, a filter set containing a filter for each class can be used/obtained.

FIG. 7-*e* is a flow chart illustrating a signalling for the two filter set alternatives that can be used for implementing variant 4. "Num. Luma filters 0" 734, replaces the "Num. of Luma filters" 204 of FIG. 2, and provides the number of Luma filters for the first filter set alternative. Filter index table 0 for each class 735 replaces Filter index for each class 205 of FIG. 2 and is a table providing for each class index the filter index to use when the corresponding class filter switch flag is equal to 0 in CTU data. This table informs of the filter merging performed with filters of the first filter set alternative. Coefficients table for each Luma filter 0 736 replaces the coefficients table for each Luma filter 206. This table contains the filter coefficients for each one of the Num. Luma filter 0 734, the Luma filters of the first filter set alternative. A second Luma filter table flag 737 is provided/obtained. If that the second Luma filter table flag 737 is equal to one, the number of luma filters 738, the filter index table 739 and the filter coefficients 740 for the second filter set alternative are provided/obtained (e.g. in/from APS). They are used instead of the first filter alternative for filtering each block with a class (index) for which the class filter switch flag is equal to 1 in the CTU data. In a further variant of variant 4, when the second Luma filter table flag 737 is equal zero, the number of luma filters of the second alternative set 738 is inferred to be 1 and that one filter in the coefficients table for the second alternative filter set 740 is inferred to be the identity filter. In an alternative further variant, when the second Luma filter table flag 737 is equal zero, the class filter switch flags 701-*a* are not provided in the CTU data and they are inferred to be equal to zero. For limiting the memory for storing luma filters a limit on the "maximum number of signalled Luma filters" is applicable to the number of luma filters 0 734 and to the number of luma filters 1 738. Alternatively, a limit on the "global maximum number of signalled Luma filters" is applicable to the sum of the number of luma filters 0 734 and the number of luma filters 1 738. In still a further alternative a first limit on the "maximum number of signalled Luma filters 0" is applicable to the number of luma filters 0 734, and a second limit, different from the first limit, on the "maximum number of signalled Luma filters 1" is applicable to the number of luma filters 1 738.

In a variant ("variant 5") of the first embodiment, variant 3 is extended to enable switching/selecting among more than two alternative (encoded) filters in each CTU. In the FIG. 6, the step 603 is modified so that the obtained Luma filter set contains filter coefficients for each filter index (i.e. the Luma filters and the Luma filter alternatives) signalled, for the CTU, in the APS/Slice header/Tile Group header.

FIG. 8-*a* is a flow chart illustrating the signalling syntax elements that can be used for implementing variant 5, which modifies the flow chart of FIG. 7-*a*. The Luma filter switch flags 701-*a* (or similarly the Luma filter enable flags) are replaced by Luma filter alternative indexes 801, one Luma filter alternative index for each filter index. For a given filter index, the Luma filter alternative index provides an index of the Luma filter alternative table from which the filter coefficients of the filter with the given filter index will be taken when filtering a block of samples with a class (index) associated with that given filter index (identified by the filter index for each class 205).

FIG. 8-b, FIG. 8-c, FIG. 8-d, and FIG. 8-e are flow charts illustrating alternative signalling of the Luma filter alternative tables for use with variant 5.

In FIG. 8-b, each Luma filter alternative N table 802 is obtained/processed, followed by obtaining/processing of a Luma filter table alternative N+1 flag 803 which indicate if there is another Luma filter alternative N+1 table to be obtained/processed. In FIG. 8-c, instead of using such flags, the number of alternative tables 804 is provided/obtained so that obtaining/processing of Luma filter alternative N table 802 can be performed for all the alternatives using this number of alternative tables 804. For limiting the memory for storing luma filters a limit on the "maximum number of signalled Luma filters" is applicable here to the number of luma filters 204. In this case the maximum memory needed for storing Luma filters is (Nmax+1) times the maximum memory needed for storing Luma filters without offering the possibility to signal alternative filters (i.e. only one filter set is used), where (Nmax+1) is a "maximum number of signalled alternative Luma filters". For example, if the alternative sets are numbered 0, 1 and 2, then Nmax (highest value of N) is 2 and there are Nmax+1=3 filter sets in total. In FIG. 8-b, for each alternative filter set (filter alternative 1 set, filter alternative 2 set, etc.) after the first alternative filter set (filter alternative 0 set) a Luma filter table alternative N+1 flag 803 has to be signalled. It will be observed that the maximum number of times the "Luma filter table alternative N+1 flag" 803 can be equal to 1 is Nmax, to really limit the used memory. In FIG. 8-c, (Nmax+1) corresponds to the maximum value that Num. alternatives 804 can take. Alternatively, a limit on the "global maximum number of signalled Luma filters" is applicable to limit the value of (Nmax+1) times the number of Luma filters 204. In variants using Nmax, the last 0 flag can be omitted in the bitstream if N+1>Nmax, because it is not allowed.

FIG. 8-d illustrates a further variant that enables signalling of a different number of alternative filters for each filter index. In such a further variant, for a given filter index F, the filter alternatives for that filter index F 811 are successively provided using the same mechanism as in FIG. 8-b: one Luma filter F alternative N+1 flag 812 indicates if there is another filter alternative N+1 available. This is done for each filter index. For each filter index Nmax, the ("maximum number of signalled alternative Luma filters" minus one), corresponds to the maximum number of times "Luma filter F alternative N+1 flag" 812 can be equal to 1. A limit on the "global maximum number of signalled Luma filters" is applicable to limit the total number of Luma filters signalled in 811 (sum of the number of alternatives for each filter index F). Alternatively, a limit per alternative set may be imposed as the "maximum number of signalled Luma filters 'N'" for N ranging from 0 to Nmax, Each per-set limit corresponds to the maximum number of times 811 is used for the given value of N among all the filter indexes F. Then, for a given filter index F it is not possible to have a filter with index F for an alternative N+1 unless there is a filter with index F in alternative N because of the "Luma filter F alt. N+1" flags 812. It means that alternative N always has the same number of filters as, or more filters than, alternative N+1. Thus to properly estimate the maximum memory as the sum of the values of "maximum number of signalled Luma filters N" for N ranging from 0 to Nmax these values shall be decreasing (in other words not having "maximum number of signalled Luma filters N" decreasing as N increases, has no sense, or is not useful).

FIG. 8-e illustrates another further variant that enables merging of the filter indexes between each successively signalled alternative tables of filter coefficients. It enables a reduction in the number of filter indexes in successive alternatives with a small additional cost for signalling the association of each class index with a filter index for each alternative. The number of Luma filters for the first filter alternative 0 table is provided 821. If there is more than one filter in the first filter alternative 0, the table 822 is signalled, associating a filter index 0 (the index of a filter in the filter alternative 0 table 823) with each class index. If there is only one filter in the first filter alternative 0, each class index is associated with that filter (i.e. with the filter with a 0 index) and no such table is signalled. The filter coefficients for Luma filters for the first filter alternative 0 table are provided in 823. 821, 822 and 823 are similar to 204, 205 and 206 in FIG. 2, but they are modified for using the first filter alternative 0. Starting with N=1 (for the second filter alternative table), a Luma filter table alternative N flag 824 is provided to indicate if a Luma filter alternative table N is available (the N+1-th table because the alternative table index starts from 0). If the flag indicates that a Luma filter alternative table N is available, the number of Luma filters in that table N is provided 825. Then, instead of providing a table associating each class with a filter index (as in 822 in FIG. 8-e or as in 831 in FIG. 8-f or as in 905 in FIG. 9, for instance), and to reduce (unnecessary, in some cases) signalling cost, a table associating/mapping a filter index N (an index of a filter in the filter alternative N table) with/to another filter index [N−1] (an index of a filter in the filter alternative [N−1] table) is provided/obtained in 826. Such a (mapping) table is a lookup table of size Num Luma filters [N−1] (with the lookup table's own positional index corresponding to the filter index N, for instance) associating/mapping a filter index of the previous Luma filter table (i.e. each index of a filter in the filter alternative table [N−1]) with/to a filter index in the N+1-th alternative Luma filter table (i.e. an index of a filter in the filter alternative table N, which is N+1-th because filter alternative table 0 is the first), which is the filter alternative table N being provided/obtained in 827. Then N is incremented and the Luma filter table alternative N flag 824 is signalled for the next Luma filter alternative table. The decoder can easily reconstruct a 2 entry table filterCoeffDeltaIdx[altIdx][classIdx] associating each class index classIdx with a filter alternative index altIdx (altIdx=0 to numAlts−1=the number of filter alternative tables available minus one) and a filter index in the corresponding filter alternative table N. This table can be built using, for instance, the following algorithm:

```
for( altIdx = 0; altIdx < numAlts; ++ altIdx ) {
  for( classIdx = 0; classIdx < numClasses; ++ classIdx ) {
    filterIdx = classIdx
    for( currAltIdx = 0; currAltIdx <= altIdx; ++ currAltIdx ) {
      filterIdx = filterCoeffAlternativeMergeIdx[currAltIdx][filterIdx]
    }
    filterCoeffDeltaIdx[altIdx][classIdx] = filterIdx
  }
}
```

Or equivalently, using the following one:

```
for( altIdx = 0; altIdx < numAlts; ++ altIdx ) {
   for( classIdx = 0; classIdx < numClasses; ++ classIdx ) {
      if( altIdx == 0 )
         filterIdx = classIdx
      else
         filterIdx = filterCoeffDeltaIdx[altIdx - 1][classIdx]
      filterIdx = filterCoeffAlternativeMergeIdx[altIdx][filterIdx]
      filterCoeffDeltaIdx[altIdx][classIdx] = filterIdx
   }
}
```

Here, table filterCoeffAlternativeMergeIdx[0] equals to table 822 Filter index 0 for each class, i.e filterCoeffAlternativeMergeIdx[0][classIdx] is the filter index for the class with class index classIdx in the filter alternative 0 table. And for N>0, filterCoeffAlternativeMergeIdx[N] equals to table 826 Filter index N for each filter index N−1, i.e. filterCoeffAlternativeMergeIdx[N][filterIdx] is the filter index (in the filter alternative N table) associated a filter index filterIdx of the filter alternative N−1 table. The variable numAlts is the number of Luma filter table alternatives that are available, and the variable numClasses is the number of class indexes.

It is understood that the filter merging technique of this further variant could also be applied to variant 3, by limiting the maximum number of filter alternative tables to 2.

For limiting the memory, similarly to FIG. 8-*b*, FIG. 8-*c* and FIG. 8-*d*, the "maximum number of signalled Luma filters" is applicable to Num Luma filter 0 821 and to Num Luma filters N 825, N is from 1 up to Nmax, and Nmax is equal to the maximum number of times "Luma filter table alternative N flag" 824 can be equal to 1. Alternatively, a limit on the "global maximum number of signalled Luma filters" is applicable to limit the total number of Luma filters signalled in 823 and in 827 (i.e. the sum of the signalled number of luma filters 0 821 and of each signalled number of Luma filters N 825). In a still further alternative the "maximum number of signalled Luma filters 0" can limit the maximum value the number of luma filters 0 821 can take; and further per-set limits on the "maximum number of signalled Luma filters N", with N from 1 up to Nmax respectively, can limit the maximum value the number of Luma filters N 825 can takes. To properly estimate the maximum memory as the sum of the values of "maximum number of signalled Luma filters N" for N ranging from 0 to Nmax, these values should decrease as N increases.

In some variants Nmax is equal to 1 (i.e. maximum two alternative filter sets are used) and maximum number of signalled Luma filters 0 and maximum number of signalled Luma filters 1 are set to {X, Y}, with X belonging to the interval [3, 7] and Y belonging to the interval [1, 7], and Y<=X. It is also understood that in another further variant, the Luma filter table alternative N flags 824, could be replaced by a single syntax element directly providing the number of Luma filter table alternatives that are available, similarly to what was done with 804 in FIG. 8-*c*. According to such a further variant, instead of using flags 824, the number of alternative tables 804 is provided/obtained so that obtaining/processing of the "number of Luma filters N" in table N 825, "Filter index N for each filter index N−1" table 826, and Luma filter alternative N table 827 can be performed for all the alternatives using this number of alternative tables 804. As for FIG. 8-*c*, Nmax+1 corresponds here to the maximum value that Num. alternatives 804 can take.

FIG. 8-*f* illustrates another further variant that enables use of Luma alternative filter sets having independent sizes from each other: each Luma alternative filter set can have its own size, and there is no constraint on the merging of indexes between Luma alternative filter set (contrarily to the variant shown in FIG. 8-*e*).

In this further variant, the number of Luma alternative filter sets is provided/obtained in 'Num. alternatives' 804. For N equal to zero up to 'Num. alternatives' minus one, the number of Luma filters in that table N is provided/obtained 825 (like in FIG. 8-*e*). If this number is greater than one, a table 831 is signaled, associating a filter index in the Luma alternative filter set to each class (index) (for instance as in 822 in FIG. 8-*e* or in 905 in FIG. 9). The Luma filter alternative N table 827, as in FIG. 8-*e*, comprises the filter coefficients for the filters in the Luma alternative N filter set. For limiting the memory, similarly to FIG. 8-*e*, a limit on the "maximum number of signalled Luma filters" is applicable to Num Luma filters N 825, where N equal to 0 up to Nmax with (Nmax+1) being the maximum number of alternatives 804. Alternatively a limit on the "global maximum number of signalled Luma filters" is applicable to limit the total number of Luma filters signalled in 827 (i.e. the sum of each signalled number of Luma filters N 825). In still a further alternative per-set limits on the "maximum number of signalled Luma filters N", with N from 0 up to Nmax respectively, may be applied to set the maximum value the number of Luma filters N 825 can take.

In a variant ("variant 6") of the second embodiment, variant 4 is extended to enable switching/changing of the luma filter for each class between more than two alternative encoded filters in each CTU. For this variant 6, in FIG. 6, the step 603 is modified to obtain as many Luma filter set alternatives as signalled (i.e. for each of all the filter set alternatives, a filter set comprising filter coefficients for each filter (index) is signalled) and the step 606 is modified so that the filter is obtained from the filter set alternative with an index equal to the 'class filter alternative index' for the class (index) of the block. Alternatively, the class filter alternative selection could be made for each class (i.e. all the available classes have a class filter alternative selection made for them), in step 603 instead of in step 606 (where the class filter alternative selection is made for one given class obtained in step 605). Then instead of obtaining a filter set containing filter coefficients for each filter index, and for each filter set alternative in 603, a filter set containing filter coefficients for each class (index) could be obtained. The filter coefficients in that set are selected for each class from the filter set alternative with an index equal to the 'class filter alternative index' provided for that class (index). Looking at FIG. 9, the filter index for a given class index is obtained from the 'filter index table N for each class' 905, for a class signalled as using the class filter alternative N in the CTU 901. Step 606 would then just consist in obtaining the filter coefficients for the block class obtained in 605 and transposing/organizing/configuring those filter coefficients according to transposeIdx, which is also obtained in 605.

In some further variants of variant 1 or variant 3, the number of Luma filter switch flags (for variant 1) or of Luma filter alternative indexes (for variant 3) provided in CTU (i.e. indicated by 701-*a* in FIG. 7-*a* for variant 1, or by 801 in FIG. 8-*a* for variant 3, for the given filter index) is the same as the number of filters in the first Luma alternative filter set, but the number of filters in any other Luma alternative filter set may not always be the same. Then the selection of the filter for a given class is performed as follows (modifying step 603 or 606 depending on the implementation): First, take the filter index for (associated with) the given class, the filter index being for identifying a filter index in the first Luma alternative filter set. Then take the Luma alternative filter set indicated for that filter index in the CTU data (i.e. indicated by 701-*a* in FIG. 7-*a* for variant 1, or by 801 in FIG. 8-*a* for variant 3, for the given filter index). Finally, take the Luma filter from that Luma alternative filter set that is associated with the given class (see description of FIG. 8-*e* or FIG. 8-*f* for instance, which show variants with the association of a filter index in a filter set alternative to a class index).

In one of such further variants, the number of filters in one Luma alternative filter set is independent of the number in another Luma alternative filter set. One of such further variants is illustrated in FIG. 8-*f*. In another further variant, the number of filters in the first Luma alternative filter set is limited by the "maximum number of signalled Luma filters" (which is less than the 25 classes in VTM-3.0 classification), but the number of filters in another Luma alternative filter set (e.g. (i+1)-th Luma alternative filter set) cannot be more than the number of filters in the previous Luma alternative filter set (i.e. i-th Luma alternative filter set). In yet another of such further variants, the classes associated with each filter of the (i+1)-th Luma alternative filter set can only be obtained by merging classes associated with filters of the i-th Luma alternative filter set (i.e. by merging filter indexes of the previous Luma alternative filter set). One of such further variants is illustrated in FIG. 8-*e*.

In some variants the "maximum number of signalled alternative Luma filters" (Nmax) and/or the "maximum number of signalled Luma filers" and/or the "global maximum number of signalled Luma filters" and/or the "maximum number of signalled Luma filters N" for N ranging from 0 to Nmax is/are not transmitted from the encoder to the decoder, but is/are fixed in both. In other variants it/they is/are not transmitted from the encoder to the decoder, but they are determined based on a profile and/or tier level (or another parameter) which is transmitted. In yet another variant, it/they is/are explicitly encoded in the bitstream (in SPS or PPS for instance) to be transmitted from the encoder to the decoder.

Figure 9:
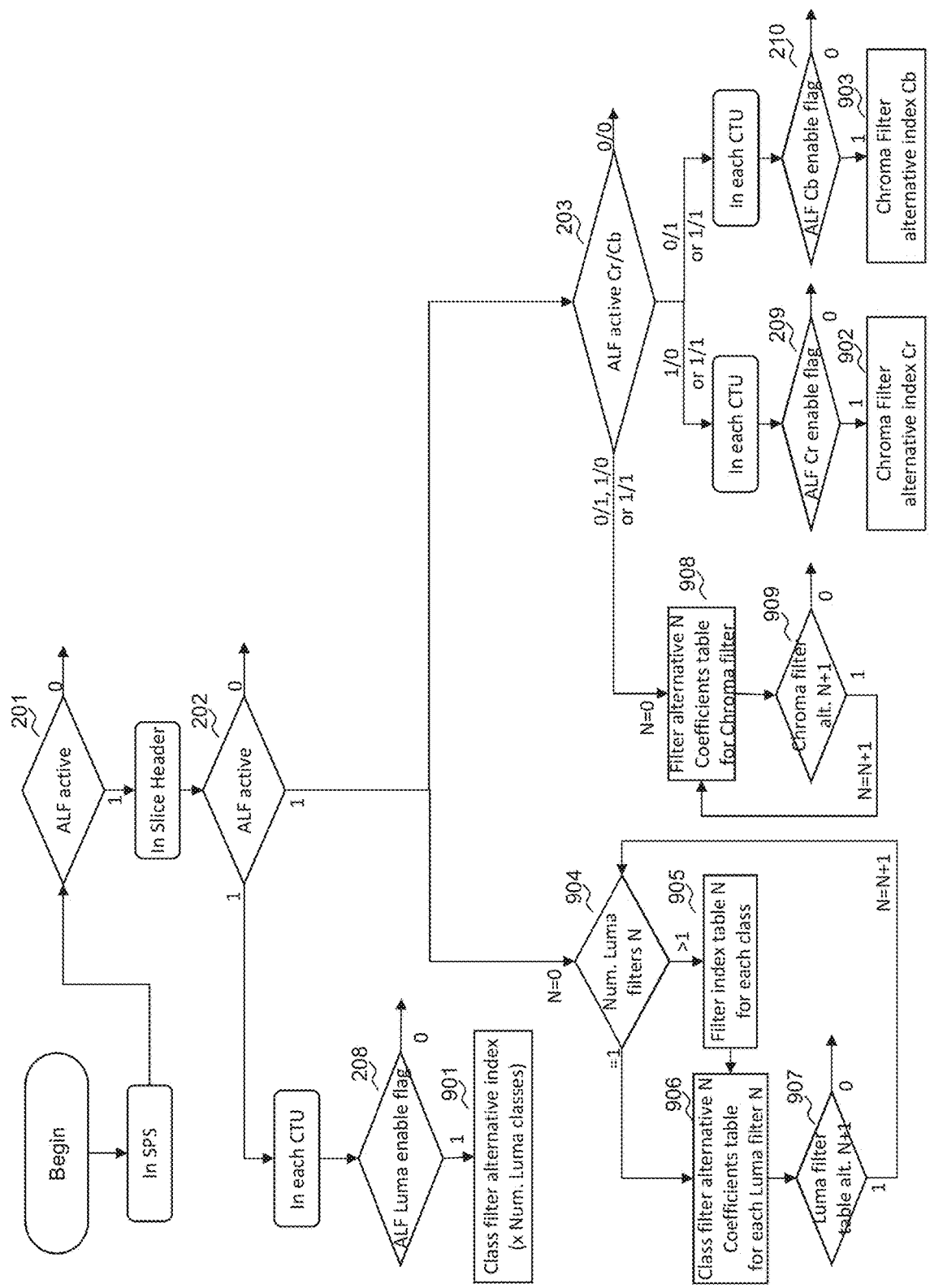
FIG. 9 is a block diagram illustrating a syntax element change according to an embodiment of the invention, which enables a luma filter selection from more than one alternative Luma filters for each ALF class for each CTU.

FIG. 9 is a flow chart illustrating the syntax elements that can be used for implementing variant 6. This flow chart also provides use of filter alternatives for the Chroma filter (it is understood that these additional chroma filters could also be used with any of the foregoing embodiments/variants). In some variants, only the chroma filter process (syntax elements) is used (i.e. there are chroma filter alternatives, but there is no alternative luma filter set, nor luma filter alternatives). The flow chart modifies the flow chart shown in FIG. 2. For each CTU, if the ALF Luma enable flag 208 is equal to 1, a class filter alternative index is provided for each class 901. In the flow chart of FIG. 6, step 603 obtains all the filter coefficients for all the filter alternatives for all class/filter indexes, the step 606 obtains the Luma filter coefficients using the alternative index indicated in the CTU data for the class of the block being processed, and organizes them according to the transposeIdx. Alternatively, step 603 obtains a set of the Luma filter coefficients for all the class indexes using the class filter alternative index indicated in the CTU data for each class 901; and step 606 obtains the Luma filter coefficients from the set of the Luma filter coefficients (obtained in step 603) for the class index obtained in step 605 and organizes them according to the transposeIdx also obtained in step 605. As with Chroma, if ALF Cr enable flag 209 is equal to 1, a Chroma filter alternative index 902 is provided for Cr in each CTU data of the Cr CTB that is being processed. The step 614 obtains the Chroma filter corresponding to that Chroma filter alternative index for processing the Cr CTB samples. If ALF Cb enable flag 210 is equal to 1, a Chroma filter alternative index 903 is provided for Cb in each CTU data of the Cb CTB that is being processed. The step 611 obtains the Chroma filter corresponding to that Chroma filter alternative index for processing the Cb CTB samples. These syntax elements, or functional equivalents thereof, can also be found in FIG. 16-*b* and FIG. 16-*c*.

The signalling of the Luma class filter alternatives is performed in the slice header (or alternatively in the APS or in the tile group header, for instance), and the signalling of the filter alternatives for Chroma is performed. For Luma class filter alternatives, starting with N=0, the number of Luma filters for alternative index N is signalled 904, and the filter index table N for each class 905 is signalled if the number of filter is greater than 1, and the filter index table N associates a filter index to each class for their N-th alternative. The 'class filter alternative N coefficient table for each Luma filter N' 906 contains the filter coefficients for the 'Num Luma filters N', i.e. the Luma filters for the N-th alternative. Then Luma filter alternative N+1 flag 907 indicates if another Luma class filter alternative is available. If this Luma filter alternative N+1 flag is equal to one, N is incremented and the signalling loops back to step 904 to obtain the next filter. If the Luma filter alternative N+1 flag is equal to zero, there is no other Luma class filter alternative that has been/is to be signalled. The signalling of the Chroma filter alternatives starts with N=0, i.e. by the signalling of the filter coefficients of the first filter alternative 908. Chroma filter alternative N+1 909 indicates another Chroma filter alternative is available. If the Chroma filter alternative N+1 flag is equal to one, N is incremented by one and the next Chroma filter alternative is signalled. If it equals to zero, no other Chroma filter alternative is signalled. In one variant, instead of the flag 'Chroma filter alt. N+1' element 909, the number of Chroma filter alternatives is directly provided in one syntax element, before providing the filter alternative N coefficient table for each one of the alternative Chroma filters. For limiting the memory, similarly to FIG. 8-*b*, FIG. 8-*c* and FIG. 8-*e*, Nmax is equal to the maximum number of times "Luma filter table alt. N+1 flag" 907 can be equal to 1. Alternatively, a limit on the "global maximum number of signalled Luma filters" is applicable to limit the total number of Luma filters signalled in 906 (sum of the number of Luma filters N 904). In a still further alternative per-set limits on the "maximum number of signalled Luma filters 0" to the "maximum number of signalled Luma filters Nmax" respectively are applicable to the number of Luma filters signalled in 906 for each possible value of N.

In some of the previous variants, where the number of filters can be different for each alternative index, e.g. those illustrated with FIG. 7-*d*, FIG. 7-*e*, FIG. 8-*d*, FIG. 8-*e*, and FIG. 8-*f*, and where there is a different "maximum number of signalled Luma filters" per alternative filter set index, the "maximum number of signalled Luma filters 0" is not used (or is equivalently set equal to the maximum number of filters allowed by the decoding process, e.g. the number of classes, e.g. 25), to keep as much of the flexibility of ALF than it would have without alternative filter set alternatives and without any "maximum number of signalled Luma filters". In that variant the "maximum number of signalled Luma filters N" are still used for N>0, to still limit the memory usage while allowing the coding gains provided by using alternative filter sets. In one of such variant, the "maximum number of signalled alternative Luma filters" is set equal to 2 and the {"maximum number of signalled Luma filters 0", "maximum number of signalled Luma filters 1"} are set equal to {25, 13}. In other variants they are set equal to {25, 7}, {25, 5}, {25, 3}, {25, 2} or even {25, 1}.

It can be noted that with alternative filter sets it is still preferable that the value of the "maximum number of signalled Luma filters 0" is an odd number and is greater or equal to 3 (for the same reasons as mentioned previously when not using alternative filter sets). But there is less importance for the values of the "maximum number of signalled Luma filters N", with N>0, which can be either equal to 1, 2, or 3.

In some variants, the "maximum number of signalled alternative Luma filters" is set equal to 2 and the {"maximum number of signalled Luma filters 0", "maximum number of signalled Luma filters 1"} are set equal to {7, 7}, {7, 5}, {7, 3}, {7, 2}, {7, 1}, {5, 5}, {5, 3}, {5, 2}, {5, 1}, {3, 3}, {3, 2} or {3, 1}, as good compromises for coding gains versus memory used for storing the filters.

In some of the previous embodiments and variants where there are alternative filter sets (i.e. in embodiments/variants where the number of filter alternatives is the same for each filter index or for each class (index)), the filter coefficients of each filter set is coded in the same way (i.e independent of each other). For instance, each filter set uses the same syntax elements as those used in VVC Draft 3 (VTM-3.0) to signal the ALF Luma filter coefficients.

In some of the previous embodiments and variants, including embodiments/variants, the number of filter alternatives is not the same for each filter index (e.g. FIG. 7-d and FIG. 8-d). In a variant of such embodiments/variants, all the filter alternatives of a given filter index are encoded independently of the filters for another filter index. For instance, the coding of the filter alternatives for a given filter index is performed using the same syntax elements as those used in VVC Draft 3 (VTM-3.0), which are used to signal the ALF Luma filter coefficients. Then, filter prediction can be used between filter alternatives. For instance, the filter coefficients of the first filter alternative are encoded directly, using Golomb code of their value, and the filter coefficients of the next filter alternative are encoded with a Golomb code of the difference between their value and the value of the coefficients from the previous filter alternative (i.e. residual).

In one alternative variant, for each filter index, the filter coefficients of the first filter alternative are first encoded, for instance using the same signalling as in VVC Draft version 3 (VTM-3.0) for the ALF Luma filter coefficients. Then for each given filter index, all the filter coefficients of each next filter alternative with the given filter index are encoded using a prediction from the filter coefficients of the filter alternative with its previous filter alternative index and with the same filter index.

In the embodiments/variants where the number of filter alternatives is the same for each filter index, and the number of filters per alternative filter set is the same; one way of signalling the filter related information is to first encode the filters of the first filter set. Then for each alternative filter set, the filter coefficients of the alternative filter sets are predicted from the coefficients of the filters in the previous filter set and the coefficient residuals of the filters are encoded as in VVC Draft version 3 (VTM-3.0) for the ALF Luma filter coefficients. VVC Draft version 3 signalling allows prediction between successive filters. Here, if the prediction mode is chosen, instead of using prediction between filter coefficients, the prediction is performed on the residual coefficients (double prediction is performed).

In the embodiments/variants where the number of filter alternatives is the same for each filter index, but the number of filters per alternative filter set is not the same, and filter merge is used between filter sets (e.g. descriptions of FIG. 7-e and FIG. 8-e), one way for signalling the filter related information is to first encode the filters of the first filter set, for instance using the same signalling as in VVC Draft version 3 (VTM-3.0)_for the ALF Luma filter coefficients. Then for each alternative filter set, the filter coefficients of a given filter are predicted from the filter coefficients of the first filter in the previous filter set with a filter index that was merged into the filter index of the given filter. Then for each alternative filter set, the coefficient residuals of all the filters are encoded as in VVC Draft version 3 (VTM-3.0) for the ALF Luma filter coefficients. Alternatively, instead of the first filter in the previous filter set with a filter index that was merged into the filter index of the given filter, another predetermined one could be used. Alternatively, instead of the filter in the previous filter set with a filter index that was merged into the filter index of the given filter, another one could be used, the index of which is provided/signalled in the bitstream. same for each filter index or for each class (index) (i.e. we have filter set alternatives, but each filter set alternative may have different numbers of filters: see FIG. 8-e, FIG. 8-f of FIG. 9 for instance), one way for signalling the filter related information is to first code the filter set using the same syntax elements as those used in VVC Draft version 3 (VTM-3.0) to signal the ALF Luma filter coefficients. Then for each filter set, the filter coefficients of the first filter can be predicted from the filter coefficients of the first filter of the previous filter set. Then the coefficients residual of this filter and the other filter coefficients are encoded using the same syntax elements as those used in VVC Draft version 3 to signal the ALF Luma filter coefficients. VVC Draft version 3 signalling allows prediction between successive filters. If that prediction mode is used, normally the first filter is encoded without prediction (but in this variant/here it is encoded with prediction from the previous filter set). Then the next filters are predicted from the previous ones (here for the second filter prediction, the first filter is used, not the first filter residual).

In alternative variants of the previous embodiments/variants, each time a prediction is performed/used, instead of using 'the immediately previous filter alternative' or 'the immediately previous filter set' for the prediction, 'a previous filter alternative' or 'a previous filter set' is used for the prediction, the index of which is indicated in the bitstream.

It is understood that any one of the previously described embodiments/variants can be extended for use with ALF using one or more non-linear filters. Such extended variants, when one or more clipping function(s) is used for a non-linear filter, include or replace clipping parameters for each Luma filter 511 and clipping parameters for Chroma filter 512 in the same way as they are done for the filter coefficient table for each Luma filter 206 and the filter coefficient table for Chroma filter. Then the clipping parameters are provided in the bitstream for each possible filter alternative.

In some variants of variant 1 and variant 3, i.e in variants where Luma filters can be switched/changed for each filter index, and where the number of filters is the same in each 'filter alternative coefficient table for each Luma filter' (FIG. 7-c, FIG. 7d, FIG. 8-b, FIG. 8-c and FIG. 8-d, for instance), the clipping parameters can be shared by more than one, or indeed all the, filters having the same filter index. Then, the number of clipping parameters transmitted is the same whatever is the number of filter alternatives.

The variants for limiting the memory for storing clipping values as described with FIG. 5 can readily be combined with alternative filters sets for which limits are imposed on the maximum numbers of filters (for one set such as the largest set or when the sets all have equal numbers; or for all the sets collectively; or for each individual set). For instance, when the number of coefficient tables for each Luma filter 506 is the same as the number of tables of clipping values for each Luma filter 511 the "maximum numbers" are the same for the number of tables of filter coefficients and the number of table of clipping values. The other variants can easily extend or be combined with non-linear filters.

In some variants where there are alternative filter sets, an additional flag is provided with each alternative filter set to indicate if one or more alternative filters in the alternative filter set are non-linear. If one or more alternative filters in the alternative filter set are non-linear, clipping parameters for each alternative filter are also provided with/in the alternative filter set (e.g. by providing/signalling them in the bitstream).

In some variants, an additional flag is provided for each filter alternative to indicate if the filter alternative is linear or non-linear. If the alternative filter is non-linear, clipping parameters for the alternative filter are also provided (e.g. by providing/signalling them in the bitstream).

In some variants with alternative Chroma filters (i.e. where there are more than one Chroma filters available for use), an additional flag is provided for each Chroma filter to indicate if the Chroma filter is linear or non-linear. If the Chroma filter is non-linear, clipping parameters for the Chroma filter are provided (e.g. by providing/signalling them in the bitstream).

In some variants with alternative Chroma filters (i.e. where there are more than one Chroma filters available for use), prediction between filters is used. For instance, the same syntax as the one used for VVC draft version 3 (VTM-3.0) when encoding, using prediction, the Luma filter coefficients for the set of Luma filters (and so also encoding residuals) is used for encoding the set built with all the alternative Chroma filters.

In some variants where the number of signalled filter alternatives (or class filter alternatives) for a given slice/tile group is greater than one, the Luma filter alternative index 801 (or the class filter alternative index 901) is signalled in the CTU data using context adaptive binary arithmetic coding (CABAC). In one variant, the same CABAC context(s) are/is shared when signalling the filter alternative indexes for all the filter indexes (or all the class indexes). In one variant, there is only one CABAC context that is used when signalling a filter alternative index. This CABAC context is used to encode the filter alternative index (or class filter alternative index) as a unary code (similar to a CABAC encoded/decoded Golomb-Rice representation). For instance, if K is the number of available filter alternatives (i.e. the number of filter alternatives signalled in the APS or slice/tile group header), and if k is the alternative filter index to use on a block (and hence signalled), a sequence of k ones ("1s") is encoded using the CABAC context, and if k is strictly lower than K minus one (k<K−1), one termination zero ("0") is encoded at the end using the same CABAC context, to signal the end of the unary code. If k equals K minus one (k=K−1), there is no need to signal the end of the unary code because K minus one (K−1) is the maximum value that can be encoded. At decoder side, the decoder decodes, and count, as many ones as possible (up to the first one of the following occurs: either K minus one ones are read, or either the termination zero is decoded), using the same CABAC context. The count corresponds to the obtained index of the filter alternative to use on the block.

In other variant there is one CABAC context per filter index (or per class index).

In some variants, the filter switch flags (for variant 1 or variant 2) or the filter alternative indexes (for variant 3 or variant 4), as well as the ALF enable flag, are signalled at a finer granularity level than CTU (at CU level, for instance). In other variants, they are signalled at a higher granularity level than CTU (at slice or tile level (which is finer than a tile group level), for instance).

In some variants, each alternative filter set is provided in a different APS. Then, each tile group header comprises reference(s) to one or more APS to indicate from which APS (using the reference to the corresponding APS) each alternative filter set is taken from. In such variants, each APS signals ALF filter (including its filter coefficients) using the following way, for instance. Each APS contains one table of Luma filters and at most one Chroma filter. The slice/tile group header indicates the number of alternative filter sets that should be used (for the slice/tile group), and provides a list of APS indexes for the alternative filter sets. Each alternative Luma filter sets correspond to the table of Luma filters of each APS, and the set of alternative Chroma filters is built from any Chroma filter signalled in the APS. In a further variant, Slice/Tile group header indicates if ALF is enabled on Chroma, and if it is enabled on chroma, it provides a list of APS to use to build the set of Chroma filter alternatives. In other variants, filter alternatives and/or alternative filter sets are all provided in the same APS.

Some variants/embodiments described herein ensure the parsability of the slice/tile group data/content, i.e. they ensure that a decoder can continue to parse the bitstream correctly (e.g. by processing a conformant bitstream) when decoding the slice/tile group data, even if the APS data, which is not in the same NAL unit, is lost. A conformant bitstream is designed so that the decoder can decode all the syntax elements correctly without entering into an error state, and, even if the decoded content contains some errors, there is reduced risk that the decoder will behave in an unexpected manner. In such variants/embodiments, some APS syntax elements that are needed for the decoding of the CTU data may be repeated in the slice/tile group header. The first syntax elements which can be used to correct syntax decoding are ALF enable flag(s) and Chroma enable flag(s). ALF enable flag (tile_group_alf_enabled_flag in VTM-3.0 which is already in tile group header) indicates if ALF Luma enable flag is present in the slice/tile group bitstream (data) for each CTU (corresponds to alf_ctb_flag[0][x][y] in VTM-3.0). Chroma enable flags (contained in 'alf_chroma_idc' in VTM-3.0) indicates if ALF Cr enable flag and/or ALF Cb enable flag are present in the slice/tile group bitstream (data) for each CTU (corresponds to alf_ctb_flag[1][x][y] and alf_ctb_flag[2][x][y] in VTM-3.0). According to some variants, additional syntax elements are needed for correct slice/tile group syntax elements decoding. For example, in variants of the first embodiment, the number of filters for which a switch flag (or a filter alternative index) is signalled in CTU data is provided in the slice/tile group header. In variants of the second embodiment, since the number of classes is always the same (and/or can be determined from CTB data of the CTU data), this number of classes it is not needed to be signalled. In some variants, to ensure that the alternative filter index is properly decoded, the coding of the alternative filter index is performed in a way that it is not dependent of the number of allowed alternatives. For instance, in the case of the unary coding previously described, a termination zero "0" is always put after the ones "1s" even if the alternative filter index is equal to the number of alternatives minus one. Then a decoder can always parse the values even when the number of allowed alternatives can vary.

In other variants, for both the first and second embodiments, when the variant has the same number of alternative filters for any filter index (or class index), e.g. only alternative filter sets are used, the number of alternative filter sets is provided in the slice/tile group header. In variants where alternative Chroma filters are used, the number of alternative Chroma filters is provided in slice/tile group header. In other variants where the number of possible alternative filters can change/vary with the filter index (or the class index), the number of possible alternative filters for each filter index (or for each class index) is also provided in the slice/tile group header.

A group of alternative filter sets is described herein as containing all the alternative filter sets signalled either using a similar syntax to those shown in FIG. 7-c, 7-d, 7-e, 8-b, 8-c, 8-d, or 8-e for instance. In some variants, it is possible to have access to more than one groups of alternative filer sets when filtering the CTUs of a given slice/tile group. In some variants, there are possibly more than one APS which are referenced by a tile group (header), allowing to obtain more than one groups of alternative filer sets. In some variants, predefined groups of predefined alternative filter sets can be referenced, so that there is no need to signal the filter coefficients (and any clipping value indexes or clipping parameters in the case of non-linear filters) of any alternative filter sets, since they are predefined. In some variants, previously (in a decoding or processing order) decoded group of alternative filer sets can also be identified/obtained/accessed, so that there is no need to repeatedly encode the filters that are similar/same in successive frames. In some variants, in each CTU data the index of a group of alternative filter set is provided, before signalling the filter alternative indexes (or filter switch flags) for that group.

In some variants, in each CTU data, one flag is provided, the flag indicating whether all the filters of the first alternative filter set are used and/or whether the filter alternatives are signalled.

In some further variants of variant 1 or variant 3, in each CTU data, there is provided one flag which indicates whether the filter alternative indexes (or the filter switch flags) are signalled for each filter, or only one alternative filter set index (or filter switch flag) is signalled. If only one alternative filter set index (or filter switch flag) is signalled. Then ALF uses, for each class, the filter coming from the corresponding alternative filter set.

In some further variants of variant 2 or variant 4, in each CTU data, there is provided one flag which indicates whether the filter alternative indexes (or filter switch flags) are signalled for each class, or only one alternative filter set index (or filter switching flag) is signalled. If only one alternative filter set index (or filter switch flag) is signalled. Then ALF uses, for each class, the filter coming from the corresponding alternative filter set.

According to some embodiments/variants, signalling ALF related information such as ALF parameters and flags is performed using one or more of: an APS syntax (Table 1); a tile group header syntax (Table 2); a coding tree unit syntax (Table 3); and/or an ALF data syntax (Table 4) shown below, which use the same syntax naming convention as in VVC draft version 3 (VTM-3.0). Also see FIG. 16-b and FIG. 16-c for further information about these syntax elements and where/how they might be signalled/provided/obtained.

According to a variant of such embodiments/variants, all four syntaxes (e.g. Tables 1-4) are used to signal ALF related information. According to an alternative variant, only a subset of the four syntaxes are used to signal ALF related information.

TABLE 1

Adaptation Parameter Set (APS) syntax

| | Descriptor |
|---|---|
| adaptation_parameter_set_rbsp( ) { | |
|   adaptation_parameter_set_id | ue(v) |
|   alf_data( ) | |
| } | |

TABLE 2

Tile Group Header syntax - only part that is relevant to ALF

| | Descriptor |
|---|---|
| tile_group_ header( ) { | |
|   ... | |
|   if( sps_alf_enabled flag) { | |
|     tile_group_alf_enabled_flag | u(1) |
|     if( tile_group_alf_enabled_flag) | |
|       tile_group_aps_id | ue(v) |
|   } | |
|   ... | |
| } | |

A slice (header) described in relation to some embodiments (or variants thereof) is replaced by a tile group (header) as shown by the tile group header syntax of Table 2. Thus 'tile_group_alf_enabled_flag' corresponds to the syntax element for 202 in FIGS. 2 and 502 in FIG. 5, and it indicates whether the ALF is active/enabled or not for the tile group. Further, ALF data syntax element is not provided in the tile group header (in other embodiments/variants which use a slice, the ALF data syntax elements may be provided in the slice header). Instead, the ALF data syntax elements are provided in a specific parameter set called Adaptation Parameter Set (APS) as shown in Table 1. ALF data includes ALF data syntax elements, and the provision of ALF data syntax elements in the APS enables sharing of ALF parameters among more than one tile groups, e.g. among a plurality of tile groups in the same and/or in different decoded Pictures/images.

The adaptation parameter set (APS) syntax of Table 1 is used to define the signalling of any adaptation parameter sets. In a variant, the APS is included in a non-'Video Coding Layer' (VCL) 'Network Abstraction Layer' (NAL) unit (e.g. called "APS_NUT" or APS NAL unit type)."

The semantics of each syntax element of an APS are as follow:

Adaptation Parameter Set Semantics adaptation_parameter_set_id identifies the APS for reference by other syntax elements. The value of adaptation_parameter_set_id shall be in the range of 0 to 63, inclusive.

The tile group header syntax of Table 2 is used to define each tile group header. A tile group header is provided for each tile group. A tile group includes a set of tile(s), each tile including a set of CTU(s).

The semantics of the syntax elements for a tile group header are as follow:
Tile Group Header Semantics
tile_group_aps_id specifies the adaptation_parameter_set_id of the APS that the tile group refers to. The value of tile_group_aps_id shall be in the range of 0 to 63, inclusive. The TemporalId of the APS NAL unit having adaptation_parameter_set_id equal to tile_group_aps_id shall be less than or equal to the TemporalId of the coded tile group NAL unit.

Table 3 provides syntax elements for signalling, at CTU level (e.g. as CTU data), ALF (enable) flags used for each component on which ALF is active/enabled. It corresponds to syntax elements used in 208, 209 & 210 in FIG. 2. For embodiments/variants using a nonlinear ALF, it corresponds to 508, 509 & 510 in FIG. 5. According to a variant, compared to VVC draft version 3 (VTM-3.0), we add the signalling of a filter alternative index for each ALF Luma filter index (corresponding to elements of 'alf_ctb_filter_alt_idx[0]' table for each CTU position in Table 3) and the signalling of a filter alternative index for each Chroma component (corresponding to elements of 'alf_ctb_filter_alt_idx[1]' and 'alf_ctb_filter_alt_idx[1]' tables for each CTU position in Table 3). These index numbers are encoded using CABAC, with one context shared by all Luma filters, and one context for each Chroma component. The CABAC encoding of these index numbers corresponds to the encoding of the unary representation of the filter alternative index: e.g encoding a succession of bits equal to one, the number of bits equal to one corresponding to the index of the filter alternative; if the index of the filter alternative is lower than the maximum index for the filter alternative (the maximum index being 'alf_luma_num_alts_minus1' in Table 4 for a luma filter and 'alf_chroma_num_alts_minus1' in Table 4 for a chroma filter), and a bit equal to zero at the end is encoded. Decoding then comprises in decoding and counting the number of ones up to the maximum index value, the decoding of the syntax element being finished as soon as the number of one is equal to the maximum index, or as soon as a zero is decoded.

TABLE 3 coding tree unit syntax

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   . . . | |
|   if( tile_group_alf_enabled_flag ){ | |
|     alf_ctb_flag[ 0 ][ xCtb >> Log2Ctb Size ][ yCtb >> Log2Ctb Size ] | ae(v) |
|     if( alf_ctb_flag[ 0 ][ xCtb >> Log2CtbSize ][ yCtb >> Log2CtbSize ] | |
|       && alf_luma_num_alts_minus1 > 0) { | |
|       for(sigFiltIdx = 0; sigFiltIdx <= alf_luma_num_filters_signalled_minus1[ 0 ]; sigFiltIdx++) | |
|       alf_ctb_filter_alt_idx[ 0 ][ xCtb >> Log2Ctb Size ][ yCtb >> Log2Ctb Size ][ sigFiltIdx ] | ae(v) |
|     } | |
|     if( alf_chroma_idc = = 1 \|\| alf_chroma_idc = = 3 ) { | |
|       alf_ctb_flag[ 1 ][ xCtb >> Log2Ctb Size ][ yCtb >> Log2Ctb Size ] | ae(v) |
|       if( alf_ctb_flag[ 1 ][ xCtb >> Log2CtbSize ][ yCtb >> Log2CtbSize | |
|         && alf_chroma_num_alts_minus1 > 0) | |
|     alf_ctb_filter_alt_idx[ 1 ][ xCtb >> Log2Ctb Size ][ yCtb >> Log2Ctb Size ][ 0 ] | ae(v) |
|     ] | |
|     } | |
|     if( alf_chroma_idc = = 2 \|\| alf_chroma_idc = = 3 ) { | |
|       alf_ctb_flag[ 2 ][ xCtb >> Log2Ctb Size ][ yCtb >> Log2Ctb Size ] | ae(v) |
|       if(alf_ctb_flag[ 2 ][ xCtb >> Log2Ctb Size ][ yCtb >> Log2Ctb Size ] | |
|         && alf_chroma_num_alts_minus1 > 0) | |
|     alf_ctb_filter_alt_idx[ 2 ][ xCtb >> Log2Ctb Size ][ yCtb >> Log2Ctb Size ][ 0 ] | ae(v) |
|     ] | |
|     } | |
|   } | |
|   . . . | |
| } | |

The coding tree unit syntax of Table 3 is used to define an (encoded) coding tree unit. The semantics of each syntax element for a Coding Tree Unit are as follow:
Coding Tree Unit Semantics
The CTU is the root node of the coding quadtree structure.
alf_ctb_flag[cIdx][xCtb>>Log2CtbSize]
[yCtb>>Log2CtbSize] equal to 1 specifies that the adaptive loop filter is applied to the coding tree block of the colour component indicated by cIdx of the coding tree unit at luma location (xCtb, yCtb). alf_ctb_flag[cIdx][xCtb>>Log2CtbSize][yCtb>>Log2CtbSize] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>Log2CtbSize][yCtb>>Log2CtbSize] is not present, it is inferred to be equal to 0.
alf_ctb_filter_alt_idx[cIdx][xCtb>>Log2CtbSize]
[yCtb>>Log2CtbSize][sigFiltIdx] specifies the index of the filter alternative that is used by the adaptive loop filter for the filter with index sigFiltIdx when it is applied to the coding tree block of the colour component indicated by cIdx of the coding tree unit at luma location (xCtb, yCtb). With cIdx=0, the value of alf_ctb_filter_alt_idx[cIdx][xCtb>>Log2CtbSize][yCtb>>Log2CtbSize][sigFiltIdx] shall be in the range of 0 to alf_luma_num_alts_minus1, inclusive. With cIdx>0, it shall be in the range of 0 to alf_chroma_num_alts_minus1, inclusive.

When alf_ctb_filter_alt_idx[cIdx][xCtb>>Log2CtbSize][yCtb>>Log2CtbSize][sigFiltIdx] is not present, it is inferred to be equal to 0.

Table 4 provides syntax elements for signalling ALF parameters (i.e. an ALF data syntax), which build on ALF data syntax elements of the VVC Draft version 3 (VTM-3.0). These syntax elements build on those used in some of the variants described herein with reference to the ALF syntax elements of FIG. 8-a and FIG. 8-c, which in turn build on the syntax elements of FIG. 2. In this variant shown in Table 4, additional syntax elements related to the signalling of Chroma filter alternatives are also added, and the semantics for the syntax elements usable with that variant is provided below/after.

Also, in that variant, the maximum number of allowed Luma filter set alternatives (e.g. the maximum number of different filter set alternatives that could be used and signalled for Luma according to signalling constraints of the specification of the bitstream, or of the specification of a (VVC) video profile/tiers/level: i.e. the maximum value allowed/authorized by that video profile/tiers/level), or the maximum number of allowed Chroma filter alternatives (e.g. the maximum number of different filter alternatives that could be used and signalled for Chroma according to signalling constraints of the specification), may be fixed at 8. It is understood that in other variants, the maximum number of allowed Luma filter set alternatives/Chroma filter alternatives could be fixed to another value. In yet other variants, the maximum number of allowed Luma filter set alternatives/Chroma filter alternatives depends on the number of CTU included in the slice/tile group/video frame/video sequence (i.e. a "resolution" indicated by how many smaller image portion such as CTUs are in the image (portion(s)) or images). In one of those variants, the maximum number of allowed Luma filter set alternatives/Chroma filter alternatives is equal to smaller of: a positive integer value A; and the larger of B and an integer estimation/approximation of "C scaled logarithm of the number of CTU in the slice/tile group/video frame/video sequence" minus an integer value D. For instance, in some variants the maximum number of allowed Luma filter set alternatives/Chroma filter alternatives is equal to:

$$\min(A, \max(B, \lfloor C \cdot \log_2(m\_numCTUsInPic) \rfloor - D)) \quad (23)$$

where m_numCTUsInPic is the number of CTU in the Slice/Tile group/video frame/video sequence, $\log_2$ is the logarithm to base 2, $\lfloor . \rfloor$ is a rounding operator, for instance a floor rounding function. A, B, C and D are constant integers. In one variant A=1, B=8, C=1 and D=2. In another variant A=1, B=8, C=1 and D=3.

In some variants, instead of using a logarithm function, another function could be used, for instance a linear function.

In some variants, instead of using a function, a table is used, providing a maximum number of allowed Luma filter set alternatives/Chroma filter alternatives for a range of values based on the number of CTU.

In some variants, instead of using the number of CTUs/samples in a two-dimensional space as a measure of the "resolution", the number in a one-dimensional space may be used. For example, a length information is used: for instance, the number of samples (or CTUs) within a particular width or height or diagonal direction.

In another variant, instead of the number of CTUs, the number of samples is used as a measure of the "resolution", and C and D are adjusted accordingly.

In yet another variant, the maximum number of allowed Luma filter set alternatives or Chroma filter alternatives depends on the frame/slice/tile group QP value. For instance, the maximum number of allowed Luma filter set alternatives or Chroma filter alternatives for frame/slice/tile group with a relatively high QP may be set to be smaller (e.g. one to reduce the complexity) than those with a lower QP because the ALF parameters signalling cost for high QP can be more costly. In another variant, the integer value D in equation (23) is not constant, and instead it depends on the QP value. For instance, D is set equal to the integer division of the QP divided by a constant Q. For instance, Q=10.

In yet another variant, for INTRA frame, the maximum number of Luma filter set alternatives is fixed to 1, and the number of allowed Chroma filter alternatives is one of 2, 4, 8 or 16, or the smaller of the number of Chroma CTBs and a positive integer E (e.g. min (E, 2. m_numCTUsInPic) when counting number of Chroma CTBs from both Chroma components). For non-INTRA frames, any one of the previously mentioned variants' maximum number for Luma filter set alternatives is used, for instance the formula of equation (23) is used to derive the maximum number of Luma filter set alternatives, and the maximum number of allowed Chroma filter alternatives is one of 2, 4, 8 or 16, or the smaller of the number of Chroma CTBs and a positive integer E.

In another variant, the maximum number of allowed Luma filter set alternatives or Chroma filter alternatives (i.e. the absolute maximum number allowed/authorized for the number of filter (set) alternative possibilities) may be large (for instance, it may be fixed at 8, 16 or 32, regardless of the "resolution" or number of CTUs), but the encoder uses one of the above variants' definition of "the maximum number of allowed Luma filter set alternatives or Chroma filter alternatives" or formula (or an alternative formula based on parameters such as the "resolution") to derive a "temporary maximum number of tested Luma filter set alternatives or Chroma filter alternatives" (available) for use. Here, by "temporary maximum number of tested . . . " we mean a maximum number that is considered/assessed/tested by an encoder before the filter (set) alternatives are actually used for the encoding/decoding of an image (portion). So then the encoder derives a "maximum number of tested Luma filter set alternatives or Chroma filter alternatives" as being the smaller of the derived "temporary maximum number of tested Luma filter set alternatives or Chroma filter alternatives" and the value of the maximum number of allowed Luma filter set alternatives or Chroma filter alternatives, and use the "maximum number of tested Luma filter set alternatives or Chroma filter alternatives" to control/limit the number of used/tested filter (set) alternatives during the encoding process, whereby it limits the complexity involved.

In some variants the maximum number of tested Luma filter set alternatives or Chroma filter alternatives is further limited by the encoder according to its available resources (e.g. a memory or computational processing power, for instance).

It is understood that according to an alternative variant, the "maximum number of the tested Luma filter set alternatives or Chroma filter alternatives" is not determined using CTU number count, and may be set arbitrarily.

TABLE 4

ALF data syntax

|  | Descriptor |
|---|---|
| alf_data( ) { | |
|   alf_chroma_idc | tu(v) |
|   alf_luma_num_alts_minus1 | tb(v) |
|   for( altIdx = 0; altIdx <= alf_luma_num_alts_minus1; altIdx++) { | |
|     alf_luma_num_filters_signalled_minus1[ altIdx ] | tb(v) |
|     if( alf_luma_num_filters_signalled_minus1 [ altIdx ] > 0) { | |
|       for( filtIdx = 0; filtIdx < NumAlfFilters[ altIdx ]; filtIdx++) | |
|         alf_luma_coeff_alt_merge_idx[ altIdx ][ filtIdx ] | tb(v) |
|     } | |
|     alf_luma_coeff_delta_flag[ altIdx ] | u(1) |
|     if ( !alf_luma_coeff_delta_flag[ altIdx ] && | |
| alf_luma_num_filters_signalled_minus1 [ altIdx ] > 0) | |
|       alf_luma_coeff_delta_prediction_flag[ altIdx ] | u(1) |
|     alf_luma_min_eg_order_minus1[ altIdx ] | ue(v) |
|     for( i = 0; i <3; i++ ) | |
|       alf_luma_eg_order_increase_flag[ altIdx ][ i ] | u(1) |
|     if ( alf_luma_coeff_ delta_flag[ altIdx ] ) { | |
|       for( sigFiltIdx = 0; sigFiltIdx <= | |
| alf_luma_num_filters_signalled_minus1 [ altIdx ]; sigFiltIdx++) | |
|         alf_luma_coeff_flag[ altIdx ][ sigFiltIdx ] | u(1) |
|     } | |
|     for( sigFiltIdx = 0; sigFiltIdx <= | |
| alf_luma_num_filters_signalled_minus1 [ altIdx ]; sigFiltIdx++) { | |
|       if( alf_luma_coeff_flag[ altIdx ][ sigFiltIdx ] ) { | |
|         for ( j = 0; j < 12; j++) { | |
|           alf_luma_coeff_delta_abs[ altIdx ][ sigFiltIdx ][ j ] | uek(v) |
|           if( alf_luma_coeff_delta_ abs[ altIdx ][ sigFiltIdx ][ j ] ) | |
|             alf_luma_coeff_delta_sign[ altIdx ][ sigFiltIdx ][ j ] | u(1) |
|         } | |
|       } | |
|     } | |
|   } | |
|   if ( alf_chroma_idc > 0) { | |
|     alf_chroma_num_alts_minus1 | tb(v) |
|     if ( alf_chroma_num_alts_minus1>1 ) | |
|       alf_chroma_coeff_delta_prediction_flag | u(1) |
|     alf_chroma_min_eg_order_minus1 | ue(v) |
|     for( i = 0; i < 2; i++) | |
|       alf_chroma_eg_order_increase_flag[ i ] | u(1) |
|     for( altIdx = 0; altIdx <= alf_chroma_num_alts_minus1; altIdx++) { | |
|       for( j = 0; j < 6; j++) { | |
|         alf_chroma_coeff_delta_abs[ altIdx ][ j ] | uek(v) |
|         if( alf_chroma_coeff_delta_abs[ altIdx ][ j ] > 0 ) | |
|           alf chroma_coeff_delta_sign[ altIdx ][ j ] | u(1) |
|       } | |
|     } | |
|   } | |
| } | |

The adaptive loop filter (ALF) data syntax of Table 4 is used to define an adaptation parameter set (shown in Table 1 and FIG. 16-c). The semantics of ALF data syntax elements for the purpose of one example embodiment are as follow:

Adaptive Loop Filter Data Semantics alf_chroma_idc equal to 0 specifies that the adaptive loop filter is not applied to Cb and Cr colour components. alf_chroma_idc equal to 1 indicates that the adaptive loop filter is applied to the Cb colour component. alf_chroma_idc equal to 2 indicates that the adaptive loop filter is applied to the Cr colour component. alf_chroma_idc equal to 3 indicates that the adaptive loop filter is applied to Cb and Cr colour components.

The maximum value max Val of the truncated unary binarization tu(v) is set equal to 3.

alf_luma_num_alts_minus1 plus 1 specifies the number of signalled alternative filter sets for Luma component.

The maximum value max Val of the truncated binary binarization tb(v) is set equal to 8 (which is the "maximum number of signalled alternative Luma filters").

The table NumAlfFilters [altIdx] specify the number of different accessible adaptive loop filters for an alternative filter set for Luma component with index altIdx ranging from 0 to alf_luma_num_alts_minus1. NumAlfFilters [0] is set equal to the "maximum number of signalled Luma filters". For altIdx greater than 0 NumAlfFilters [altIdx] is set equal to alf_luma_num_filters_signalled_minus1[altIdx−1]+1.

alf_luma_num_filters_signalled_minus1[altIdx] plus 1 specifies the number of adaptive loop filter classes for which luma coefficients can be signalled for an alternative filter set for Luma component with index altIdx ranging from 0 to alf_luma_num_alts_minus1. The value of alf_luma_num_filters_signalled_minus1[altIdx] shall be in the range of 0 to NumAlfFilters [altIdx]−1, inclusive.

The maximum value max Val of the truncated binary binarization tb(v) is set equal to NumAlfFilters [altIdx]−1.

alf_luma_coeff_alt_merge_idx[altIdx][filtIdx] specifies the indices of the signalled adaptive loop filter luma alternative merge index for an alternative filter set for Luma component with index altIdx ranging from 0 to alf_luma_num_alts_minus1 and for the filter class indicated by filtIdx ranging from 0 to NumAlfFilters [altIdx]−1. When alf_luma_coeff_alt_merge_idx[altIdx][filtIdx] is not present, it is inferred to be equal to 0.

The maximum value max Val of the truncated binary binarization tb(v) is set equal to alf_luma_num_filters_signalled_minus1[altIdx].

alf_luma_coeff_delta_flag[altIdx] equal to 1 indicates that alf_luma_coeff_delta_prediction_flag[altIdx] of the alternative filter set for Luma component with index altIdx ranging from 0 to alf_luma_num_alts_minus1 is not signalled. alf_luma_coeff_delta_flag[altIdx] equal to 0 indicates that alf_luma_coeff_delta_prediction_flag[altIdx] may be signalled.

alf_luma_coeff_delta_prediction_flag[altIdx] equal to 1 specifies that the signalled luma filter coefficient deltas of the alternative filter set for Luma component with index altIdx ranging from 0 to alf_luma_num_alts_minus1 are predicted from the deltas of the previous luma coefficients. alf_luma_coeff_delta_prediction_flag[altIdx] equal to 0 specifies that the signalled luma filter coefficient deltas of the alternative filter set for Luma component with index altIdx, are not predicted from the deltas of the previous luma coefficients. When not present, alf_luma_coeff_delta_prediction_flag[altIdx] is inferred to be equal to 0.

alf_luma_min_eg_order_minus1[altIdx] plus 1 specifies the minimum order of the exp-Golomb code for luma filter coefficient signalling of the alternative filter set for Luma component with index altIdx ranging from 0 to alf_luma_num_alts_minus1. The value of alf_luma_min_eg_order_minus1[altIdx] shall be in the range of 0 to 6, inclusive.

alf_luma_eg_order_increase_flag[altIdx][i] equal to 1 specifies that the minimum order of the exp-Golomb code for luma filter coefficient signalling of the alternative filter set for Luma component with index altIdx ranging from 0 to alf_luma_num_alts_minus1 is incremented by 1. alf_luma_eg_order_increase_flag[altIdx] [i] equal to 0 specifies that the minimum order of the exp-Golomb code for luma filter coefficient signalling of the alternative filter set for Luma component with index altIdx is not incremented by 1.

The order expGoOrderY[altIdx][i] of the exp-Golomb code used to decode the values of alf_luma_coeff_delta_abs [altIdx][sigFiltIdx][j] is derived as follows:

expGoOrderY[altIdx][i]=alf_luma_min_eg_order_minus1[altIdx]+1+alf_luma_eg_order_increase_flag[altIdx][i]

alf_luma_coeff_flag[altIdx][sigFiltIdx] equal 1 specifies that the coefficients of the luma filter indicated by sigFiltIdx of the alternative filter set for Luma component with index altIdx ranging from 0 to alf_luma_num_alts_minus1 are signalled. alf_luma_coeff_flag[altIdx][sigFiltIdx] equal to 0 specifies that all filter coefficients of the luma filter indicated by sigFiltIdx of the alternative filter set for Luma component with index altIdx are set equal to 0. When not present, alf_luma_coeff_flag[altIdx][sigFiltIdx] is set equal to 1.

alf_luma_coeff_delta_abs[altIdx][sigFiltIdx][j] specifies the absolute value of the j-th coefficient delta of the signalled luma filter indicated by sigFiltIdx of the alternative filter set for Luma component with index altIdx ranging from 0 to alf_luma_num_alts_minus1. When alf_luma_coeff_delta_abs[altIdx][sigFiltIdx][j] is not present, it is inferred to be equal 0.

The order k of the exp-Golomb binarization uek(v) is derived as follows:
golombOrderIdxY[ ]={0, 0, 1, 0, 0, 1, 2, 1, 0, 0, 1, 2}
k=expGoOrderY[altIdx][golombOrderIdxY[j]]

alf_luma_coeff_delta_sign[altIdx][sigFiltIdx][j] specifies the sign of the j-th luma coefficient of the filter indicated by sigFiltIdx of the alternative filter set for Luma component with index altIdx ranging from 0 to alf_luma_num_alts_minus1 as follows:
If alf_luma_coeff_delta_sign[altIdx][sigFiltIdx][j] is equal to 0, the corresponding luma filter coefficient has a positive value.
Otherwise (alf_luma_coeff_delta_sign[altIdx][sigFiltIdx] [j] is equal to 1), the corresponding luma filter coefficient has a negative value.
When alf_luma_coeff_delta_sign[altIdx][sigFiltIdx][j] is not present, it is inferred to be equal to 0.

The variable filterCoefficients[altIdx][sigFiltIdx][j] with altIdx=0 . . . alf_luma_num_alts_minus1, sigFiltIdx=0 . . . alf_luma_num_filters_signalled_minus1[altIdx], j=0 . . . 11 is initialized as follows:

filterCoefficients[altIdx][sigFiltIdx][j]=alf_luma_coeff_delta_abs[altIdx][sigFiltIdx][j]*(1-2*alf_luma_coeff_delta_sign[altIdx][sigFiltIdx][j])

When alf_luma_coeff_delta_prediction_flag[altIdx] is equal 1, filterCoefficients[altIdx sigFiltIdx][j] with sigFiltIdx=1 . . . alf_luma_num_filters_signalled_minus1[altIdx] and j=0 . . . 11 are modified as follows:
filterCoefficients[altIdx][sigFiltIdx][j]+=filterCoefficients[altIdx][sigFiltIdx−1][j]

The variable alf_luma_coeff_delta_idx[altIdx][filtIdx] with altIdx=0 . . . alf_luma_num_alts_minus1 and filtIdx=0 . . . . NumAlfFilters [altIdx]−1 specifies the indices of the signalled adaptive loop filter luma coefficient deltas for the alternative filter set for Luma component with index altIdx and for the filter class indicated by filtIdx. It is initialized as follow:
alf_luma_coeff_delta_idx[0][filtIdx] is first set equal to alf_luma_coeff_alt_merge_idx[0][filtIdx] for filtIdx=0 . . . . NumAlfFilters [0]−1.

Then for altIdx=1 . . . alf_luma_num_alts_minus1, for filtIdx=0 . . . . NumAlfFilters [0]-1, alf_luma_coeff_delta_idx[altIdx][filtIdx] is set equal to alf_luma_coeff_alt_merge_idx[altIdx][alf_luma_coeff_delta_idx[altIdx−1] [filtIdx]].

The luma filter coefficients AlfCoeffL[altIdx] with elements AlfCoeffL[altIdx] [filtIdx][j], with altIdx=0 . . . alf_luma_num_alts_minus1, filtIdx=0 . . . . NumAlfFilters−1 and j=0 . . . 11 are derived as follows
AlfCoeffL[altIdx filtIdx][j]=filterCoefficients[altIdx] [alf_luma_coeff_delta_idx[altIdx][filtIdx]][j]

The last filter coefficients AlfCoeffL[altIdx][filtIdx][12] for altIdx=0 . . . alf_luma_num_alts_minus1 and filtIdx=0 . . . . NumAlfFilters−1 are derived as follows:
AlfCoeffL[altIdx][filtIdx][12]=128−$\Sigma_k$ (AlfCoeffL[altIdx] [filtIdx][k]<<1), with k=0 . . . 11

It is a requirement of bitstream conformance that the values of AlfCoeffL[altIdx] [filtIdx][j] with altIdx=0 . . . alf_luma_num_alts_minus1, filtIdx=0 . . . . NumAlfFilters−1, j=0 . . . 11 shall be in the range of −2^7 to 2^7−1, inclusive and that the values of AlfCoeffL[altIdx][filtIdx][12] shall be in the range of 0 to 2^8−1, inclusive.

alf_chroma_num_alts_minus1 specifies the number of alternative filters for Chroma components.

The maximum value max Val of the truncated binary binarization tb(v) is set equal to 8.

alf_chroma_coeff_delta_prediction_flag equal to 1 specifies that the signalled chroma filter coefficient deltas of the alternative filters for Chroma component are predicted from deltas of the previous chroma coefficients. alf_chroma_coeff_delta_prediction_flag equal to 0 specifies that the signalled chroma filter coefficient deltas of the alternative filters for Chroma, are not predicted from the deltas of the previous chroma coefficients. When not present, alf_chroma_coeff_delta_prediction_flag is inferred to be equal to 0.

alf_chroma_min_eg_order_minus1 plus 1 specifies the minimum order of the exp-Golomb code for chroma filter coefficient signalling. The value of alf_chroma_min_eg_order_minus1 shall be in the range of 0 to 6, inclusive.

alf_chroma_eg_order_increase_flag[i] equal to 1 specifies that the minimum order of the exp-Golomb code for chroma filter coefficient signalling is incremented by 1. alf_chroma_eg_order_increase_flag[i] equal to 0 specifies that the minimum order of the exp-Golomb code for chroma filter coefficient signalling is not incremented by 1

The order expGoOrderC[i] of the exp-Golomb code used to decode the values of alf_chroma_coeff_abs[altIdx][j] is derived as follows:

$$expGoOrderC[i] = \text{alf\_chroma\_min\_eg\_order\_minus1} +$$
$$1 + \text{alf\_chroma\_eg\_order\_increase\_flag}[i]$$

alf_chroma_coeff_delta_abs[altIdx][j] specifies the absolute value of the j-th chroma filter coefficient delta of the alternative filter for Chroma component with index altIdx. When alf_chroma_coeff_delta_abs[altIdx][j] is not present, it is inferred to be equal 0.

The order k of the exp-Golomb binarization uek(v) is derived as follows:
golombOrderIdxC[ ]={0, 0, 1, 0, 0, 1}
k=expGoOrderC[golombOrderIdxC[j]]
alf_chroma_coeff_delta_sign[altIdx][j] specifies the sign of the j-th chroma filter coefficient of the alternative filter for Chroma component with index altIdx as follows:
If alf_chroma_coeff_delta_sign[altIdx][j] is equal to 0, the corresponding chroma filter coefficient has a positive value.
Otherwise (alf_chroma_delta_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients AlfCoeffC[altIdx] with elements AlfCoeffC[altIdx] [j], with altIdx=0 . . . alf_chroma_num_alts_minus1 and j=0 . . . 5 are initialized as follows:

$$AlfCoeffC[altIdx][j] = \text{alf\_chroma\_coeff\_delta\_abs}[altIdx][j] *$$
$$(1 - 2 * \text{alf\_chroma\_delta\_coeff\_sign}[altIdx][j])$$

When alf_chroma_coeff_delta_prediction_flag is equal 1, AlfCoeffC[altIdx][j] with altIdx=1 . . . alf_luma_num_alts_minus1 and j=0 . . . 7 are modified as follows:

$$AlfCoeffC[altIdx][j] \mathrel{+}= AlfCoeffC[altIdx - 1][j]$$

The last filter coefficient for j=6 is derived as follows:
AlfCoeffC[altIdx][6]=128−$\Sigma_k$(AlfCoeffC[altIdx][k]<<1), with k=0 . . . 5

It is a requirement of bitstream conformance that the values of AlfCoeffC[altIdx] [j] with altIdx=0 . . . alf_chroma_num_alts_minus1 and j=0 . . . 5 shall be in the range of −2^7−1 to 2^7−1, inclusive and that the values of AlfCoeffC [altIdx][6] shall be in the range of 0 to 2^8−1, inclusive.

According to some variants, an adaptive loop filtering process uses above syntax elements. Such variants are described using notation convention of VVC draft version 3 (VTM-3.0) below. It is understood that, although the descriptions of the variants/embodiments described herein mention the luma and the chroma components, they can be easily adapted to image portions/blocks of samples of other components such as a single luma/chroma component or RGB components.

Adaptive Loop Filter Process
General

Inputs of this process are the reconstructed picture sample arrays prior to adaptive loop filter recPictureL, recPictureCb and recPictureCr.

Outputs of this process are the modified reconstructed picture sample arrays after adaptive loop filter alfPictureL, alfPictureCb and alfPictureCr.

The sample values in the modified reconstructed picture sample arrays after adaptive loop filter alfPictureL, alfPictureCb and alfPictureCr are initially set equal to the sample values in the reconstructed picture sample arrays prior to adaptive loop filter recPictureL, recPictureCb and recPictureCr, respectively.

When tile_group_alf_enabled_flag is equal to 1, for every coding tree unit with luma coding tree block location (rx, ry), where rx=0 . . . . PicWidthInCtbs−1 and ry=0 . . . . PicHeightInCtbs−1, the following applies:

When alf_ctb_flag[0][rx][ry] is equal to 1, the coding tree block filtering process for luma samples as specified in clause 'Coding tree block filtering process for luma samples' is invoked with recPictureL, alfPictureL, and the luma coding tree block location (xCtb, yCtb) set equal to (rx<<CtbLog2SizeY, ry<<CtbLog2SizeY) as inputs, and the output is the modified filtered picture alfPictureL.

When alf_ctb_flag[1][rx][ry] is equal to 1, the coding tree block filtering process for chroma samples as specified in clause 'Coding tree block filtering process for chroma samples' is invoked with recPicture set equal to recPictureCb, alfPicture set equal to alfPictureCb, compIdx set equal to 1, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCb.

When alf_ctb_flag[2][rx][ry] is equal to 1, the coding tree block filtering process for chroma samples as specified in clause 'Coding tree block filtering process for chroma samples' is invoked with recPicture set equal to recPictureCr, alfPicture set equal to alfPictureCr, compIdx set equal to 1, and the chroma coding tree block location (xCtbC, yCtbC) set equal to (rx<<(CtbLog2SizeY−1), ry<<(CtbLog2SizeY−1)) as inputs, and the output is the modified filtered picture alfPictureCr.

Coding Tree Block Filtering Process for Luma Samples
Inputs of this process are:
a reconstructed luma picture sample array recPictureL prior to the adaptive loop filtering process,
a filtered reconstructed luma picture sample array alfPictureL,
a luma location (xCtb, yCtb) specifying the top-left sample of the current luma coding tree block relative to the top left sample of the current picture.

Output of this process is the modified filtered reconstructed luma picture sample array alfPictureL.

The derivation process for filter index clause 'Derivation process for ALF transpose and filter index for luma samples' is invoked with the location (xCtb, yCtb) and the reconstructed luma picture sample array recPictureL as inputs, and filtIdx [x][y] and transposeIdx [x][y] with x, y=0 . . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . . CtbSizeY−1:

The variable altIdx is derived as follows:

altIdx=alf_ctb_filter_alt_idx[0][xCtb>>Log2CtbSize] [yCtb>>Log2CtbSize][filtIdx [x][y]]

The array of luma filter coefficients f[j] corresponding to the filter specified by filtIdx [x][y] is derived as follows with j=0 . . . 12:

f[j]=AlfCoeffL[altIdx][filtIdx[x][y]][j]

The luma filter coefficients filterCoeff are derived depending on transposeIdx [x][y] as follows:

If transposeIndex[x][y]==1, filterCoeff[ ]={f[9], f[4], f[10], f [8], f[1], f[5], f[11], f[7], f[3], f[0], f[2], f[6], f[12]}

Otherwise, if transposeIndex[x][y]==2, filterCoeff[ ]={f[0], f[3], f [2], f[1], f[8], f[7], f[6], f[5], f[4], f[9], f[10], f[11], f[12]}

Otherwise, if transposeIndex[x][y]==3, filterCoeff[ ]={f[9], f[8], f [10], f[4], f[3], f[7], f[11], f[5], f[1], f[0], f[2], f[6], f[12]}

Otherwise, filterCoeff[ ]={f[0], f[1], f[2], f[3], f[4], f[5], f[6], f[7], f [8], f[9], f[10], f[11], f[12]}

The locations (hx, vy) for each of the corresponding luma samples (x, y) inside the given array recPicture of luma samples are derived as follows:

$$hx = Clip3(0, \text{pic\_width\_in\_luma\_samples} - 1, xCtb + x)$$

$$vy = Clip3(0, \text{pic\_height\_in\_luma\_samples} - 1, yCtb + y)$$

The variable sum is derived as follows:

sum=filterCoeff[0]*(recPictureL[hx, vy+3]+recPictureL [hx, vy−3])+filterCoeff[1]*(recPictureL[hx+1, vy+2]+ recPictureL[hx−1, vy−2])+filterCoeff[2]*(recPictureL [hx, vy+2]+recPictureL[hx, vy−2])+filterCoeff[3]* (recPictureL[hx−1, vy+2]+recPictureL[hx+1, vy−2])+ filterCoeff[4]*(recPictureL[hx+2, vy+1]+recPictureL [hx−2, vy−1])+filterCoeff[5]*(recPictureL[hx+1, vy+1]+recPictureL[hx−1, vy−1])+filterCoeff[6]* (recPictureL[hx, vy+1]+recPictureL[hx, vy−1])+filterCoeff[7]*(recPictureL[hx−1, vy+1]+recPictureL[hx+1, vy−1])+filterCoeff[8]*(recPictureL[hx−2, vy+1]+ recPictureL[hx+2, vy−1])+filterCoeff[9]*(recPictureL [hx+3, vy]+recPictureL[hx−3, vy])+filterCoeff[10]* (recPictureL[hx+2, vy]+recPictureL[hx−2, vy])+ filterCoeff[11]*(recPictureL[hx+1, vy]+recPictureL [hx−1, vy])+filterCoeff[12]*recPictureL[hx, vy]

sum=(sum+64)>>7

The modified filtered reconstructed luma picture sample alfPictureL[xCtb+x][yCtb+y] is derived as follows:

alfPictureL[xCtb+x][yCtb+y]=Clip3(0,(1<<BitDepthY)−1, sum)

Derivation Process for ALF Transpose and Filter Index for Luma Samples

Inputs of this process are:
a luma location (xCtb, yCtb) specifying the top-left sample of the current luma coding tree block relative to the top left sample of the current picture,
a reconstructed luma picture sample array recPictureL prior to the adaptive loop filtering process.

Outputs of this process are
the classification filter index array filtIdx [x][y] with x, y=0 . . . . CtbSizeY−1,
the transpose index array transposeIdx [x][y] with x, y=0 . . . . CtbSizeY−1.

The locations (hx, vy) for each of the corresponding luma samples (x, y) inside the given array recPicture of luma samples are derived as follows:

hx=Clip3(0, pic_width_in_luma_samples−1, x)

vy=Clip3(0, pic_height_in_luma_samples−1, y)

The classification filter index array filtIdx and the transpose index array transposeIdx are derived by the following ordered steps:

1) The variables filtH[x][y], filtV[x][y], filtD0[x][y] and filtD1[x][y] with x, y=−2 . . . . CtbSize Y+1 are derived as follows:

If both x and y are even numbers or both x and y are uneven numbers, the following applies:

filtH[x][y]=Abs ((recPicture[hxCtb+x, vyCtb+y]<<1)− recPicture[hxCtb+x−1, vyCtb+y]−recPicture[hxCtb+ x+1, vyCtb+y])

filtV[x][y]=Abs ((recPicture[hxCtb+x, vyCtb+y]<<1)− recPicture[hxCtb+x, vyCtb+y−1]−recPicture[hxCtb+x, vyCtb+y+1])

filtD0[x][y]=Abs ((recPicture[hxCtb+x, vyCtb+y]<<1)− recPicture[hxCtb+x−1, vyCtb+y−1]−recPicture [hxCtb+x+1, vyCtb+y+1])

filtD1[x][y]=Abs ((recPicture[hxCtb+x, vyCtb+y]<<1)− recPicture[hxCtb+x+1, vyCtb+y−1]−recPicture [hxCtb+x−1, vyCtb+y+1])

Otherwise, filtH[x][y], filtV[x][y], filtD0[x][y] and filtD1 [x][y] are set equal to 0.

2) The variables varTempH1[x][y], varTempD01[x][y], varTempD11[x][y] and varTemp[x][y] with x, y=0 . . . (CtbSizeY−1)>>2 are derived as follows:

$$sumH[x][y] = \Sigma i \Sigma j filtH[(x << 2) + i][(y << 2) + j] \text{ with } i, j = -2 \ldots 5$$

$$sumV[x][y] = \Sigma i \Sigma j filtV[(x << 2) + i][(y << 2) + j] \text{ with } i, j = -2 \ldots 5$$

$$sumD0[x][y] = \Sigma i \Sigma j filtD0[(x << 2) + i][(y << 2) + j] \text{ with } i, j = -2 \ldots 5$$

$$sumD1[x][y] = \Sigma i \Sigma j filtD1(x << 2) + i][(y << 2) + j] \text{ with } i, j = -2 \ldots 5$$

$$sumOfHV[x][y] = sumH[x][y] + sumV[x][y]$$

3) The variables dir1[x][y], dir2[x][y] and dirS[x][y] with x, y=0 . . . . CtbSizeY−1 are derived as follows:

The variables hv1, hv0 and dirHV are derived as follows:
If sumV[x>>2][y>>2] is greater than sumH[x>>2][y>>2], the following applies:
hv1=sumV[x>>2][y>>2]
hv0=sumH[x>>2][y>>2]
dirHV=1
Otherwise, the following applies:
hv1=sumH[x>>2][y>>2]
hv0=sumV[x>>2][y>>2]
dirHV=3

The variables d1, d0 and dirD are derived as follows:
If sumD0[x>>2][y>>2] is greater than sumD1[x>>2][y>>2], the following applies:
d1=sumD0[x>>2][y>>2]
d0=sumD1[x>>2][y>>2]
dirD=0
Otherwise, the following applies:
d1=sumD1 [x>>2][y>>2]
d0=sumD0[x>>2][y>>2]
dirD=2
The variables hvd1, hvd0, are derived as follows:

$$hvd1 = (d1*hv0 > hv1*d0) \;?\; d1{:}hv1$$

$$hvd0 = (d1*hv0 > hv1*d0) \;?\; d0{:}hv0$$

The variables dirS[x][y], dir1[x][y] and dir2[x][y] derived as follows:

$$dir1[x][y] = (d1*hv0 > hv1*d0) \;?\; dirH{:}dirHV$$

$$dir2[x][y] = (d1*hv0 > hv1*d0) \;?\; dirHV{:}dirD$$

$$dirS[x][y] = (hvd1 > 2*hvd0) \;?\; 1{:}((hvd1*2 > 9*hvd0) \;?\; 2{:}0)$$

4) The variable avgVar [x][y] with x, y=0 . . . . CtbSizeY−1 is derived as follows:
varTab[ ]={0, 1, 2, 2, 2, 2, 2, 3, 3, 3, 3, 3, 3, 3, 3, 4}
avgVar [x][y]=varTab[Clip3(0, 15, (sumOfHV[x>>2][y>>2]*64)>>(3+BitDepthY))]
5) The classification filter index array filtIdx [x][y] and the transpose index array transposeIdx [x][y] with x=y=0 . . . . CtbSizeY−1 are derived as follows:
transpose Table [ ]={0, 1, 0, 2, 2, 3, 1, 3}
transposeIdx [x][y]=transpose Table [dir1[x][y]*2+ (dir2[x][y]>>1)]
filtIdx[x][y]=avgVar[x][y]
When dirS[x][y] is not equal 0, filtIdx [x][y] is modified as follows:

$$filtIdx[x][y] \mathrel{+}= (((dir1[x][y] \,\&\, 0x1) << 1) + dirS[x][y])*5$$

Coding Tree Block Filtering Process for Chroma Samples
Inputs of this process are:
a reconstructed chroma picture sample array recPicture prior to the adaptive loop filtering process,
a filtered reconstructed chroma picture sample array alfPicture,
a component index compIdx specifying the chroma component index of the current chroma coding treeblock.
a chroma location (xCtbC, yCtbC) specifying the top-left sample of the current chroma coding tree block relative to the top left sample of the current picture.
Output of this process is the modified filtered reconstructed chroma picture sample array alfPicture.
The size of the current chroma coding tree block ctbSizeC is derived as follows:

$$ctbSizeC = ctbSizeY/SubWidthC$$

For the derivation of the filtered reconstructed chroma samples alfPicture [x][y], each reconstructed chroma sample inside the current chroma coding tree block recPicture[x][y] is filtered as follows with x, y=0 . . . ctbSizeC−1:
The locations (hx, vy) for each of the corresponding chroma samples (x, y) inside the given array recPicture of chroma samples are derived as follows:

$$hx = Clip3(0, pic\_width\_in\_luma\_samples/SubWidthC - 1, xCtbC + x)$$

$$vy = Clip3(0, pic\_height\_in\_luma\_samples/SubHeigthC - 1, yCtbC + y)$$

The variable altIdx is derived as follows:
altIdx=alf_ctb_filter_alt_idx[compIdx][xCtb>>Log2CtbSize][yCtb>>Log2CtbSize][0]
The variable sum is derived as follows:
sum=AlfCoeffC[altIdx][0]*(recPicture[hx, vy+2]+recPicture[hx, vy−2])+AlfCoeffC[altIdx][1]*(recPicture[hx+1, vy+1]+recPicture[hx−1, vy−1])+AlfCoeffC[altIdx][2]*(recPicture[hx, vy+1]+recPicture[hx, vy−1])+AlfCoeffC[altIdx][3]*(recPicture[hx−1, vy+1]+recPicture[hx+1, vy−1])+AlfCoeffC[altIdx][4]*(recPicture[hx+2, vy]+recPicture[hx−2, vy])+AlfCoeffC[altIdx][5]*(recPicture[hx+1, vy]+recPicture[hx−1, vy])+AlfCoeffC[altIdx][6]*recPicture[hx, vy]
sum=(sum+64)>>7
The modified filtered reconstructed chroma picture sample alfPicture [xCtbC+x][yCtbC+y] is derived as follows:

$$alfPicture[xCtbC + x][yCtbC + y] = Clip3(0, (1 << BitDepthC) - 1, sum)$$

Figure 18:
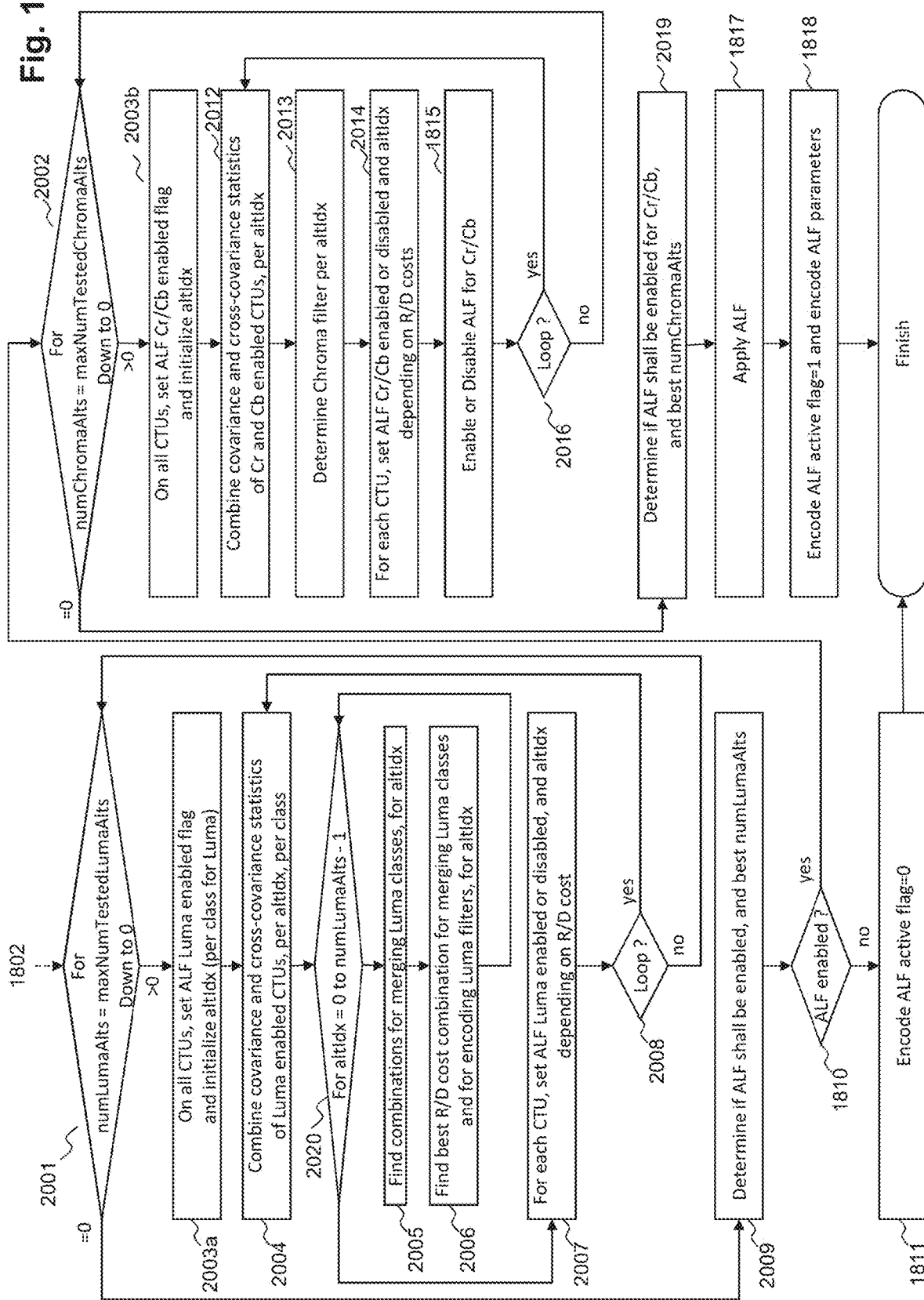
FIG. 18 is a flow chart illustrating an ALF encoding process according to another embodiment of the invention

Adaptive Loop Filter Data Optimization
Some of the adaptive loop filter data may be optimized using various optimization techniques. According to an embodiment illustrated by the flowchart of FIG. 18, which modifies the previously described flowchart of FIG. 17, the encoding process comprises such an optimization for the number of Luma filter set alternatives or Chroma filter alternatives available for use in the encoding/decoding of an image (portion)). Steps 1801 and 1802 are the same as in FIG. 17 and as such are omitted in FIG. 18.

This optimization for the number of Luma filter set alternatives or Chroma filter alternatives available for use in the encoding/decoding of an image (portion)) may be achieved by performing the following steps for each component type (i.e. for Luma filter set alternatives on the Luma component or for Chroma filter alternatives on both Chroma components).
1) The encoder starts with a number of Luma filter set alternatives or Chroma filter alternatives equal to the (derived) maximum number of tested Luma filter set alternatives 2001 or Chroma filter alternatives 2002.
2) It associates each Luma filter set alternative 2003a or each Chroma filter alternative 2003b with a preferably different/disjoint subset of the CTBs to perform a first filter(s) optimization for each Luma filter set alternative or Chroma filter alternative with the samples of its associated subset of CTBs (this first filter(s) optimization corresponds to the first iteration of step 3, i.e. "3.a.i)" & "3.a.ii)" below).
2003a comprises associating every class index of a given Luma CTB with a given Luma filter set alternative index, and 2003b comprises associating a Chroma CTB with a given Chroma filter alternative index. In that step, all the 'alf_ctb_flag' flag(s) of the processed component(s) are set to 1.

3) Then, until a given number of iterations is achieved (2008 or 2016) the encoder loops/repeats the following steps 3.a) deriving a new (optimized) filter(s) for each Luma filter set alternative or Chroma filter alternative using the sample values (or statistics previously computed based on them in 1802) of its associated CTB(s) (which corresponds to optimizing and setting: the values of 'NumAlfFilters [altIdx]' and AlfCoeffL[altIdx] for each Luma filter set alternative altIdx on Luma, or the values of AlfCoeffC [altIdx] for each Chroma filter alternative altIdx on Chroma). This derivation step can be further split into 2 sub-steps:

3.a.i) combining the covariance and cross covariance statistics of the enabled CTBs 2004 or 2012, in a similar way as in 1804 or 1812. But, in 2004, instead of obtaining one Matrix per class, statistics are collected to obtain one Matrix per class and per Luma filter set alternative index (altIdx), i.e. "one Matrix per class" is obtained for each Luma filter set alternative. For a given class with index classIdx and a given altIdx, the Matrix is obtained by computing/aggregating/summing the statistics obtained for the given class in each active/enabled CTB (i.e. 'alf_ctb_flag[0]'=1) for which the class is associated with the given altIdx (i.e. 'alf_ctb_filter_alt_idx[0][x][y][classIdx]'=altIdx). In 2012, instead of obtaining one Matrix for both Chroma components, statistics are collected to obtain one Matrix per Chroma filter alternative index (altIdx), i.e. "one Matrix" is obtained for each Chroma filter alternative. For a given altIdx, the Matrix is obtained by computing/aggregating/summing the statistics obtained for each active/enabled Chroma CTB (i.e. 'alf_ctb_flag[1]'=1 for Cb component or 'alf_ctb_flag[2]'=1 for Cr component) which is associated with the given altIdx (i.e. 'alf_ctb_filter_alt_idx[1][x][y][0]'=altIdx for Cb component or 'alf_ctb_filter_alt_idx[2][x][y][0]'=altIdx for Cr component).

3.a.ii) Optimizing the filter(s) of each Luma filter set alternative or Chroma filter alternative. For each Chroma filter alternative with an index altIdx, this is done in 2013 using the Matrix obtained in 3.a.i) for that altIdx, in a similar way as is done for only one filter in 1813. Thus one filter per each altIdx is obtained. For Luma component, filter(s) for each Luma filter set alternative are obtained iteratively, step 2020 showing an example of a condition for continuing with/terminating the iterative process. For each index of a Luma filter set alternative, i.e. altIdx or "Luma filter set alternative index", finding combinations for merging the Luma classes for that Luma filter set alternative index altIdx at 2005, and finding the best R/D cost compromise for encoding the Luma filter(s) of the Luma filter set alternative at 2006. For example, using the syntax elements shown in FIG. 8-e, it can be said that 2005 and 2006 are similar to 1805 and 1806 with altIdx=0, which obtain the first optimized Luma filter set alternative ("Filter alternative 0 Coefficients table") using the matrices for each class and altIdx=0 obtained in step 3.a.i). That first optimized Luma filter set alternative includes an optimized number of filters, and an optimized merging table (i.e. the lookup table associating each class index to a filter index in that first optimized Luma filter set alternative). For altIdx>0 (i.e. up to the (derived) maximum number of tested Luma filter set alternatives 2001 minus one), the merging step 2005 corresponds to 1805, 1805 having been modified so that instead of starting from the "maximum number of signalled Luma filters" filters and a merging table associating each class to a different filter index, it starts from "a number of filters equal to the optimized number of filters obtained for the previous altIdx (i.e. altIdx−1)" filters and a merging table (i.e. a lookup table associating each class index to a filter index in the Luma filter set alternative altIdx) that is initialized from the optimized merging table obtained in 2006 for altIdx−1. The step 2006 then allow to obtain an "optimized Luma filter set alternative altIdx" that includes an optimized number of filters, and an optimized merging table (i.e. the lookup table associating each class index to a filter index in that "optimized Luma filter set alternative altIdx").

3.b) optimizing the state of the 'alf_ctb_flag' flag(s) (i.e. the ALF Luma/Cr/Cb enable flags), while also associating each enabled CTB with the best performing Luma filter set alternative for each class/filter index 2007 or Chroma filter alternative 2014 (which corresponds to setting the values in 'alf_ctb_filter_alt_idx' for the given component(s), see Table 3 and FIG. 16-c).

Step 2007 is performed by using the statistics of each CTB. These statistics are obtained in 1802, to compute/estimate, for each class associated to a given filter (index) for a given Luma filter set alternative index (altIdx), the distortion experienced for that class when using the given filter in that given Luma filter set alternative on the samples of that CTB which belongs to that class. The rate of signalling the altIdx in the CTU data is also estimated. For a given CTB and a given filter index of the first embodiment or a variant thereof described herein (or for a given CTB and a given class index of the second embodiment or a variant thereof described herein), by minimizing a R/D cost Lagrangian function obtained from the estimated distortion and rate, for each given Luma filter set alternative index (altIdx), it is possible to determine/select/choose the best Luma filter set alternative to use for that given filter index for the first embodiment or a variant thereof (or given class index for the second embodiment or a variant thereof).

Step 2014 for Chroma component(s) is simpler because in this embodiment (and indeed in the ALF filtering of VTM-3.0) no classification is used for Chroma CTB(s). It is performed by using the statistics of each CTB, obtained in 1802, to compute/estimate for each given Chroma component and for each Chroma filter alternative index (altIdx), the distortion experienced when using that Chroma filter alternative (i.e. when using that filter identified by the Chroma filter alternative index since there's only one filter in the Chroma filter alterative in this embodiment) on the samples of that CTB. The rate of signalling altIdx in the CTU data is also estimated. For a given CTB and a given Chroma component, by minimizing a R/D cost Lagrangian function obtained from the estimated distortion and rate, for each given Chroma filter alternative index (altIdx), it is possible to determine/select/choose the best Chroma filter alternative to use for that Chroma component.

This encoder iterative loops/repeats performing the optimization of the state of the 'alf_ctb_flag' flag(s) (i.e. the ALF Luma/Cr/Cb enable flags), the optimization of their association to Luma filter set alternatives or the Chroma filter alternatives (values in 'alf_ctb_filter_alt_idx' for the given component(s)), and the optimization of the Luma filter set alternatives or the Chroma filter alternatives (and so their filter coefficients) altogether. By repeating (looping) the steps 3.a) and 3.b), the status of the "alf_ctb_flag" flag(s) settles towards a particular state while the associations with the filter (set) alternatives also settle towards particular associations, and the filter (set) alternatives also settle towards having filter(s) with particular filter coefficients (i.e the algorithm converges to an optimization solution for these optimization parameters). The number of loop iterations 2008 or 2016 for reaching this convergence may be increased compared to the number of iterations required for optimizing the state of the 'alf_ctb_flag' (s) and the filter coefficients for one Luma filters set or for one Chroma filter 1808 or 1816 (like in VTM3.0, for instance). This is because we are also simultaneously (i.e. during the same optimization process) trying to optimize for the Luma filter set alternative or Chroma filter alternatives selection (i.e. 'alf_ctb_filter_alt_idx') as well as more than one filter (set) alternatives. In a variant, this increase is proportional to the number of tested filter (set) alternatives, so when the number of tested filter (set) is equal to one there is no increase.

4) The encoder incrementally decreases the number of Luma filter set alternatives 2001 or Chroma filters alternatives 2002, repeating steps 2) and 3), until the number of filter (set) alternatives reaches one. It is understood that when the maximum number of tested Luma filter set alternatives or Chroma filter alternatives is one, this optimization process can still be performed to optimize the other optimisation parameters, i.e. the status of the "alf_ctb_flag" flag(s) and the filter coefficients of the filter(s) of that one filter (set) alternative. During the optimization process, the encoder compares the results of the optimization criterion (e.g. Lagrangian evaluation of the rate/distortion compromise) for each intermediate optimization parameters (e.g., for each Luma filter set alternative or Chroma filter alternative and the state of the 'alf_ctb_flag' flag(s) evaluated it the steps 2) or 3)), and then selects the optimal value for the ALF parameters, including the optimal Luma filter set alternatives or Chroma filter alternatives number 2009 or 2019 (i.e. the number of these filter set alternatives and/or filter alternatives with the best Rate/Distortion compromise). The optimal (i.e. optimized) Luma filter set alternatives or Chroma filter alternatives number is signalled, e.g. using the 'alf_luma_num_alts_minus1', or 'alf_chroma_num_alts_minus1' syntax elements (shown in Table 4 and in FIG. 16-*c*). These syntax elements may be encoded with a truncated binary binarization, which takes as a parameter a maximum value (max Val) which is set to the maximum number of allowed Luma filter set alternatives or Chroma filter alternatives (i.e. the absolute maximum number for the filter (set) alternative possibilities) so that their maximum size is known and hence they can be parsed/decoded accordingly.

It is understood that the above optimization steps may be performed at the same level, e.g. the slice/tile group/whole image (portion) level, as the level at which the filter coefficients for the ALF filter (set) alternatives signalling is optimized. It is understood that the above optimization steps may be performed for each slice, each tile group, each video frame, a portion of a video sequence, or indeed the whole video sequence.

Implementation of Embodiments of the Invention

One or more of the foregoing embodiments/variants may be implemented in the form of an encoder or a decoder, which performs the method steps of the one or more foregoing embodiments/variants. Following embodiments illustrate such implementations.

Figure 10:
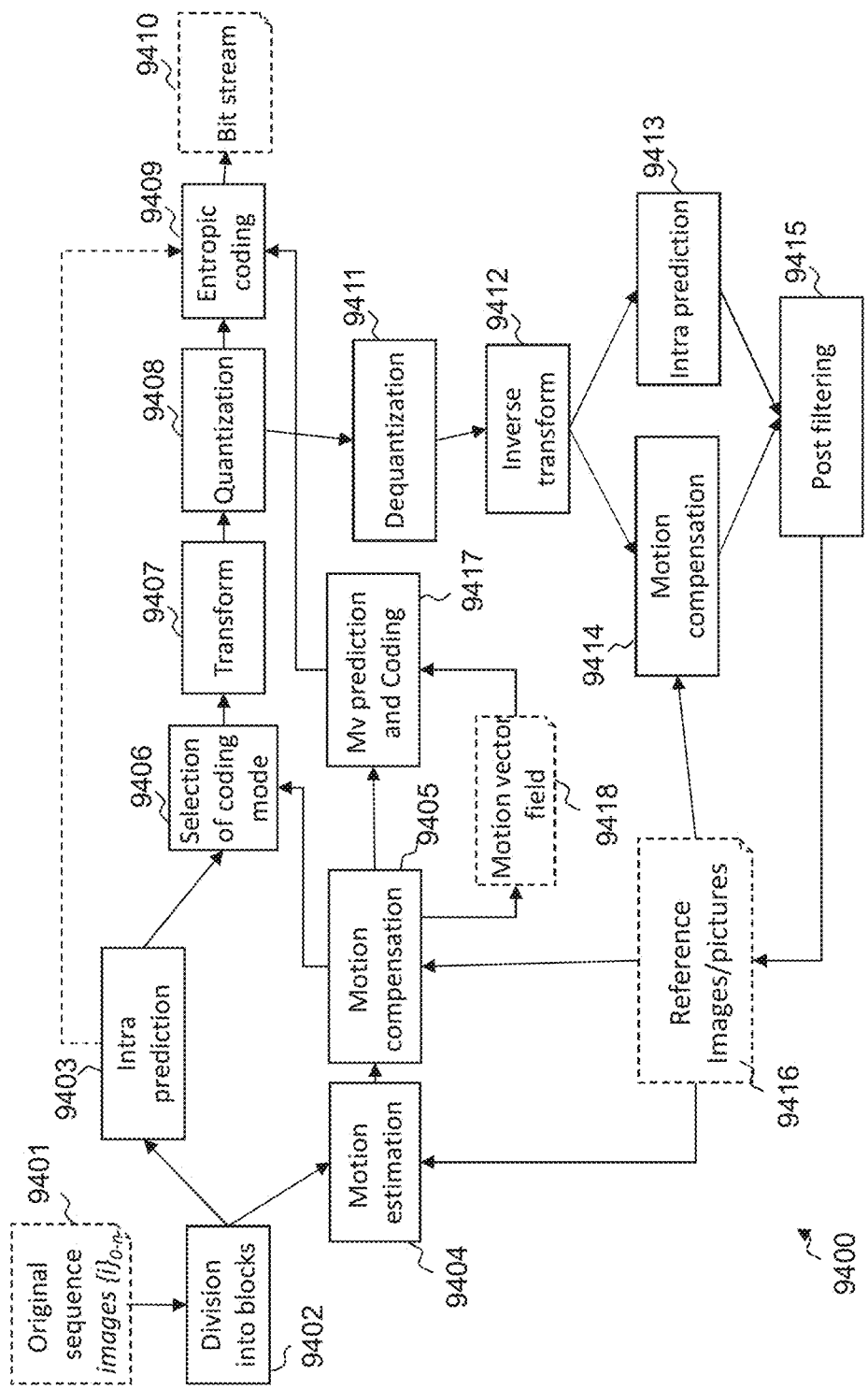
FIG. 10 is a flow chart illustrating steps of an encoding method according to embodiments of the invention.
Figure 11:
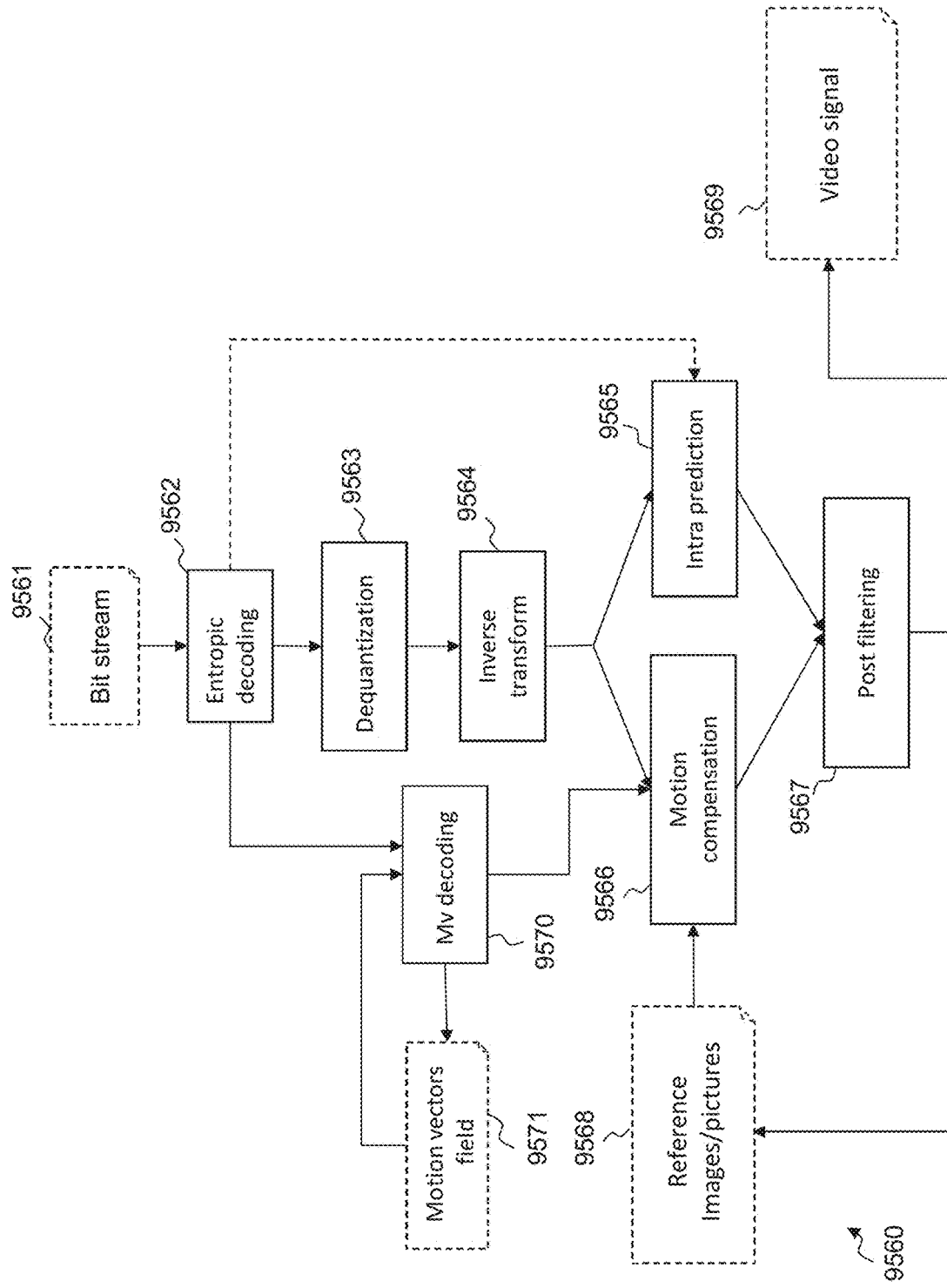
FIG. 11 is a flow chart illustrating steps of a decoding method according to embodiments of the invention.

For example, an Adaptive Loop Filter according to any of the foregoing embodiments/variants may be used in a post filtering 9415 performed by an encoder in FIG. 10 or a post filtering 9567 performed by a decoder in FIG. 11.

FIG. 10 illustrates a block diagram of an encoder according to an embodiment of the invention. The encoder is represented by connected modules, each module being adapted to implement, for example in the form of programming instructions to be executed by a Central Processing Unit (CPU) of a device, at least one corresponding step of a method implementing at least one embodiment of encoding an image of a sequence of images according to one or more embodiments/variants of the invention.

An original sequence of digital images i0 to in 9401 is received as an input by the encoder 9400. Each digital image is represented by a set of samples, sometimes also referred to as pixels (hereinafter, they are referred to as pixels). A bitstream 9410 is output by the encoder 9400 after implementation of the encoding process. The bitstream 9410 comprises data for a plurality of encoding units or image portions such as slices, each slice comprising a slice header for transmitting encoding values of encoding parameters used to encode the slice and a slice body, comprising encoded video data.

The input digital images i0 to in 9401 are divided into blocks of pixels by a module 9402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, MERGE, SKIP). The possible coding modes are tested.

Module 9403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

A temporal prediction is implemented by a motion estimation module 9404 and a motion compensation module 9405. Firstly a reference image from among a set of reference images 9416 is selected, and a portion of the reference image, also called reference area or image portion, which is the closest area (closest in terms of pixel value similarity) to the given block to be encoded, is selected by the motion estimation module 9404. The motion compensation module 9405 then predicts the block to be encoded using the selected area. The difference between the selected reference area and the given block, also called a residual block/data, is computed by the motion compensation module 9405. The selected reference area is indicated using a motion information (e.g. a motion vector).

Thus, in both cases (spatial and temporal prediction), a residual is computed by subtracting the predictor from the original block when it is not in the SKIP mode.

In the INTRA prediction implemented by the module 9403, a prediction direction is encoded. In the Inter prediction implemented by the modules 9404, 9405, 9416, 9418, 9417, at least one motion vector or information (data) for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 9418 by a motion vector prediction and coding module 9417.

The encoder 9400 further comprises a selection module 9406 for selecting a coding mode by applying an encoding cost criterion, such as a rate-distortion criterion. In order to further reduce redundancies, a transform (such as DCT) is applied by a transform module 9407 to the residual block, and the transformed data obtained is then quantized by a quantization module 9408 and entropy encoded by an entropy encoding module 9409. Finally, the encoded residual block of the current block being encoded is inserted into the bitstream 9410 when it is not in the SKIP mode and the selected coding mode requires encoding of the residual block.

The encoder 9400 also performs decoding of the encoded image in order to produce a reference image (e.g. those in the Reference images/pictures 9416) for the motion estimation of the subsequent images. This enables the encoder and a decoder receiving the bitstream to have the same reference frames (e.g. reconstructed images or reconstructed image portions are used). An inverse quantization ("dequantization") module 9411 performs an inverse quantization ("dequantization") of the quantized data, which is then followed by an inverse transform performed by an inverse transform module 9412. An intra prediction module 9413 uses prediction information to determine which predictor to use for a given block and a motion compensation module 9414 actually adds the residual obtained by the module 9412 to the reference area obtained from the set of reference images 9416. Post filtering is then applied by a module 9415 to filter the reconstructed frame (image or image portions) of pixels to obtain another reference image for the set of reference images 9416.

FIG. 11 illustrates a block diagram of a decoder 9560 which may be used to receive data from an encoder according an embodiment of the invention. The decoder is represented by connected modules, each module being adapted to implement, for example in the form of programming instructions to be executed by a CPU of device, a corresponding step of a method implemented by the decoder 9560.

The decoder 9560 receives a bitstream 9561 comprising encoded units (e.g. data corresponding to an image portion, a block or a coding unit), each one being composed of a header containing information on encoding parameters and a body containing the encoded video data. As explained with respect to FIG. 10, the encoded video data is entropy encoded, and the motion information (e.g. motion vector predictors' indexes) are encoded, for a given image portion (e.g. a block or a CU), on a predetermined number of bits. The received encoded video data is entropy decoded by a module 9562. The residual data is then dequantized by module 9563 and then an inverse transform is applied by a module 9564 to obtain pixel values.

The mode data indicating the coding mode are also entropy decoded and based on the mode, an INTRA type decoding or an INTER type decoding is performed on the encoded blocks (units/sets/groups) of image data. In the case of INTRA mode, an INTRA predictor is determined by an intra prediction module 9565 based on the intra prediction mode specified in the bitstream (e.g. the intra prediction mode is determinable using data provided in the bitstream). If the mode is INTER mode, the motion prediction information is extracted/obtained from the bitstream so as to find (identify) the reference area used by the encoder. The motion prediction information comprises the reference frame index and the motion vector residual, for example. The motion vector predictor is added to the motion vector residual by a motion vector decoding module 9570 in order to obtain the motion vector.

The motion vector decoding module 9570 applies motion vector decoding for each image portion (e.g. current block or CU) encoded by motion prediction. Once an index of the motion vector predictor for the current block has been obtained, the actual value of the motion vector associated with the image portion (e.g. current block or CU) can be decoded and used to apply motion compensation by a module 9566. The reference image portion indicated by the decoded motion vector is extracted/obtained from a set of Reference images 9568 so that the module 9566 can perform the motion compensation. Motion vector field data 9571 is updated with the decoded motion vector in order to be used for the prediction of subsequently decoded motion vectors.

Finally, a decoded block is obtained. Where appropriate, post filtering is applied by a post filtering module 9567. A decoded video signal 9569 is finally obtained and provided by the decoder 9560.

Figure 12:
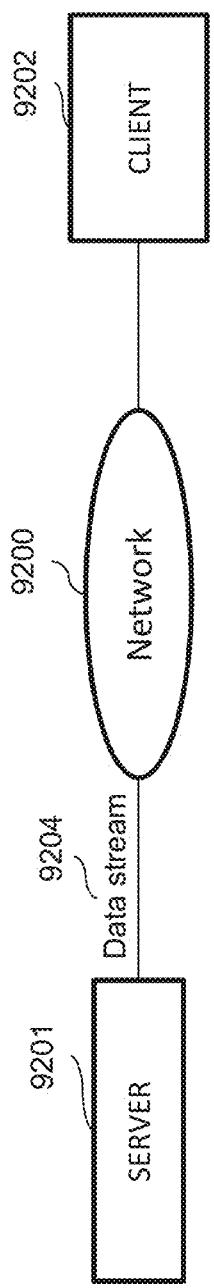
FIG. 12 is a block diagram schematically illustrating a data communication system in which one or more embodiments of the invention may be implemented.

FIG. 12 illustrates a data communication system in which one or more embodiments of the invention may be implemented. The data communication system comprises a transmission device, in this case a server 9201, which is operable to transmit data packets of a data stream 9204 to a receiving device, in this case a client terminal 9202, via a data communication network 9200. The data communication network 9200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 9201 sends the same data content to multiple clients.

The data stream 9204 provided by the server 9201 may be composed of multimedia data representing video and audio data. Audio and video data streams may, in some embodiments of the invention, be captured by the server 9201 using a microphone and a camera respectively. In some embodiments data streams may be stored on the server 9201 or received by the server 9201 from another data provider, or generated at the server 9201. The server 9201 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the High Efficiency Video Coding (HEVC) format or H.264/Advanced Video Coding (AVC) format or Versatile Video Coding (VVC) format. The client 9202 receives the transmitted bitstream and decodes the reconstructed bitstream to reproduce video images on a display device and the audio data by a loud speaker.

Although a streaming scenario is considered in this embodiment, it will be appreciated that in some embodiments of the invention the data communication between an encoder and a decoder may be performed using for example a media storage device such as an optical disc. In one or more embodiments of the invention a video image may be transmitted with data representative of compensation offsets for application to reconstructed pixels of the image to provide filtered pixels in a final image.

Figure 13:
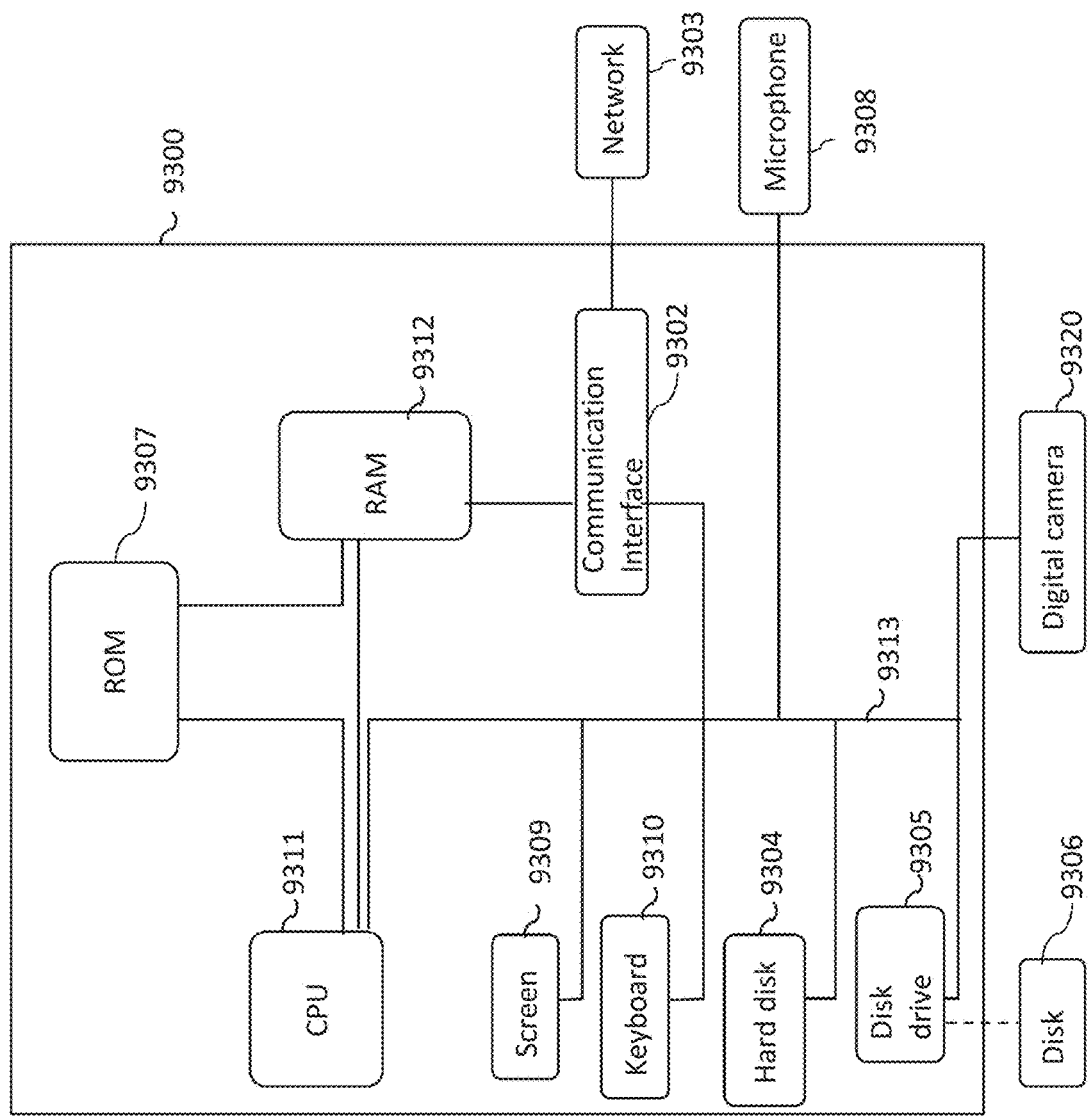
FIG. 13 is a block diagram illustrating components of a processing device in which one or more embodiments of the invention may be implemented.

FIG. 13 schematically illustrates a processing device 9300 configured to implement at least one embodiment/variant of the invention. The processing device 9300 may be a device such as a micro-computer, a workstation, a user terminal or a light portable device. The device/apparatus 9300 comprises a communication bus 9313 connected to:

a central processing unit 9311, such as a microprocessor, denoted CPU;

a read only memory 9307, denoted ROM, for storing computer programs/instructions for operating the device 9300 and/or implementing the invention;

a random access memory 9312, denoted RAM, for storing the executable code of the method of embodiments/variants of the invention as well as the registers adapted to record variables and parameters necessary for implementing the method of encoding a sequence of digital images and/or the method of decoding a bitstream according to embodiments/variants of the invention; and a communication interface 9302 connected to a communication network 9303 over which digital data to be processed are transmitted or received.

Optionally, the apparatus 9300 may also include following components:

a data storage means 9304 such as a hard disk, for storing computer programs for implementing methods of one or more embodiments/variants of the invention and data used or produced during the implementation of one or more embodiments/variants of the invention;

a disk drive 9305 for a disk 9306 (e.g. a storage medium), the disk drive 9305 being adapted to read data from the disk 9306 or to write data onto said disk 9306; or a screen 9309 for displaying data and/or serving as a graphical interface with a user, by means of a keyboard 9310, a touchscreen or any other pointing/input means.

The apparatus 9300 can be connected to various peripherals, such as for example a digital camera 9320 or a microphone 9308, each being connected to an input/output card (not shown) so as to supply multimedia data to the apparatus 9300.

The communication bus 9313 provides communication and interoperability between the various elements included in the apparatus 9300 or connected to it. The representation of the bus is not limiting and in particular the central processing unit 9311 is operable to communicate instructions to any element of the apparatus 9300 directly or by means of another element of the apparatus 9300.

The disk 9306 can be replaced by any information medium such as for example a compact disk (CD-ROM), rewritable or not, a ZIP disk or a memory card and, in general terms, by an information storage means that can be read by a microcomputer or by a processor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 9307, on the hard disk 9304 or on a removable digital medium such as for example a disk 9306 as described previously. According to a variant, the executable code of the programs can be received by means of the communication network 9303, via the interface 9302, in order to be stored in one of the storage means of the apparatus 9300 before being executed, for example in the hard disk 9304.

The central processing unit 9311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 9304, the disk 9306 or in the read only memory 9307, are transferred into the random access memory 9312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Implementation of Embodiments of the Invention

It is also understood that according to other embodiments of the present invention, a decoder according to an aforementioned embodiment/variant is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment/variant is provided in an image capturing apparatus which also comprises a camera, a video camera or a network camera (e.g. a closed-circuit television or video surveillance camera) which captures and provides the content for the encoder to encode. Two such embodiments are provided below with reference to FIGS. 14 and 15.

Figure 14:
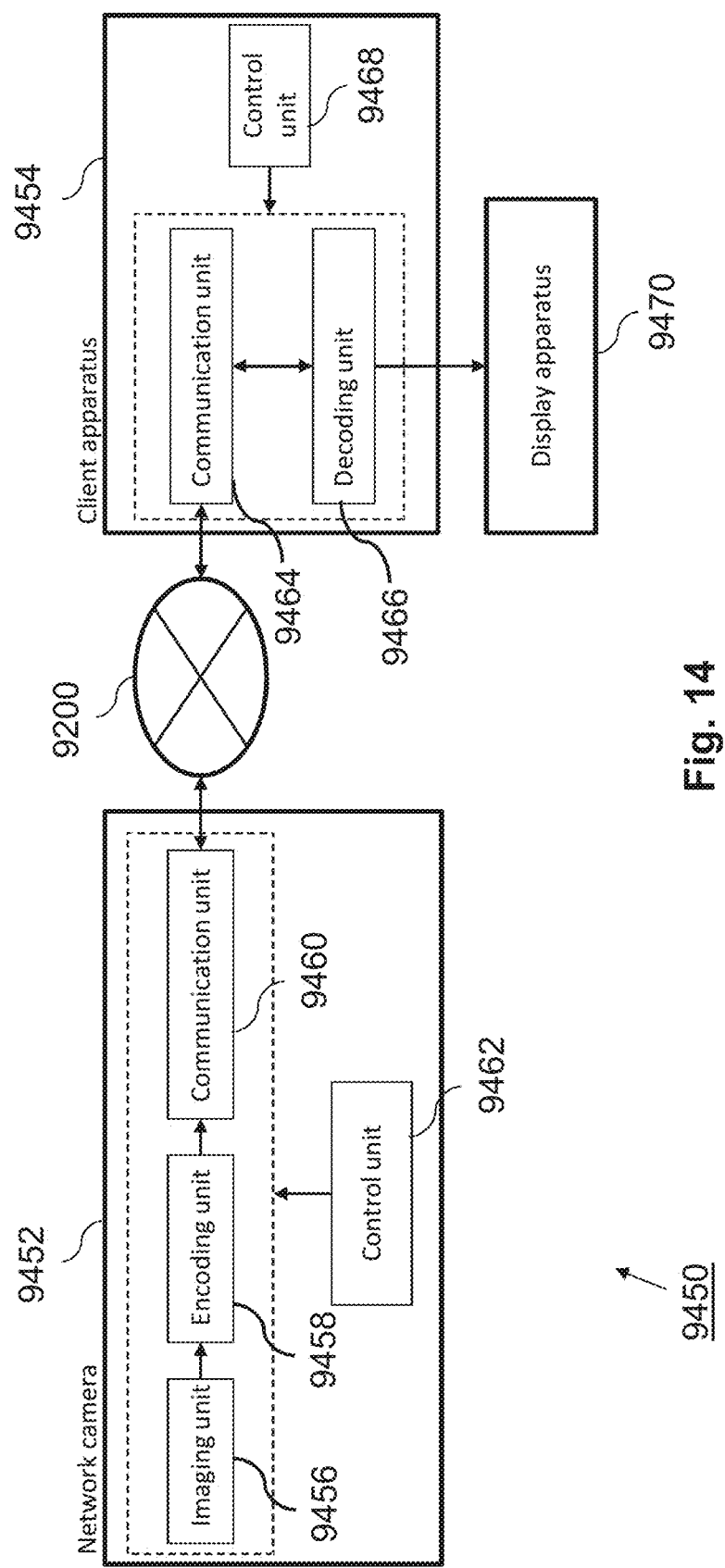
FIG. 14 is a diagram illustrating a network camera system in which one or more embodiments of the invention may be implemented.

FIG. 14 is a diagram illustrating a network camera system 9450 comprising a network camera 9452 and a client apparatus 9454.

The network camera 9452 comprises an imaging unit 9456, an encoding unit 9458, a communication unit 9460, and a control unit 9462. The network camera 9452 and the client apparatus 9454 are mutually connected to be able to communicate with each other via the network 9200. The imaging unit 9456 comprises a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully. The encoding unit 9458 encodes the image data by using said encoding methods explained in one or more of the foregoing embodiments/variants. The encoding unit 9458 uses at least one of encoding methods explained in the foregoing embodiments/variants. For another instance, the encoding unit 9458 can use combination of encoding methods explained in the foregoing embodiments/variants.

The communication unit 9460 of the network camera 9452 transmits the encoded image data encoded by the encoding unit 9458 to the client apparatus 9454. Further, the communication unit 9460 may also receive commands from client apparatus 9454. The commands comprise commands to set parameters for the encoding by the encoding unit 9458. The control unit 9462 controls other units in the network camera 9452 in accordance with the commands received by the communication unit 9460 or user input.

The client apparatus 9454 comprises a communication unit 9464, a decoding unit 9466, and a control unit 9468. The communication unit 9464 of the client apparatus 9454 may transmit commands to the network camera 9452. Further, the communication unit 9464 of the client apparatus 9454 receives the encoded image data from the network camera 9452. The decoding unit 9466 decodes the encoded image data by using said decoding methods explained in one or more of the foregoing embodiments/variants. For another instance, the decoding unit 9466 can use combination of decoding methods explained in the foregoing embodiments/variants.

The control unit 9468 of the client apparatus 9454 controls other units in the client apparatus 9454 in accordance with the user operation or commands received by the communication unit 9464. The control unit 9468 of the client apparatus 9454 may also control a display apparatus 9470 so as to display an image decoded by the decoding unit 9466.

The control unit 9468 of the client apparatus 9454 may also control the display apparatus 9470 so as to display GUI (Graphical User Interface) to designate values of the parameters for the network camera 9452, for example of the parameters for the encoding by the encoding unit 9458. The control unit 9468 of the client apparatus 9454 may also control other units in the client apparatus 9454 in accordance with user operation input to the GUI displayed by the display apparatus 9470. The control unit 9468 of the client apparatus 9454 may also control the communication unit 9464 of the client apparatus 9454 so as to transmit commands to the network camera 9452 which designate values of the parameters for the network camera 9452, in accordance with the user operation input to the GUI displayed by the display apparatus 9470.

Figure 15:
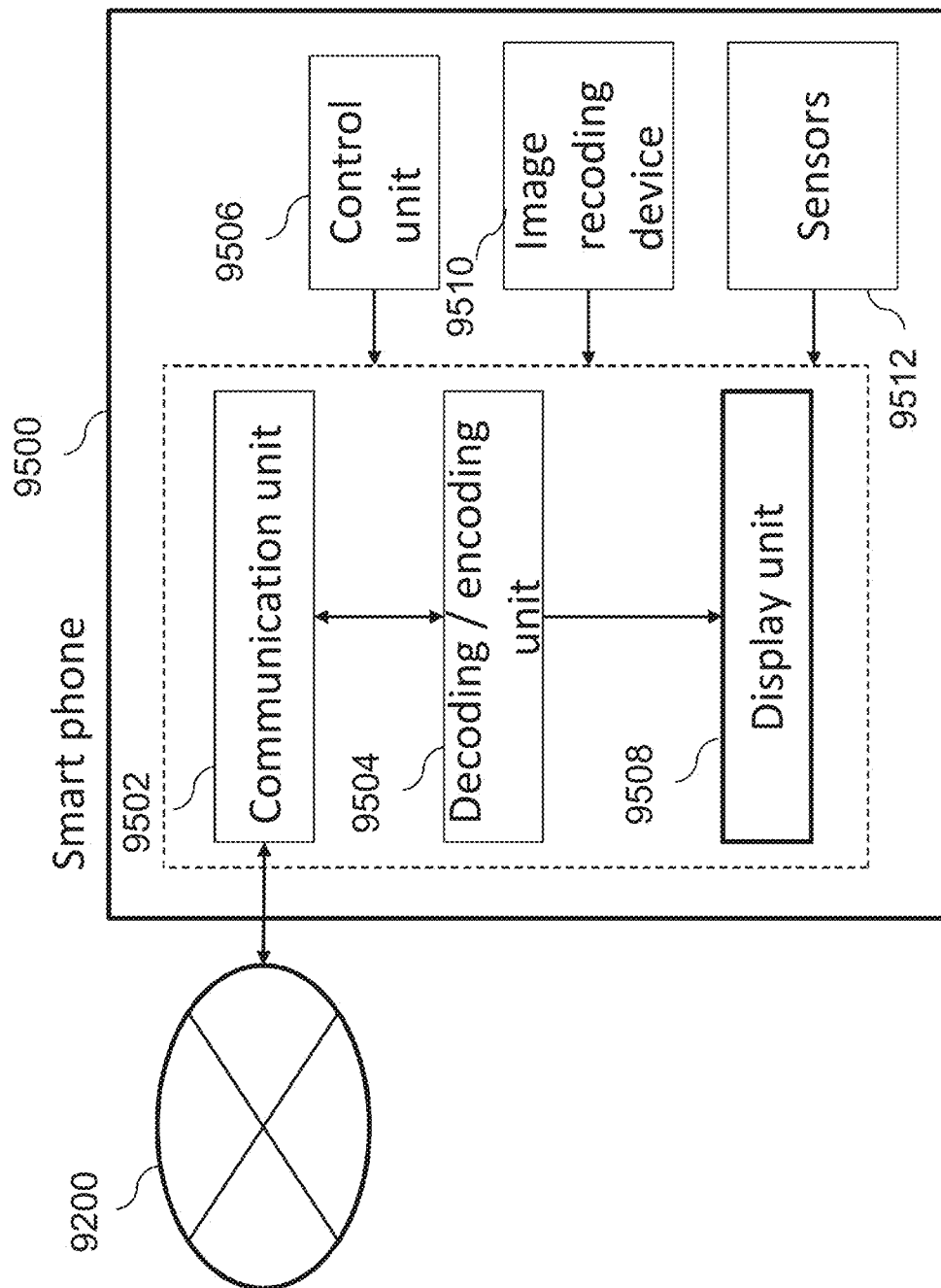
FIG. 15 is a diagram illustrating a smart phone in which one or more embodiments of the invention may be implemented.

FIG. 15 is a diagram illustrating a smart phone 9500. The smart phone 9500 comprises a communication unit 9502, a decoding/encoding unit 9504, a control unit 9506, and a display unit 9508.

The communication unit 9502 receives the encoded image data via network 9200. The decoding/encoding unit 9504 decodes the encoded image data received by the communication unit 9502. The decoding/encoding unit 9504 decodes the encoded image data by using said decoding methods explained in one or more of the foregoing embodiments/variants. The decoding/encoding unit 9504 can also use at least one of encoding or decoding methods explained in the foregoing embodiments/variants. For another instance, the decoding/encoding unit 9504 can use a combination of decoding or encoding methods explained in the foregoing embodiments/variants.

The control unit 9506 controls other units in the smart phone 9500 in accordance with a user operation or commands received by the communication unit 9502. For example, the control unit 9506 controls a display unit 9508 so as to display an image decoded by the decoding/encoding unit 9504.

The smart phone may further comprise an image recording device 9510 (for example a digital camera and an associated circuitry) to record images or videos. Such recorded images or videos may be encoded by the decoding/encoding unit 9504 under instruction of the control unit 9506. The smart phone may further comprise sensors 9512 adapted to sense the orientation of the mobile device. Such sensors could include an accelerometer, gyroscope, compass, global positioning (GPS) unit or similar positional sensors. Such sensors 9512 can determine if the smart phone changes orientation and such information may be used when encoding a video stream.

While the present invention has been described with reference to embodiments and variants thereof, it is to be understood that the invention is not limited to the disclosed embodiments/variants. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, e.g. a flag or information indicative of the result, so that the indicated or determined/inferred result can be used in the processing instead of actually performing the comparison, determination, assessment, selection, execution, performing, or consideration, e.g. during a decoding process. It is understood that when a "table" or a "lookup table" is used, other data types such as an array may also be used to perform the same function, as long as that data type is capable of performing the same function (e.g. representing a relationship/mapping among different elements).

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Reference numerals appearing in the claims are by way of illustration only and shall have no limiting effect on the scope of the claims.

In the preceding embodiments/variants, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The invention claimed is:

1. A method of Adaptive Loop Filtering, the method comprising:
    obtaining for a slice containing one or more coding tree blocks, data indicating a number of alternative chroma filters for Adaptive Loop Filtering, wherein the number can be more than one;
    obtaining, for a coding tree block in the slice containing one or more coding tree blocks, an alternative filter index identifying one of the one or more available alternative chroma filters, the number of which is indicated by the data; and
    selecting the one of the one or more alternative chroma filters identified by the alternative filter index to filter chroma image data in the coding tree block, wherein the method further comprises:
    obtaining a flag for the one or more alternative chroma filters, the flag indicating whether a chroma filter is a linear filter or a non-linear filter; and
    obtaining one or more clipping value indices for the one or more alternative chroma filters when the obtained flag indicates that a chroma filter is a non-linear filter, wherein a clipping value index in the one or more clipping value indices of a non-linear filter indicates a clipping value from a table of clipping values with the coefficient of the chroma filter.

2. The method according to claim 1, wherein, for each of the one or more alternative filters, the or each clipping value index in the one or more clipping value indices indicates a clipping value from the same table of clipping values.

3. The method according to claim 1, further comprising imposing a limit of 8 on the maximum allowed number of alternative chroma filters which may be indicated by the obtained data.

4. The method according to claim 1, wherein the data indicating the number of alternative chroma filters available is provided in an adaptation parameter set.

5. The method according to claim 4, wherein the adaptation parameter set is identified in a slice header.

6. The method according to claim 1, further comprising obtaining chroma filter coefficients for the one or more chroma filters indicated as being available.

7. The method according to claim 6, wherein six chroma filter coefficients are obtained for the one or more chroma filters.

8. The method according to claim 1, wherein the number of alternative chroma filters is used to obtain the alternative filter index.

9. A method of encoding image data, the method comprising:
    encoding image data into a bitstream; and
    performing Adaptive Loop Filtering, the Adaptive Loop Filtering comprising:
        obtaining for a slice containing one or more coding tree blocks, data indicating a number of alternative chroma filters for Adaptive Loop Filtering, wherein the number can be more than one;
        obtaining, for a coding tree block in the slice containing one or more coding tree blocks, an alternative filter index identifying one of the one or more available alternative chroma filters, the number of which is indicated by the data; and
        selecting the one of the one or more alternative chroma filters identified by the alternative filter index to filter chroma image data in the coding tree block,
    wherein the Adaptive Loop Filtering further comprises:
        obtaining a flag for the one or more alternative chroma filters, the flag indicating whether a chroma filter is a linear filter or a non-linear filter; and
        obtaining one or more clipping value indices for the one or more alternative chroma filters when the obtained flag indicates that a chroma filter is a non-linear filter,
            wherein a clipping value index in the one or more clipping value indices of a non-linear filter indicates a clipping value from a table of clipping values with the coefficient of the chroma filter.

10. The method according to claim 9, wherein, for each of the one or more alternative filters, the or each clipping value index in the one or more clipping value indices indicates a clipping value from the same table of clipping values.

11. A method of decoding image data from a bitstream the method comprising:
    obtaining image data from a bitstream;
    performing Adaptive Loop Filtering on the decoded image data, the Adaptive Loop Filtering comprising:
        obtaining for a slice containing one or more coding tree blocks, data indicating a number of alternative chroma filters for Adaptive Loop Filtering, wherein the number can be more than one;
        obtaining, for a coding tree block in the slice containing one or more coding tree blocks, an alternative filter index identifying one of the one or more available alternative chroma filters, the number of which is indicated by the data; and
        selecting the one of the one or more alternative chroma filters identified by the alternative filter index to filter chroma image data in the coding tree block,
    wherein the Adaptive Loop Filtering further comprises:
        obtaining a flag for the one or more alternative chroma filters, the flag indicating whether a chroma filter is a linear filter or a non-linear filter; and
        obtaining one or more clipping value indices for the one or more alternative chrome filters when the obtained flag indicates that a chroma filter is a non-linear filter, and
            wherein a clipping value index in the one or more clipping value indices of a non-linear filter indicates a clipping value from a table of clipping values with the coefficient of the chroma filter.

12. The method according to claim 11, wherein, for each of the one or more alternative filters, the or each clipping value index in the one or more clipping value indices indicates a clipping value from the same table of clipping values.

13. A device for encoding image data, the device comprising:
an encoder which encodes image data into a bitstream; and
an Adaptive Loop Filter which filters image data, the Adaptive Loop Filter comprising:
a data obtainer which, for a slice containing one or more coding tree blocks, obtains data indicating a number of alternative chroma filters for Adaptive Loop Filtering, wherein the number can be more than one;
an index obtainer which, for a coding tree block in the slice containing one or more coding tree blocks, obtains an alternative filter index identifying one of the one or more available alternative chroma filters, the number of which is indicated by the data; and
a selector which selects the one of the one or more alternative chroma filters identified by the alternative filter index to filter chroma image data in the coding tree block,
wherein the Adaptive Loop Filter further comprises,
a flag obtainer which obtains a flag for the one or more alternative chroma filters, the flag indicating whether a chroma filter is a linear filter or a non-linear filter; and
a clipping value indices obtainer which obtains one or more clipping value indices for the one or more alternative chroma filters when the obtained flag indicates that a chroma filter is a non-linear filter,
wherein a clipping value index in the one or more clipping value indices of a non-linear filter indicates a clipping value from a table of clipping values with the coefficient of the chroma filter.

14. The device according to claim 13, wherein, for each of the one or more alternative filters, the or each clipping value index in the one or more clipping value indices indicates a clipping value from the same table of clipping values.

15. A device for decoding image data from a bitstream, the device comprising:
a decoder which decodes image data from a bitstream; and
an Adaptive Loop Filter which filters image data, the Adaptive Loop Filter comprising:
a data obtainer which, for a slice containing one or more coding tree blocks, obtains data indicating a number of alternative chroma filters for Adaptive Loop Filtering, wherein the number can be more than one;
an index obtainer which, for a coding tree block in the slice containing one or more coding tree blocks, obtains an alternative filter index identifying one of the one or more available alternative chroma filters, the number of which is indicated by the data; and
a selector which selects the one of the one or more alternative chroma filters identified by the alternative filter index to filter chroma image data in the coding tree block,
wherein the Adaptive Loop Filter further comprises,
a flag obtainer which obtains a flag for the one or more alternative chroma filters, the flag indicating whether a chroma filter is a linear filter or a non-linear filter; and
a clipping value indices obtainer which obtains one or more clipping value indices for the one or more alternative chroma filters when the obtained flag indicates that a chroma filter is a non-linear filter,
wherein a clipping value index in the one or more clipping value indices of a non-linear filter indicates a clipping value from a table of clipping values with the coefficient of the chroma filter.

16. The device according to claim 15, wherein, for each of the one or more alternative filters, the or each clipping value index in the one or more clipping value indices indicates a clipping value from the same table of clipping values.

17. A non-transitory computer-readable storage medium carrying a computer program comprising executable instructions which, when executed by a computer or one or more processors, causes the computer or one or more processors to perform a method of Adaptive Loop Filtering, the method comprising:
obtaining for a slice containing one or more coding tree blocks, data indicating a number of alternative chroma filters for Adaptive Loop Filtering, wherein the number can be more than one;
obtaining, for a coding tree block in the slice containing one or more coding tree blocks, an alternative filter index identifying one of the one or more available alternative chroma filters, the number of which is indicated by the data; and
selecting the one of the one or more alternative chroma filters identified by the alternative filter index to filter chroma image data in the coding tree block, wherein the method further comprises:
obtaining a flag for the one or more alternative chroma filters, the flag indicating whether a chroma filter is a linear filter or a non-linear filter; and
obtaining one or more clipping value indices for the one or more alternative chroma filters when the obtained flag indicates that a chroma filter is a non-linear filter,
wherein a clipping value index in the one or more clipping value indices of a non-linear filter indicates a clipping value from a table of clipping values with the coefficient of the chroma filter.

18. The non-transitory computer-readable storage medium according to claim 17, wherein, for each of the one or more alternative filters, the or each clipping value index in the one or more clipping value indices indicates a clipping value from the same table of clipping values.

19. A device for Adaptive Loop Filtering, the device comprising:
a data obtainer which, for a slice containing one or more coding tree blocks, obtains data indicating a number of alternative chroma filters for Adaptive Loop Filtering, wherein the number can be more than one;
an index obtainer which, for a coding tree block in the slice containing one or more coding tree blocks, obtains an alternative filter index identifying one of the one or more available alternative chroma filters, the number of which is indicated by the data; and
a selector which selects the one of the one or more alternative chroma filters identified by the alternative filter index to filter chroma image data in the coding tree block, and the device further comprises:
- a flag obtainer which obtains a flag for the one or more alternative chroma filters, the flag indicating whether a chroma filter is a linear filter or a non-linear filter; and
- a clipping value indices obtainer which obtains one or more clipping value indices for the one or more alternative chroma filters when the obtained flag indicates that a chroma filter is a non-linear filter,
  - wherein a clipping value index in the one or more clipping value indices of a non-linear filter indicates a clipping value from a table of clipping values with the coefficient of the chroma filter.

20. The device according to claim 19, wherein, for each of the one or more alternative filters, the or each clipping value index in the one or more clipping value indices indicating a clipping value from the same table of clipping values.

\* \* \* \* \*